US012054381B2

(12) United States Patent
Newman et al.

(10) Patent No.: US 12,054,381 B2
(45) Date of Patent: Aug. 6, 2024

(54) METHOD OF MANUFACTURING PARTIALLY FOAM ENCASED POCKETED SPRING ASSEMBLY

(71) Applicant: L&P Property Management Company, South Gate, CA (US)

(72) Inventors: John R. Newman, Neosho, MO (US); Mark G. Meyer, Carthage, MO (US); Randall A. Wood, Oronogo, MO (US); John J. Brunnert, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 18/152,867

(22) Filed: Jan. 11, 2023

(65) Prior Publication Data

US 2024/0228261 A1 Jul. 11, 2024

(51) Int. Cl.

*B68G 7/02* (2006.01)
*A47C 27/05* (2006.01)
*A47C 27/06* (2006.01)
*A47C 27/07* (2006.01)
*B68G 9/00* (2006.01)

(52) U.S. Cl.

CPC ................ *B68G 7/02* (2013.01); *A47C 27/05* (2013.01); *A47C 27/064* (2013.01); *A47C 27/07* (2013.01); *B68G 9/00* (2013.01)

(58) Field of Classification Search

CPC ..... A47C 27/064; A47C 27/066; A47C 27/07; B68G 7/02

See application file for complete search history.

(56) References Cited

U.S. PATENT DOCUMENTS 2,862,214 A * 12/1958 Thompson ............. A47C 27/04 5/720
3,099,021 A * 7/1963 Wetzler .................. A47C 27/20 264/46.7
5,040,255 A * 8/1991 Barber, Jr. ............. A47C 27/05 5/718

(Continued)

FOREIGN PATENT DOCUMENTS

CN 105947968 A * 9/2016
CN 110817788 A * 2/2020 ............... B68G 9/00

(Continued)

OTHER PUBLICATIONS

CN-114916794-A Machine Translation (Year: 2022).*

(Continued)

*Primary Examiner* — Michael W Hotchkiss
(74) *Attorney, Agent, or Firm* — Wood Herron & Evans LLP

(57) ABSTRACT

A partially foam encased pocketed spring assembly is made in a fully automated assembly machine. A first foam rail is introduced into the assembly machine and glued to upper and lower substrate webs. A first string of pocketed springs is then glued to a side surface of the first foam rail between upper and lower substrate webs and glued to the upper and lower substrate webs. Additional strings are joined together to create a pocketed spring interior. A second foam rail is then introduced into the assembly machine and glued to an outer string and to the upper and lower substrate webs to create a core. Third and fourth foam rails are glued to the core.

20 Claims, 44 Drawing Sheets

(56) References Cited

U.S. PATENT DOCUMENTS

| | | | | | |
|---|---|---|---|---|---|
| 5,126,004 | A * | 6/1992 | Suenens | B68G 9/00 156/566 |
| 5,537,699 | A * | 7/1996 | Bonaddio | A47C 27/063 5/717 |
| 5,579,810 | A * | 12/1996 | Ramsey | B21F 33/04 140/92.7 |
| 5,621,935 | A * | 4/1997 | St. Clair | B68G 9/00 5/655.8 |
| 5,792,309 | A * | 8/1998 | Eto | B68G 9/00 198/418.5 |
| 6,159,319 | A * | 12/2000 | Mossbeck | B68G 9/00 156/182 |
| 6,175,997 | B1 * | 1/2001 | Mossbeck | A47C 27/064 29/896.92 |
| 6,176,961 | B1 * | 1/2001 | Mossbeck | B29C 65/522 156/367 |
| 6,324,711 | B1 * | 12/2001 | Wells | B21F 33/04 5/256 |
| 6,574,811 | B1 * | 6/2003 | Mossbeck | B68G 9/00 5/655.8 |
| 6,877,540 | B2 * | 4/2005 | Barman | B29C 66/72523 219/244 |
| 7,211,167 | B1 * | 5/2007 | Whitworth | B68G 9/00 118/255 |
| 7,631,381 | B2 * | 12/2009 | Flippin | A47C 27/053 5/721 |
| 7,644,461 | B2 * | 1/2010 | Lee | A47C 27/063 5/655.8 |
| 8,402,642 | B2 * | 3/2013 | Kujuro | B68G 9/00 156/569 |
| 8,646,136 | B2 * | 2/2014 | Young | A47C 27/04 5/717 |
| 9,179,782 | B2 * | 11/2015 | Schiller | A47C 27/056 |
| 9,327,933 | B2 * | 5/2016 | Hug | B65H 20/00 |
| 9,622,590 | B2 * | 4/2017 | DiMarco | A47C 27/064 |
| 10,165,867 | B2 * | 1/2019 | Mossbeck | A47C 27/066 |
| 10,206,515 | B1 * | 2/2019 | Jewett | A47C 27/056 |
| 10,525,557 | B2 * | 1/2020 | Subhedar | B23P 21/004 |
| 11,013,340 | B2 * | 5/2021 | Jewett | B68G 7/02 |
| 11,147,390 | B2 * | 10/2021 | Mabon | A47C 27/064 |
| 11,148,934 | B2 * | 10/2021 | Wolfson | B68G 9/00 |
| 11,267,691 | B2 * | 3/2022 | Fischer | A47C 27/064 |
| 11,399,633 | B2 | 8/2022 | James | |
| 11,412,860 | B2 * | 8/2022 | Spinks | A47C 27/0453 |
| 2002/0124321 | A1 * | 9/2002 | Wells | A47C 27/063 5/720 |
| 2003/0217413 | A1 * | 11/2003 | Grothaus | A47C 27/04 5/655.8 |
| 2004/0261186 | A1 * | 12/2004 | Gladney | A47C 23/00 5/717 |
| 2007/0204407 | A1 * | 9/2007 | Lee | A47C 27/063 5/717 |
| 2011/0107572 | A1 * | 5/2011 | Kim | B21F 33/025 29/91.1 |
| 2015/0101127 | A1 * | 4/2015 | Winton | A47C 27/063 5/737 |
| 2019/0029438 | A1 * | 1/2019 | Moon | A47C 27/053 |
| 2020/0198961 | A1 * | 6/2020 | Tan | A47C 27/064 |
| 2020/0307990 | A1 * | 10/2020 | Spinks | B68G 9/00 |
| 2022/0395105 | A1 * | 12/2022 | Teska | B32B 5/18 |

FOREIGN PATENT DOCUMENTS

| | | | | | |
|---|---|---|---|---|---|
| CN | 213914429 | U * | 8/2021 | |
| CN | 114916794 | A * | 8/2022 | |
| CN | 115043371 | A * | 9/2022 | |
| EP | 0624545 | A1 * | 9/1997 | A47C 27/064 |
| WO | WO-2021098117 | A1 * | 5/2021 | B68G 9/00 |
| WO | WO-2021120447 | A1 * | 6/2021 | A47C 27/064 |

OTHER PUBLICATIONS

WO-2021098117-A1 Machine Translation (Year: 2021).*
WO-2021120447-A1 Machine Translation (Year: 2021).*
CN-110817788-A Machine Translation (Year: 2020).*
CN-105947968-A Machine Translation (Year: 2016).*
CN-115043371-A Machine Translation (Year: 2022).*
CN-213914429-U Machine Translation (Year: 2021).*

* cited by examiner

METHOD OF MANUFACTURING PARTIALLY FOAM ENCASED POCKETED SPRING ASSEMBLY

TECHNICAL BACKGROUND OF THE INVENTION

The present invention relates to a method and an apparatus for manufacturing a partially foam encased pocketed spring assembly along with the resultant partially foam encased pocketed spring assembly.

It is known to manually construct a foam encased pocketed spring assembly having a foam bottom. The method of making such a product has been to manually adhere foam sides around a perimeter of a foam base. The foam base is commonly about one inch thick. This creates a tub assembly into which a pocketed spring assembly has been inserted. An upper piece of foam is glued to the top of the filled tub assembly.

One difficulty with manually constructing such a foam tub assembly is that the operator may glue the foam pieces differently with each repetition. There is no precision/consistency. Another difficulty with the known pre-encased product is that the bottom foam piece is not sturdy enough to provide precision, which makes manufacturing errors more common. This manual production method is very labor intensive and time consuming.

It is an object of the present invention to provide a manufacturing method and a manufacturing apparatus, which allow a bedding or seating manufacturer to manufacture partially foam encased pocketed spring assemblies using a fully automated process.

It is another object of the present invention to provide a manufacturing method and a manufacturing apparatus, which allow a bedding or seating product manufacturer to manufacture partially foam encased pocketed spring assemblies without foam bottoms.

BRIEF SUMMARY OF THE INVENTION

The present invention provides a manufacturing method and a manufacturing apparatus which eliminates the labor and overhead associated with manually assembling foam encased pocketed spring assemblies. The present invention provides a manufacturing method and a manufacturing apparatus which eliminates the need for a base foam, instead using a sturdier, more cost efficient and sustainable base. The base is typically the dimensionally stabilizing substrate disclosed in U.S. Pat. No. 11,013,340, which is fully incorporated herein. The resultant foam encased pocketed spring assembly may be shipped to a bedding manufacturer ready to assemble, thereby reducing the amount of foam inventory, labor and overhead for the bedding manufacturer.

According to one aspect of the invention, the resulting product comprises a partially foam encased pocketed spring assembly having foam rails surrounding a pocketed spring interior. The pocketed spring interior and foam rails are sandwiched between upper and lower substrate sheets. First and second foam rails are glued to the upper and lower substrate sheets at opposed ends of the partially foam encased pocketed spring assembly. A first string of pocketed springs is glued to the first foam rail and extends parallel to the first and second foam rails. Interior strings of pocketed springs are glued to each other and to the upper and lower substrate sheets to create a pocketed spring interior or core. In most embodiments, each of the strings is approximately the same length the other strings and approximately the same length of the first and second foam rails. The last string of pocketed springs is glued to the second foam rail.

Third and fourth foam rails are glued to the upper and lower substrate sheets at opposite sides of the partially foam encased pocketed spring assembly. Each of the third and fourth foam rails may be glued to the first and second rails to create a foam perimeter around the pocketed spring interior or core made of parallel strings of pocketed springs. The first and second foam rails extend parallel the strings of the pocketed spring interior or core while the third and fourth foam rails extend perpendicular to the first and second rails and strings of pocketed springs.

In most embodiments, the lower substrate sheet has a different thickness than the upper substrate sheet. Usually, the lower substrate sheet is thicker than the upper substrate sheet. In some embodiments, the upper substrate sheet is known in the industry as a scrim sheet.

In most embodiments the first, second, third and fourth foam rails have the same cross-sectional configuration. However, it is possible that the first and second foam rails have the same cross-sectional configuration, which is different than the cross-sectional configuration of the third and fourth foam rails. In such a product, the third and fourth foam rails would have the same cross-sectional configuration.

Another embodiment of partially foam encased pocketed spring assembly has no upper substrate or scrim sheet. The partially foam encased pocketed spring assembly comprises a lower substrate sheet, first and second foam rails glued to the lower substrate sheet, a pocketed spring interior and third and fourth foam rails glued to the lower substrate sheet. The pocketed spring interior comprises strings of pocketed springs attached to each other and to the lower substrate sheet. A first string of pocketed springs is glued to the first foam rail and a last string of pocketed springs is glued to the second foam rail. The strings extend parallel to each other and parallel the first and second foam rails. Third and fourth foam rails are glued to the lower substrate sheet and are parallel to each other. Each of the third and fourth foam rails may be glued to the first and second foam rails. In all embodiments, the foam rails may be made of polyurethane foam or any other known foam.

In another embodiment, the partially foam encased pocketed spring assembly comprises a lower substrate sheet and an upper substrate sheet. The upper substrate sheet may be a scrim sheet, as the term in known in the bedding industry. First and second foam rails are attached to the lower and upper substrate sheets. The partially foam encased pocketed spring assembly further comprises a pocketed spring interior comprising strings of pocketed springs attached to each other. A first string of pocketed springs is attached to the lower and upper substrate sheets. A last string of pocketed springs is also attached to the upper and lower substrate sheets. Middle or interior strings of pocketed springs may be also attached to the upper and lower substrate sheets. The strings of pocketed springs extend parallel the first and second foam rails. Third and fourth foam rails are also attached to the upper and lower substrate sheets. The third and fourth foam rails may be secured to the first and second rails and/or attached to the ends of the strings of pocketed springs. The third and fourth foam rails extend perpendicular to the direction of the first and second foam rails and perpendicular to the direction of the strings of pocketed springs.

In some embodiments, the first string of pocketed springs may be attached to the first foam rail and the last string of pocketed springs may be attached to the second foam rail.

In another embodiment, the partially foam encased pocketed spring assembly comprises a lower substrate sheet; the upper substrate sheet is omitted. First and second foam rails are attached to the lower substrate sheet. The partially foam encased pocketed spring assembly further comprises a pocketed spring interior comprising strings of pocketed springs attached to each other. A first string of pocketed springs is attached to the lower substrate sheet. A last string of pocketed springs is also attached to the lower substrate sheet. Middle or interior strings of pocketed springs may be also attached to the lower substrate sheet. The strings of pocketed springs extend parallel the first and second foam rails. Third and fourth foam rails are also attached to the lower substrate sheet. The third and fourth foam rails may be secured to the first and second rails and/or attached to the ends of the strings of pocketed springs. The third and fourth foam rails extend perpendicular to the direction of the first and second foam rails and perpendicular to the direction of the strings of pocketed springs.

The partially foam encased pocketed spring assembly of the invention may be produced in a single system, i.e., in a single assembly machine, using a fully automated manufacturing process. Since the upper and lower substrate sheets are preferably the same size, the dimensional accuracy of the partially foam encased pocketed spring assembly can be ensured. This allows that the size of the foam rails and strings of springs can be appropriately chosen, and the foam rails can be easily attached to the pocketed spring interior or core, thereby reducing the labor expenses and the manufacturing cost. One operator may operate the assembly machine. The quality of the partially foam encased pocketed spring assembly is improved compared to hand-made similar products.

Another aspect of the invention comprises an assembly machine for manufacturing a partially foam encased pocketed spring assembly. The assembly machine comprises a front assembler, a first side assembler on one side of the front assembler and a second side assembler on the other side of the front assembler. The assembly machine further comprises at least one front loading tray for loading first and second foam rails into the front assembler and at least one supply source for at least one string of pocketed springs to be loaded into the front assembler. Each of the side assemblers has at least one side loading tray for loading at least one foam rail into the side assembler. The assembly machine further comprises a user interface, typically at a front end of the front assembler, but which may be located anywhere. Each of the three assemblers includes infeed belts for moving each of the foam rails into one of the assemblers. Each of the three assemblers further comprises grippers for moving or pulling at least foam rail or at least one string into a loading position between infeed belts. Each of the assemblers further comprises its own glue or adhesive applicator.

The assembly machine comprises a first station comprising the front assembler, a second station downstream of the first station and a transport system for transporting a core or intermediate product from the first station to the second station. The first station comprises a front assembler, at least one supply source for strings of pocketed springs and at least one front loading tray for loading foam rails into the front assembler. The front assembler comprises a front glue applicator, front infeed belts and compression belts to move a core being constructed in the front assembler downstream towards the transport system.

The second station comprises two side assemblers on opposite sides of the front assembler. Each of the side assemblers comprises a side glue applicator, side infeed belts and at least one loading tray for moving at least one foam rail and/or at least one supply source for a string of pocketed springs. The side infeed belts compress either one of the foam rails or one of the strings of springs.

The assembly machine may further comprise a transport system such as transport belts for transporting the core or intermediate product from the first station to the second station. The core comprises the upper and lower substrate sheets, the first and second rails and strings of pocketed springs between the first and second rails.

Stated more simply, the assembly machine comprises a front assembler, a first side assembler on one side of the front assembler, a second side assembler on the other side of the front assembler, at least one front loading tray for loading first and second foam rails into the front assembler, at least one supply source for at least one string of pocketed springs to be loaded into the front assembler and at least one loading tray for loading third and fourth foam rails into the side assemblers.

According to another aspect of the invention, the method of manufacturing the partially foam encased pocketed spring assembly comprises the following steps: (a) moving a first foam rail into an assembly machine between upper and lower substrate webs; (b) securing the first foam rail to the upper and lower substrate webs; c) introducing a first string of pocketed springs into the assembly machine between the upper and lower substrate webs; d) securing the first string of pocketed springs to the first foam rail and to the upper and lower substrate webs; e) introducing additional strings of pocketed springs into the assembly machine one string at a time and securing each of the additional strings of pocketed springs to at least one other additional string between the lower substrate web and the upper substrate web; f) moving a second foam rail into the assembly machine between the upper and lower substrate webs; g) securing the second foam rail to a last string of the additional strings to complete a core; and h) cutting the upper and lower substrate webs to create upper and lower substrate sheets. The first and second foam rails and all the strings are introduced into the assembly machine in a first direction according to one embodiment.

The method further comprises moving third and fourth foam rails into the assembly machine between the upper and lower substrate webs on opposite sides of the assembly machine. A glue applicator is used to secure third and fourth foam rails to opposite end surfaces of the strings of the pocketed spring interior and to the first and second foam rails to the core so that the first, second, third and fourth foam rails form an edge area surrounding a pocketed spring interior. The edge area has a firmness different than the firmness of the pocketed spring interior. The method further comprising securing the third and fourth foam rails to the upper and lower substrate sheets.

The use of such upper and lower substrate webs at the upper and lower surfaces of the pocketed spring interior and foam rails ensures that the partially foam encased pocketed spring assembly remains stable in length and width.

After being cut the upper and lower substrate webs which are now rectangular sheets may be clamped by a clamping device, so that the third and fourth foam rails can be moved between the upper and lower substrate sheets to the sides of the strings and to the first and second foam rails without moving or pushing the substrate sheets.

Introducing strings of pocketed springs into the assembly machine may further comprise compressing the strings of pocketed springs prior to their attachment to the existing portion of pocketed spring interior and allowing the compressed strings to expand after attaching the string of pocketed springs to the existing portion of pocketed spring interior. The same is true when introducing the first and last string of pocketed springs except that the first and last string are attached to the first and second foam rails, respectively.

The invention may be performed as a fully automated process by an innerspring unit assembly machine comprising a first station for providing the intermediate spring assembly by carrying out steps (a)-(h) and a second station for securing the third and fourth foam rails to the pocketed spring interior and to the first and second foam rails. The intermediate spring assembly may be transported from the first station to the second station using a conveyor device.

Another way of describing the method of manufacturing a partially foam encased pocketed spring assembly comprises following steps: (a) moving a first foam rail in a first direction into an assembly machine between upper and lower substrate webs; (b) gluing the first foam rail to the upper and lower substrate webs; c) moving a first string of pocketed springs in the first direction into the assembly machine between the upper and lower substrate webs; d) gluing the first string of pocketed springs to the first foam rail and to the upper and lower substrate webs; e) moving additional strings of pocketed springs in the first direction into the assembly machine one string at a time; f) gluing each of the additional strings of pocketed springs to each other one string at a time to create a pocketed spring interior, each of the additional strings being glued to at least one adjacent string, the lower substrate web and the upper substrate web; g) moving a second foam rail in the first direction into the assembly machine between the upper and lower substrate webs; h) gluing the second foam rail to the upper and lower substrate webs and to a last string of the pocketed spring interior to create a core; and i) cutting the upper and lower substrate webs to a desired size to create upper and lower substrate sheets.

The method further comprises moving third and fourth foam rails in a second direction perpendicular to the first direction into the assembly machine between the upper and lower substrate sheets on the opposite sides of the assembly machine. The method further comprises gluing the third and fourth foam rails to oppose end surfaces of the strings of the pocketed spring interior so that the first, second, third and fourth foam rails form an edge area surrounding the pocketed spring interior. The third and fourth foam rails are glued to the upper and lower substrate sheets.

The method of manufacturing a partially foam encased pocketed spring assembly may comprise the following steps: a) moving a first foam rail into a front assembler of an assembly machine between upper and lower substrate webs; b) gluing the first foam rail to the upper and lower substrate webs; c) moving a first string of pocketed springs into the assembly machine between the upper and lower substrate webs; applying glue to the first foam rail; d) pushing the first string of pocketed springs against the first foam rail between the upper and lower substrate webs; e) allowing the glue to harden to secure the first string of pocketed springs to the first foam rail; f) moving additional strings of pocketed springs into the assembly machine; g) securing each of the additional strings of pocketed springs to at least one adjacent string between the upper and lower substrate webs to create a pocketed spring interior; h) moving a second foam rail into the assembly machine between the upper and lower substrate webs; i) gluing the second foam rail to the upper and lower substrate webs and to a last string of the pocketed spring interior; and j) cutting the upper and lower substrate webs to create upper and lower substrate sheets.

The method may further comprise the following additional steps: moving third and fourth foam rails into the assembly machine between the upper and lower substrate sheets on opposite sides of the assembly machine and gluing the third and fourth foam rails to the pocketed spring interior so the first, second, third and fourth foam rails form an edge area surrounding the pocketed spring interior.

The accompanying drawings, which are incorporated in and constitute a part of this specification, illustrate embodiments of the invention and, together with the summary of the invention given above, and the detailed description of the drawings given below, explain the principles of the present invention.

BRIEF DESCRIPTION OF THE DRAWINGS

FIG. 4I is a top view of a portion of the front assembler of the assembly machine of FIG. 3 showing the first string in its loading position.

FIG. 4O is a top view of a portion of the front assembler of the assembly machine of FIG. 3 showing multiple strings joined together and the second foam rail in its loading position.

DETAILED DESCRIPTION OF THE DRAWINGS

Figure 1:
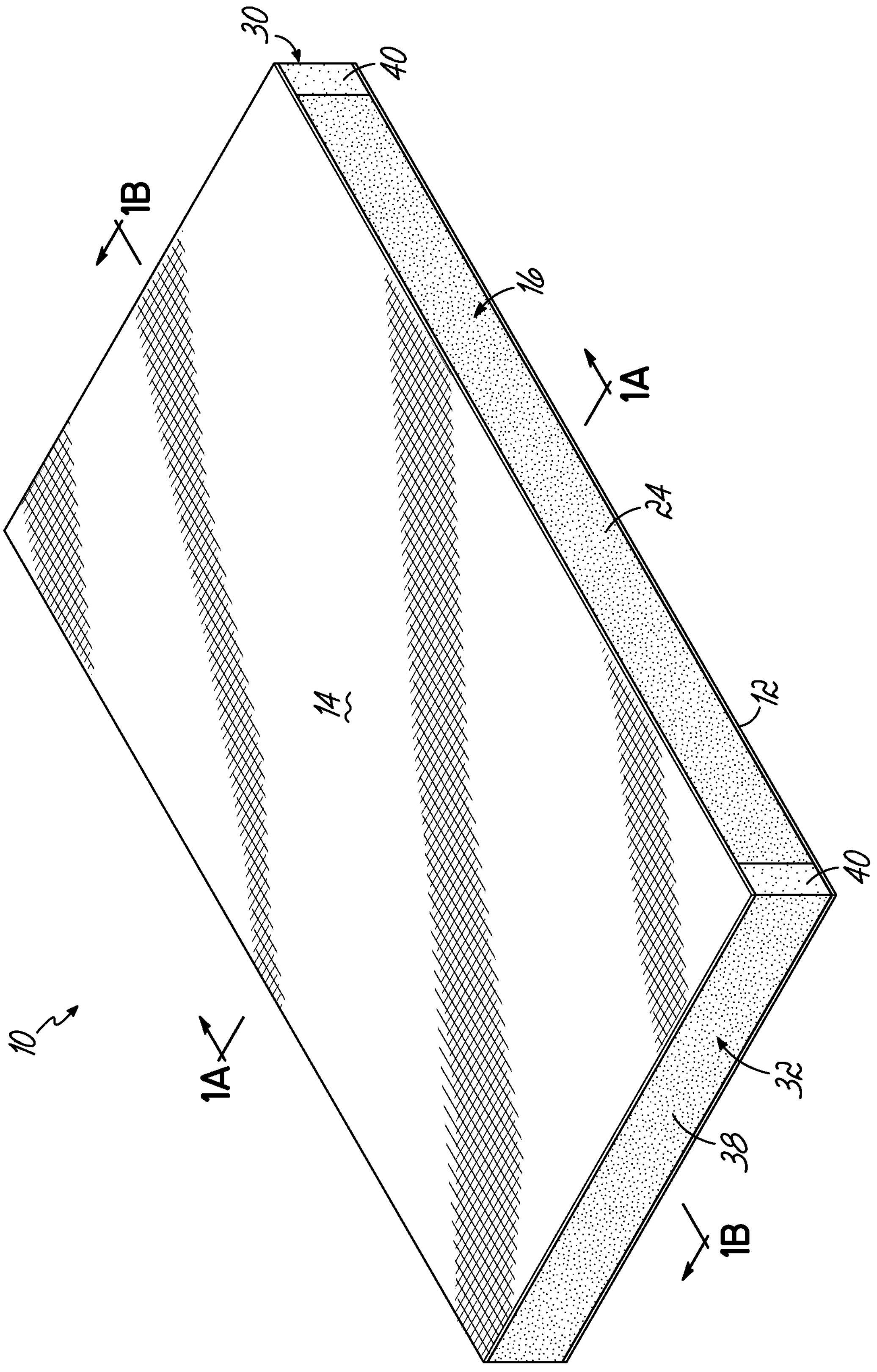
FIG. 1 is a perspective view of a partially foam encased pocketed spring assembly build in accordance with the principals disclosed herein.

FIG. 1 illustrates a partially foam encased pocketed spring assembly 10 made in accordance with the present invention. As best shown in FIG. 1C, the partially foam encased pocketed spring assembly 10 comprises a first or lower substrate sheet 12 and a second or upper substrate sheet 14. Each of the substrate sheets 12, 14 is has a rectangular shape. The lower substrate sheet 12 has a different thickness than the upper substrate sheet 14 in most instances. The lower substrate sheet 12 is typically thicker than the upper substrate sheet 14, although they may be the same thickness. The lower substrate sheet 12 is typically the sheet described in U.S. Pat. No. 11,013,340 as the dimensionally stabilizing substrate while the upper substrate sheet 14 is known in the industry as a scrim sheet and described in U.S. Pat. No. 11,013,340.

As best seen in FIG. 1C, the partially foam encased pocketed spring assembly 10 further comprises a first foam rail 16 and a second foam rail 18 which are spaced apart, extend parallel to each other and have the same cross-sectional configuration. The first and second foam rails 16, 18 are approximately the same length. As best shown in FIG. 1C, each of the first and second foam rails 16, 18 has a top surface 20, a bottom surface 22, side surfaces 24 and end surfaces 26 (only one being shown).

Figure 1A:
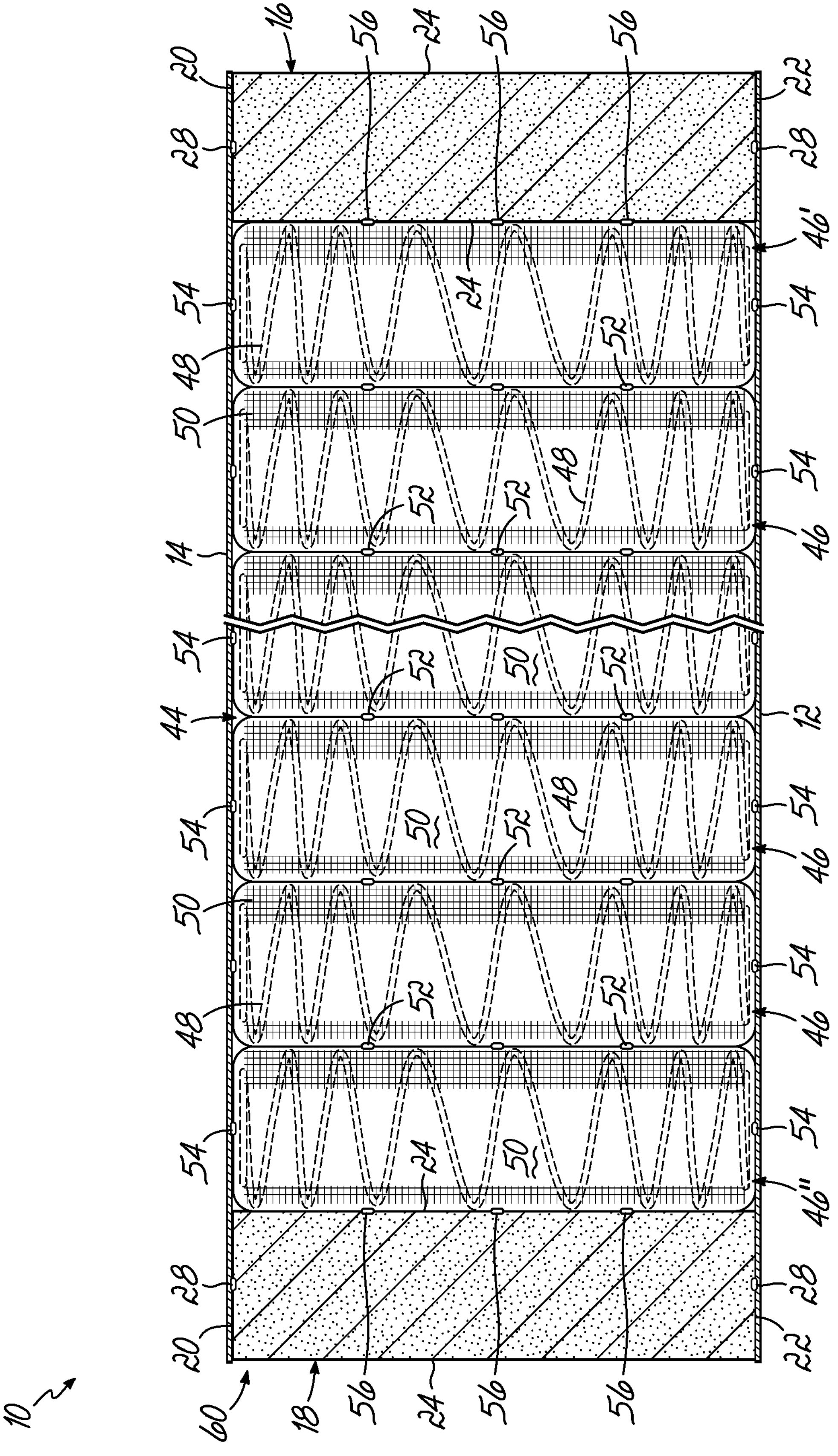
FIG. 1A is a cross-sectional view taken along the line 1A-1A of FIG. 1.

As best shown in FIG. 1A, the top surface 20 of each of the first and second foam rails 16, 18, respectively, is glued to the upper substrate sheet 14 with a glue line 28. Similarly, the bottom surface 22 of each of the first and second foam rails 16, 18, respectively, is glued to the lower substrate sheet 12 with a glue line 28. As best shown in FIG. 1A, a side surface 24 of each of the first and second foam rails 16, 18, respectively, is glued to an adjacent string with lines of glue 56. More specifically, a side surface 24 of the first foam rail 16 is glued to the first string 46' with three lines of glue 56. A side surface 24 of the second foam rail 18 is glued to the last string 46" with three lines of glue 56.

As best seen in FIG. 1C, the partially foam encased pocketed spring assembly 10 further comprises a third foam rail 30 and a fourth foam rail 32 which are spaced apart, extending parallel to each other and have the same cross-sectional configuration. The third and fourth foam rails 30, 32 are approximately the same length, shorter than the length of the first and second foam rails 16, 18.

In the embodiment illustrated, the cross-sectional configuration of all the four foam rails is identical. However, it is within the scope of the present invention that the cross-sectional configuration of the third and fourth foam rails is different than the cross-sectional configuration of the first and second foam rails. As best shown in FIG. 1C, each of the third and fourth foam rails 30, 32 has a top surface 34, a bottom surface 36, side surfaces 38 and end surfaces 40 (only one being shown).

Figure 1B:
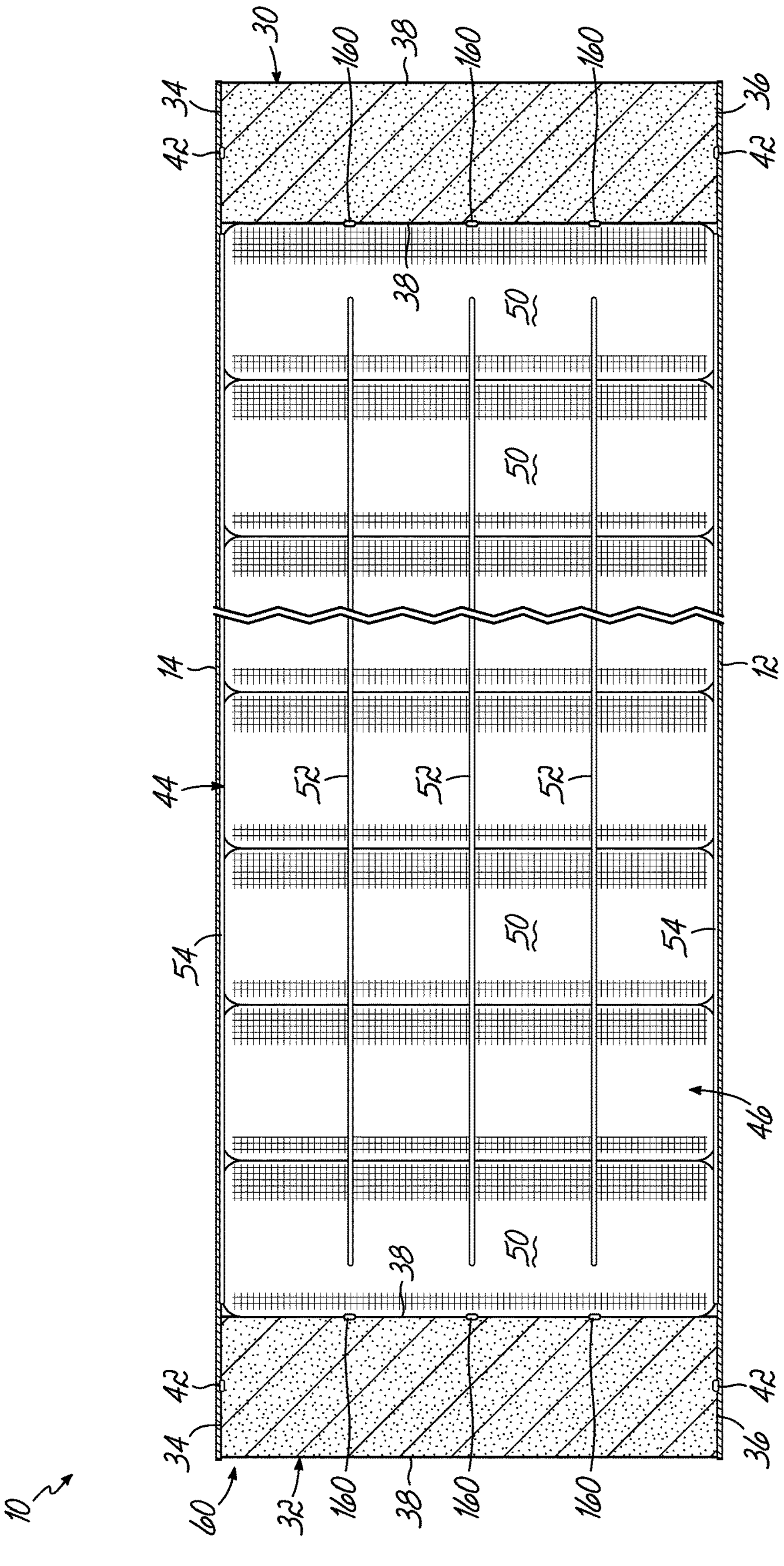
FIG. 1B is a cross-sectional view taken along the line 1B-1B of FIG. 1.
Figure 1C:
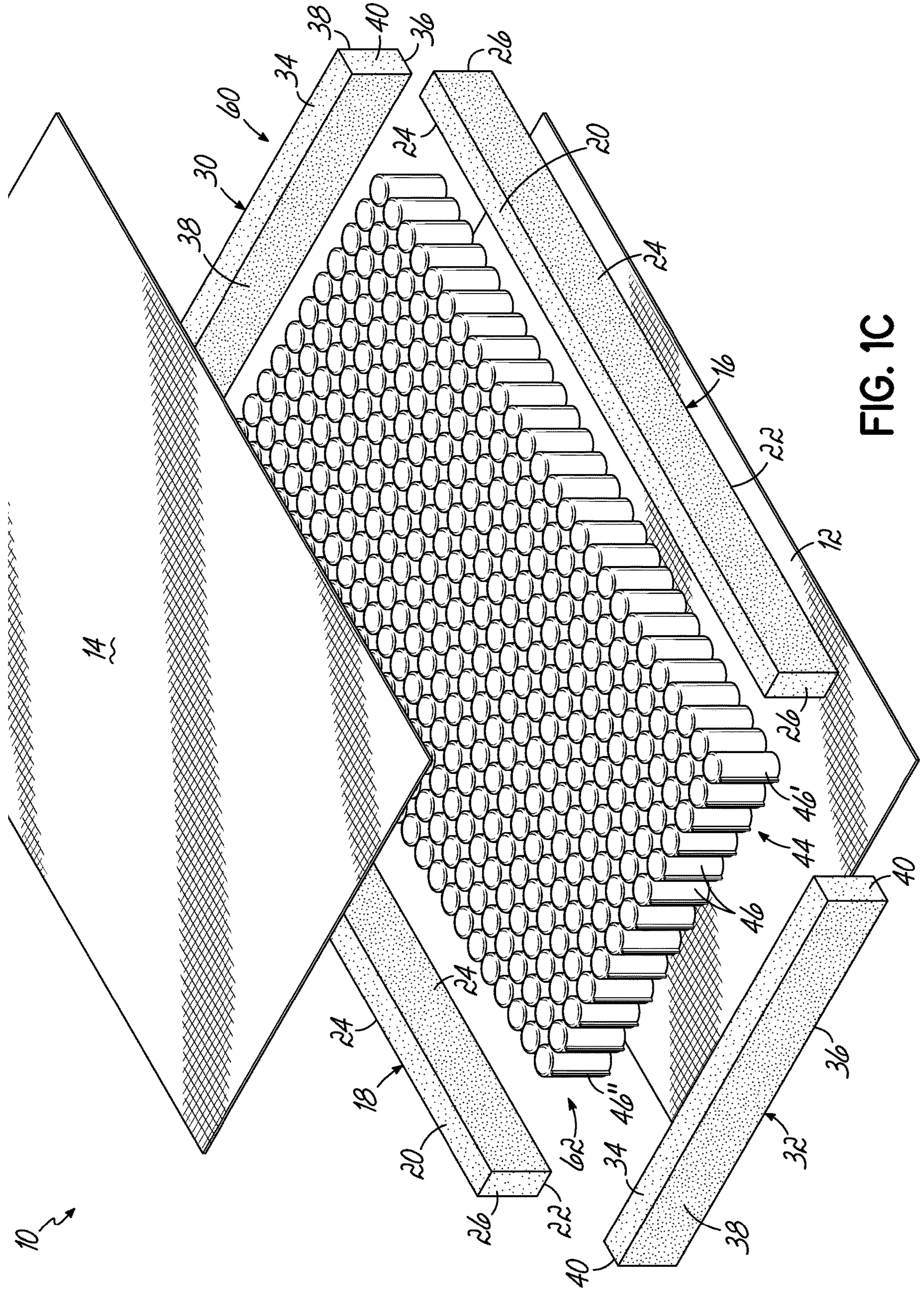
FIG. 1C is a partially disassembled view of the partially foam encased pocketed spring assembly of FIG. 1.

As best shown in FIG. 1B, the top surfaces 34 of each of the third and fourth foam rails 30, 32, respectively, is glued to the lower and upper substrate sheets 12, 14 with glue lines 42. As best shown in FIG. 1, in most instances, the end surfaces 26 of the first and second foam rails 16, 18 are glued to one of the side surfaces 38 of the third and fourth foam rails 30, 32, respectively. As best shown in FIG. 1B, a side surface 38 of each of the third and fourth foam rails 30, 32, respectively, is glued to end surfaces of strings 46', 46, and 46" with three lines of glue 160.

Any of the foam rails, 16, 18, 30, 32 may be made of any desired foam. Typically, all the foam rails are made of polyurethane foam. Not all foam rails may be made of the same material. In some embodiments, the first and second foam rails may be made of a different foam than the third and fourth foam rails.

As best shown in FIG. 1C, the partially foam encased pocketed spring assembly 10 further comprises a pocketed spring interior 44 comprising a first string 46', a last string 46" and interior strings 46 of pocketed springs between the first and last strings. Each of the strings 46', 46, 46" is approximately the same length as the length of the first and second foam rails 16, 18 and extends in the same direction as the first and second foam rails 16, 18.

As best shown in FIG. 1A, each string 46', 46, 46" comprises individual coil springs 48 inside individual pockets 50, as is known in the industry. In this embodiment, the strings 46, 46', 46" of the pocketed spring interior 44 extend longitudinally in a direction parallel to the first and second foam rails 16, 18. Although the drawings show coil springs, other springs may be used of any desired size and shape. The drawings are not intended in any way to limit the size or shape of the coil springs. The coil springs are each preferably made of metal but may be made of any desired material. In place of the individual coil springs 46, any resilient member such as one or more pieces of foam may be located inside each individual pocket 50.

As best shown in FIG. 1B, adjacent strings 46 of the pocketed spring interior 44 are glued to each other with three lines of glue 52. As best shown in FIG. 1A, each of the strings 46', 46, 46" of the pocketed spring interior 44 is glued to the lower and upper substrate sheets 12, 14 with glue lines 54. Although three lines of glue 52 are illustrated connecting adjacent strings, any number of lines of glue may be used.

As best shown in FIG. 1A, a first string 46' of the pocketed spring interior 44 is glued to the first foam rail 16 with three lines of glue 56. Similarly, a last string 46" of the pocketed spring interior 44 is glued to the second foam rail 18 with three glue lines 56. Although three lines of glue 56 are illustrated connecting the first and last strings 46', 46" to the first and second foam rails 16, 18, respectively, any number of lines of glue may be used. Although three lines of glue are shown throughout this document, any number of lines of glue may be used.

For purposes of this document, in any of the embodiments shown or described herein, any of the lines of glue need not be continuous; the line of glue may be segmented or a series of dots or beads.

In some embodiments, the lines of glue 52, lines of glue 56 and/or lines of glue 160 may be omitted.

As seen in FIG. 1C, the four foam rails 16, 18, 30, 32 create an edge area or region 60 surrounding the pocketed spring interior 44. Inside the edge area 60 is a center area 62 which is shown formed of strings of pocketed springs but may include at least additional foam rails.

Figure 2:
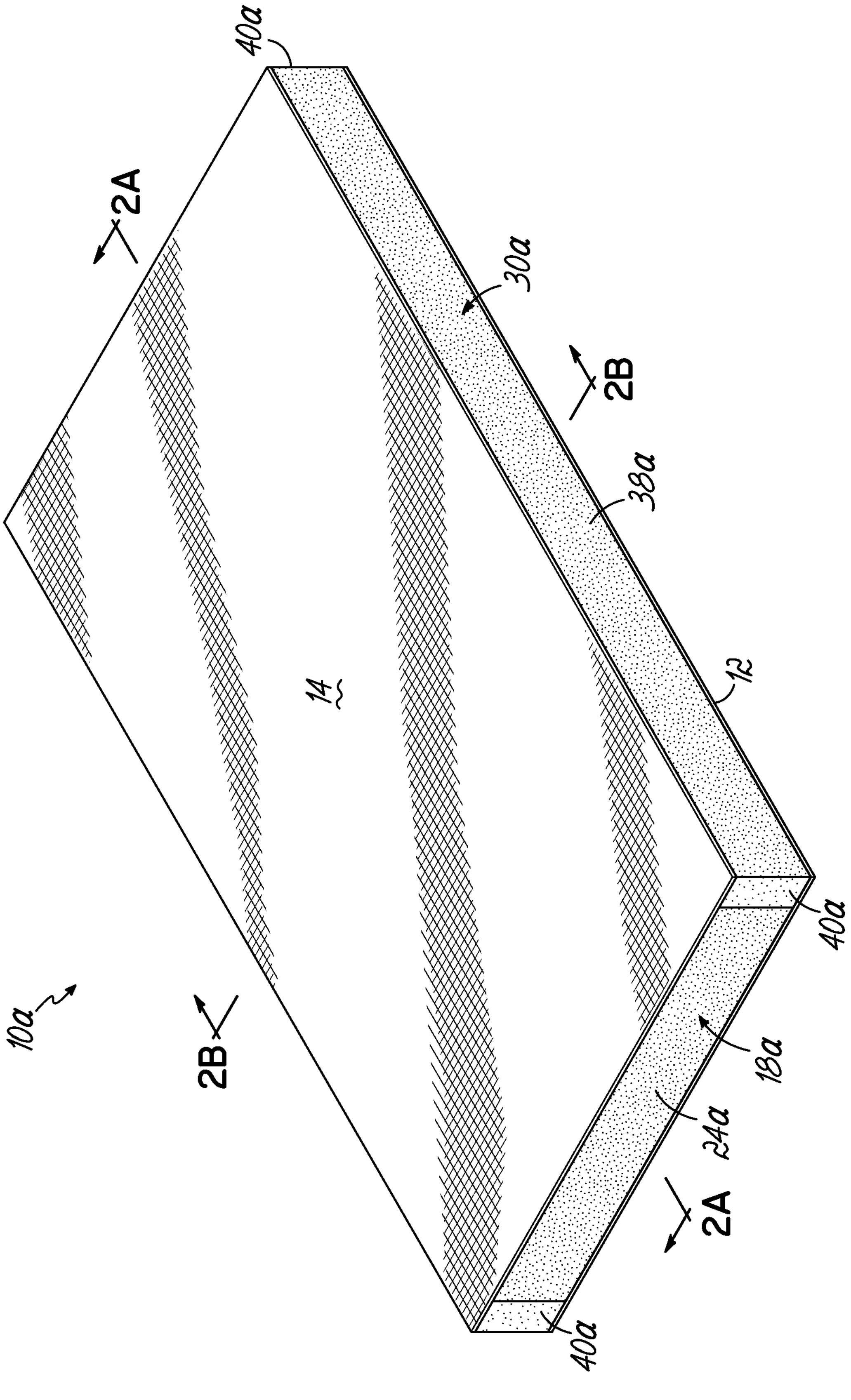
FIG. 2 is a perspective view of an alternative partially foam encased pocketed spring assembly build in accordance with the principals disclosed herein.
Figure 2A:
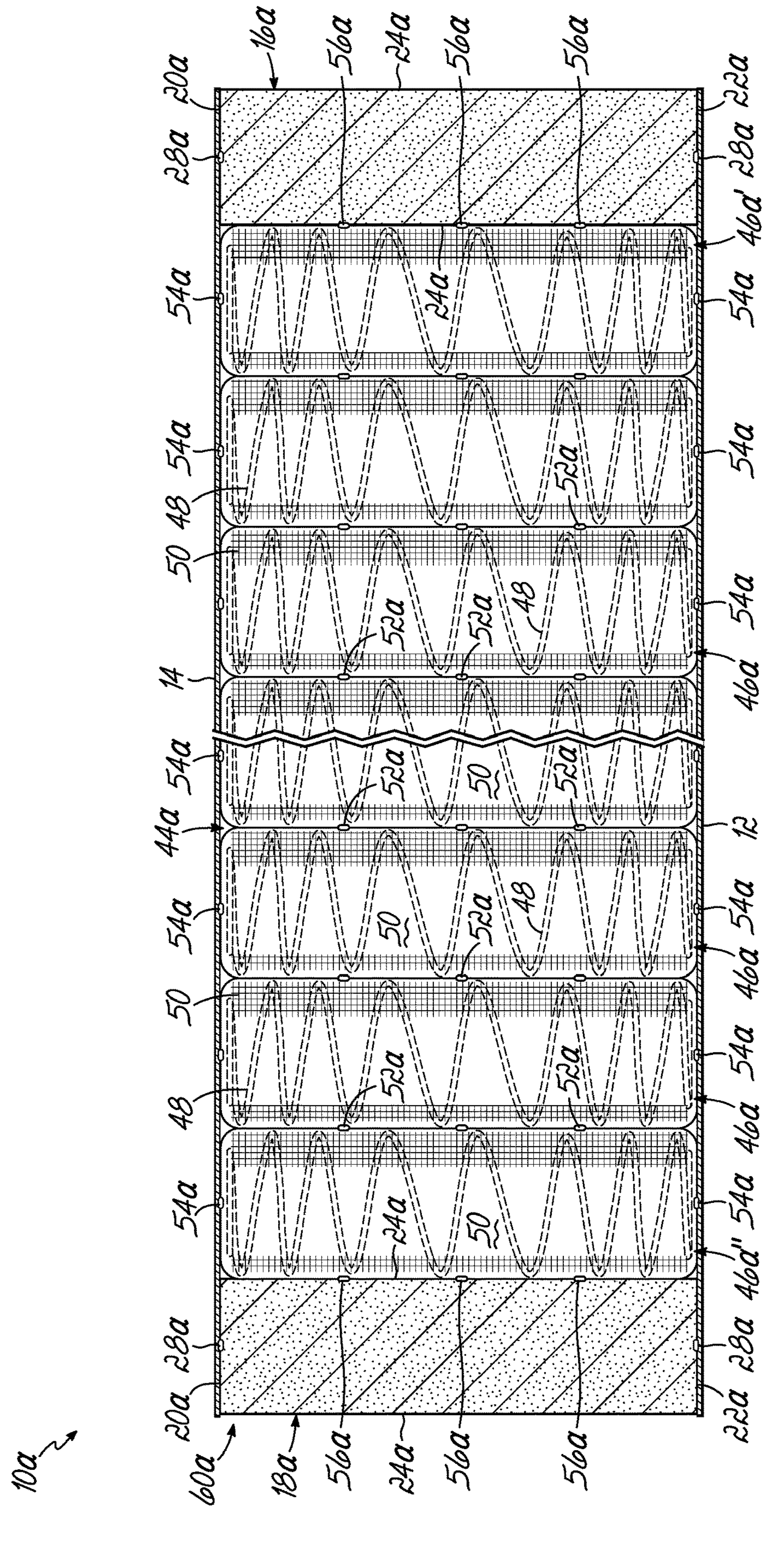
FIG. 2A is a cross-sectional view taken along the line 2A-2A of FIG. 2.
Figure 2B:
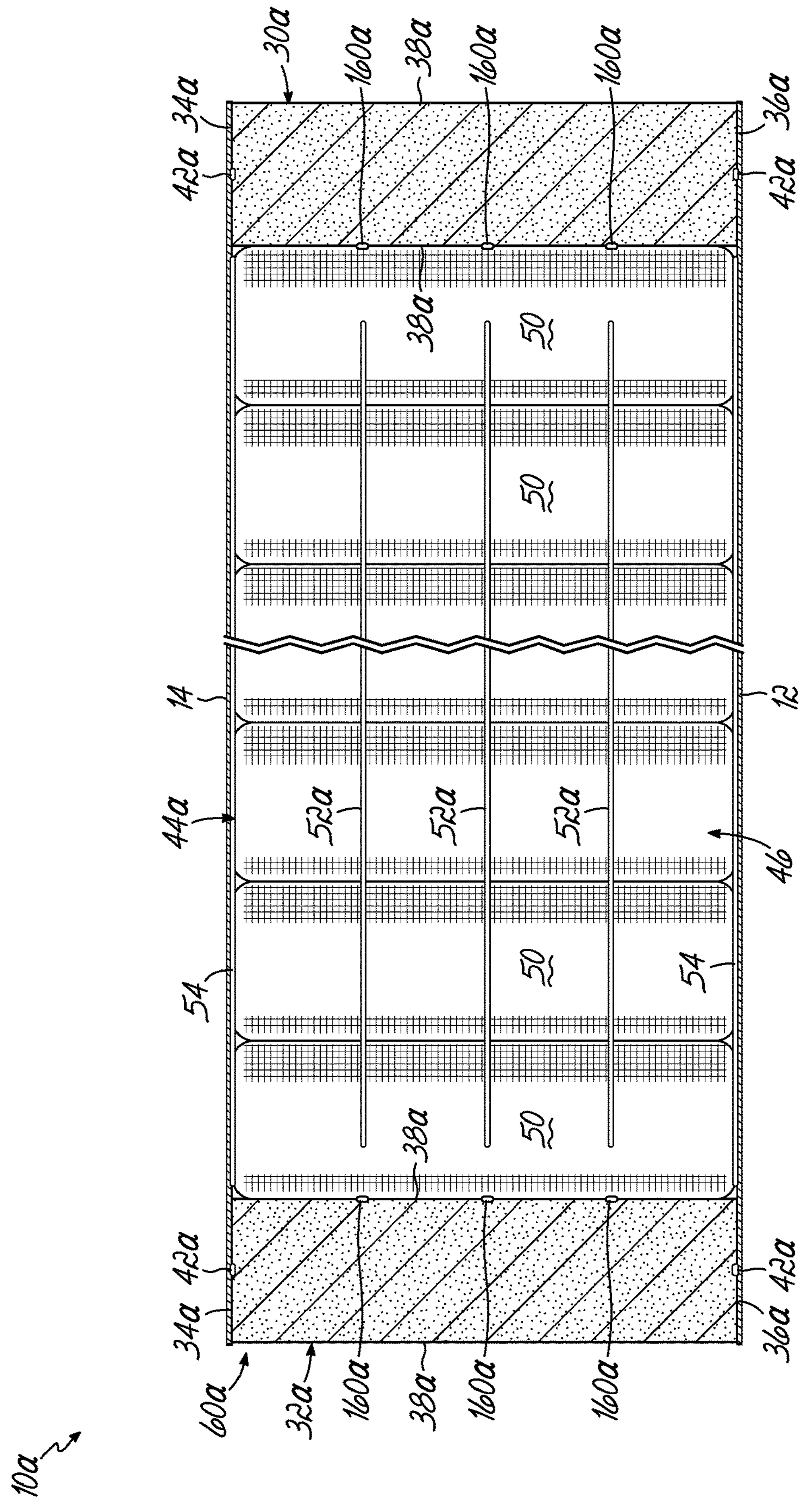
FIG. 2B is a cross-sectional view taken along the line 2B-2B of FIG. 2.
Figure 2C:
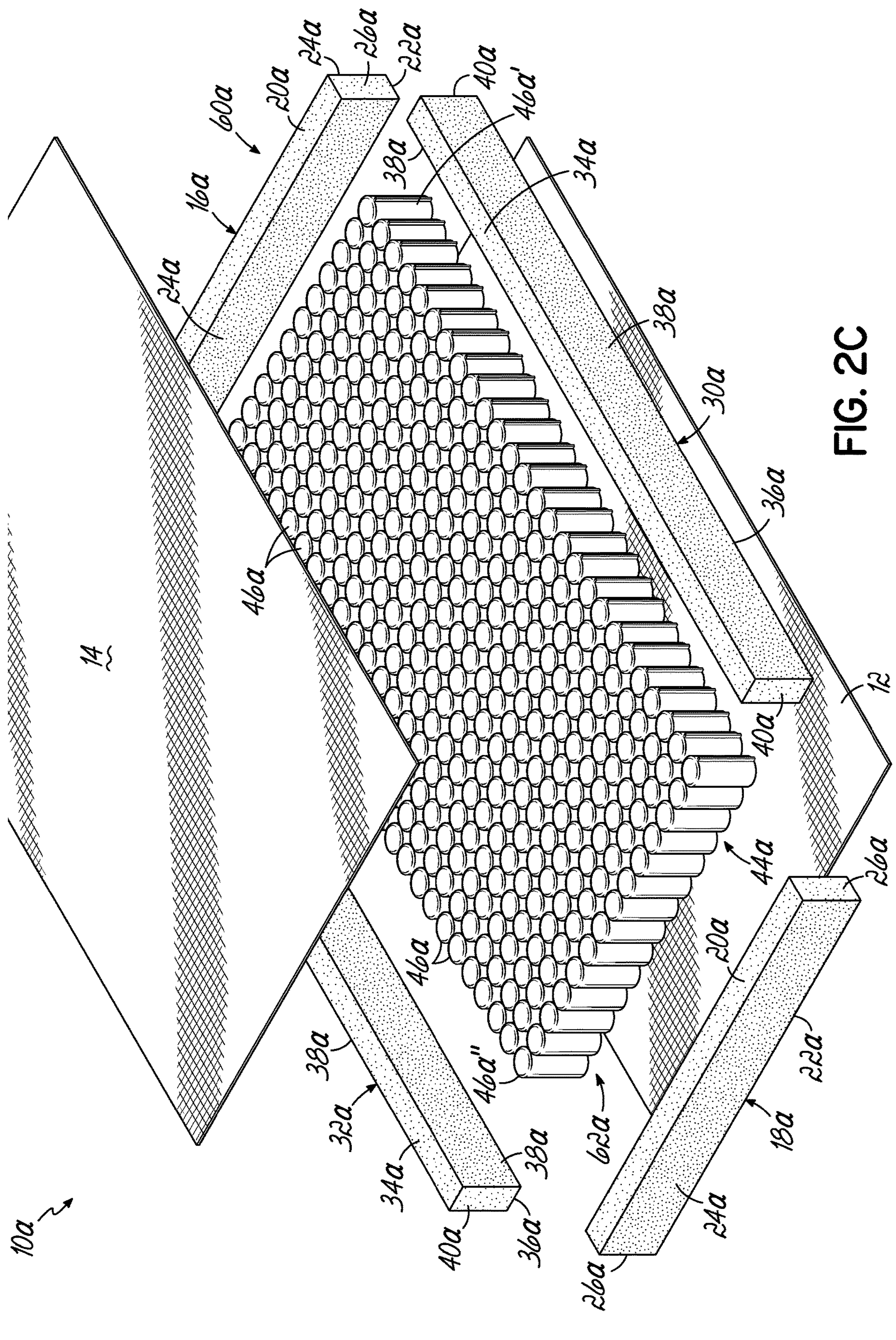
FIG. 2C is a partially disassembled view of the partially foam encased pocketed spring assembly of FIG. 2.

FIGS. 2-2C illustrate another embodiment of partially foam encased pocketed spring assembly **10*a* made in accordance with the present invention. As best shown in FIG. 2C, the partially foam encased pocketed spring assembly 10*a* comprises a lower substrate sheet 12 and an upper substrate sheet 14**, as described above.

The partially foam encased pocketed spring assembly **10*a* further comprises a first foam rail 16*a* and a second foam rail 18*a* which are spaced apart, extend parallel to each other and have the same cross-sectional configuration. The first and second foam rails 16*a*, 18*a* are approximately the same length. As best shown in FIG. 2C, each of the first and second foam rails 16*a*, 18*a* has a top surface 20*a*, a bottom surfaces 22*a*, side surfaces 24*a* and end surfaces 26*a*** (only one being shown).

As best shown in FIG. 2A, the top and bottom surfaces **20*a*, 22*a* of the first and second foam rails 16*a*, 18*a*, respectively, are glued to the lower and upper substrate sheets 12, 14, respectively, with glue lines 28*a*.**

The partially foam encased pocketed spring assembly **10*a* further comprises a third foam rail 30*a* and a fourth foam rail 32*a* which are spaced apart, extending parallel each other and have the same cross-sectional configuration. The third and fourth foam rails 30*a*, 32*a* are approximately the same length, longer than the length of the first and second foam rails 16*a*, 18*a*.**

In the embodiment illustrated, the cross-sectional configuration of all the four foam rails is identical. However, it is within the scope of the present invention that the cross-sectional configuration of the third and fourth foam rails is different than the cross-sectional configuration of the first and second foam rails. As best shown in FIG. 2C, each of the third and fourth foam rails **30*a*, 32*a* has a top surface 34*a*, a bottom surface 36*a*, side surfaces 38*a* and end surfaces 40*a*** (only one being shown).

As best shown in FIG. 2B, the top surfaces 34*a* of the third and fourth foam rails 30*a*, 32*a*, respectively, are glued to the lower and upper substrate sheets 12, 14 with glue lines 42*a*. As best shown in FIG. 2, in most instances, the end surfaces 26*a* of the first and second foam rails 16*a*, 18*a* are glued to one of the side surfaces 38*a* of the third and fourth foam rails 30*a*, 32*a*, respectively.

Any of the foam rails, 16*a*, 18*a*, 30*a*, 32*a* may be made of any desired foam. Typically, all the foam rails are made of polyurethane. Not all foam rails may be made of the same material. In some embodiments, the first and second foam rails may be made of a different foam than the third and fourth foam rails.

As best shown in FIG. 2C, the partially foam encased pocketed spring assembly 10*a* further comprises a pocketed spring interior 44*a* comprising strings 46*a* of pocketed springs. In this embodiment, the first string 46*a*', middle strings 46*a*, and last string 46*a*" of the pocketed spring interior 44*a* extend in a direction parallel to the first and second foam rails 16*a*, 18*a*. As best shown in FIG. 2A, each string 46*a*, 46*a*', 46*a*" comprises individual coil springs 48 inside individual pockets 50, as described above and known in the industry. Although the drawings show coil springs, other springs may be used of any desired size and shape. The drawings are not intended in any way to limit the size or shape of the coil springs.

As best shown in FIG. 2B, adjacent strings 46*a* of the pocketed spring interior 44*a* are glued to each other with three lines of glue 52*a*. As best shown in FIG. 2A, each of the strings 46*a*', 46*a*, 46*a*" of the pocketed spring interior 44*a* is glued to the lower and upper substrate sheets 12, 14 with glue lines 54*a*. Although three lines of glue 52*a* are illustrated connecting adjacent strings 46*a*', 46*a*, 46*a*", any number of lines of glue may be used.

As best shown in FIG. 2A, a first string 46*a*' of the pocketed spring interior 44*a* is glued to the first foam rail 16*a* with three lines of glue 56*a*. Similarly, a last string 46*a*" of the pocketed spring interior 44*a* is glued to the second foam rail 18*a* with three glue lines 56*a*. Although three lines of glue 56*a* are illustrated connecting the first and last strings 46*a*', 46*a*" to the first and second foam rails 16*a*, 18*a*, respectively, any number of lines of glue may be used.

As best shown in FIG. 2B, the top surface 34*a* of each of the third and fourth foam rails 30*a*, 32*a*, respectively, is glued to the lower and upper substrate sheets 12, 14 with glue lines 42*a*. As best shown in FIG. 2, in most instances, the end surfaces 26*a* of the first and second foam rails 16*a*, 18*a* are glued to one of the side surfaces 38*a* of the third and fourth foam rails 30*a*, 32*a*, respectively. As best shown in FIG. 2A, a side surface 38*a* of each of the third and fourth foam rails 30*a*, 32*a*, respectively, is glued to end surfaces of strings 46*a*', 46*a*, and 46*a*" with three lines of glue 160*a*.

Together, the four foam rails 16*a*, 18*a*, 30*a*, 32*a* create an edge area or region 60*a* surrounding the pocketed spring interior 44*a*. Inside the edge area 60*a* is a center area 62*a* which is shown formed of strings of pocketed springs but may include at least some additional foam rails.

Figure 3:
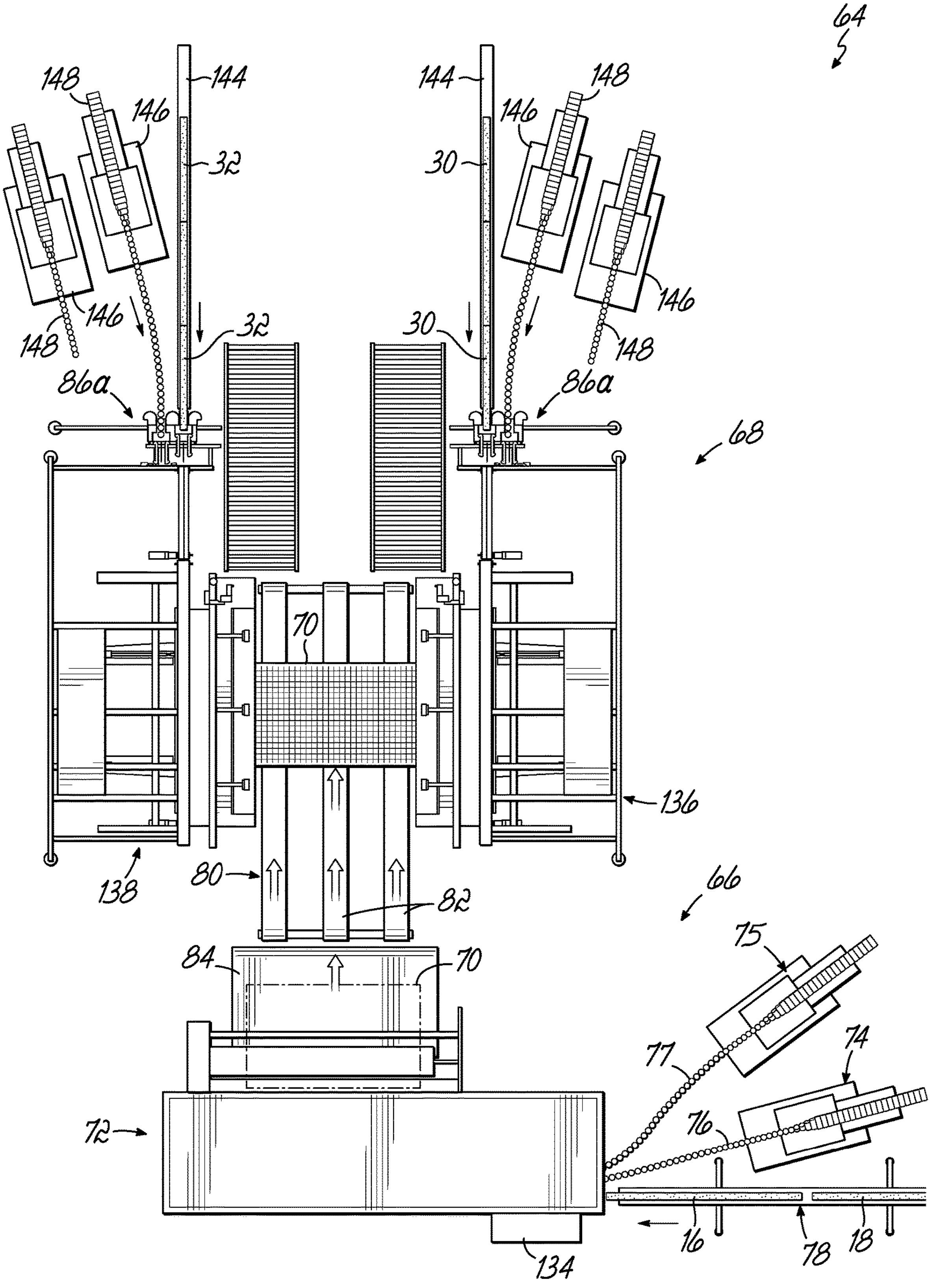
FIG. 3 is a top view of the assembly machine described herein.

FIG. 3 shows an assembly machine 64 for manufacturing a partially foam encased pocketed spring assembly, such as those 10, 10*a* shown in FIGS. 1-1C and 2-2C. Although the assembly machine 64 and method of using the assembly machine 64 are described as constructing partially foam encased pocketed spring assembly 10 shown in FIGS. 1-1C, it is within the scope of this document that any partially foam encased pocketed spring assembly within the scope of the present document may be manufactured using the assembly machine 64 using the methods described herein.

The assembly machine 64 comprises a first station 66 for manufacturing a core 70 and a second station 68 downstream of the first station 66 for applying third and fourth foam rails 30, 32 to complete the partially foam encased pocketed spring assembly. A transport system 80 in the form of three transport belts 82 transfers the core 70 from the first station 66 to the second station 68.

The first station 64 comprises a front assembler 72, a first supply source 74 for supplying a continuous string 76 of pocketed springs to the front assembler 72, a second supply source 75 for supplying a continuous string 77 of pocketed springs to the front assembler 72 and at least one front loading tray 78 for loading first and second foam rails 16, 18 into the front assembler 72. Although only one front loading tray 78 is illustrated two or more front loading trays may be used to load the first and second foam rails 16, 18 as described herein.

Referring to FIG. 3, the front assembler 72 of the first station 64 comprises a user interface 134 for inputting the necessary parameters such as the specifications of the product to the produced. Although the user interface 134 is illustrated being in one location, it may be located at any other location. The user interface 134 communicates with a controller (not shown) which controls the operation of the elements of the assembly machine 64 including the elements described herein and those elements of the assembly machine 64 not specifically described herein.

Referring to FIG. 3, the front assembler 72 of the first station 64 further comprises two compression belts 84 (only the top compression belt being shown in FIG. 3) to move the core 70 downstream as the core 70 is being manufactured. During the manufacturing process the core 70 is slightly compressed. FIGS. 5A-5F illustrate the compression belts 84 extending around two front rollers 85 which are driven by one or more drivers 87 such as motors. See FIG. 5A.

Figure 4:
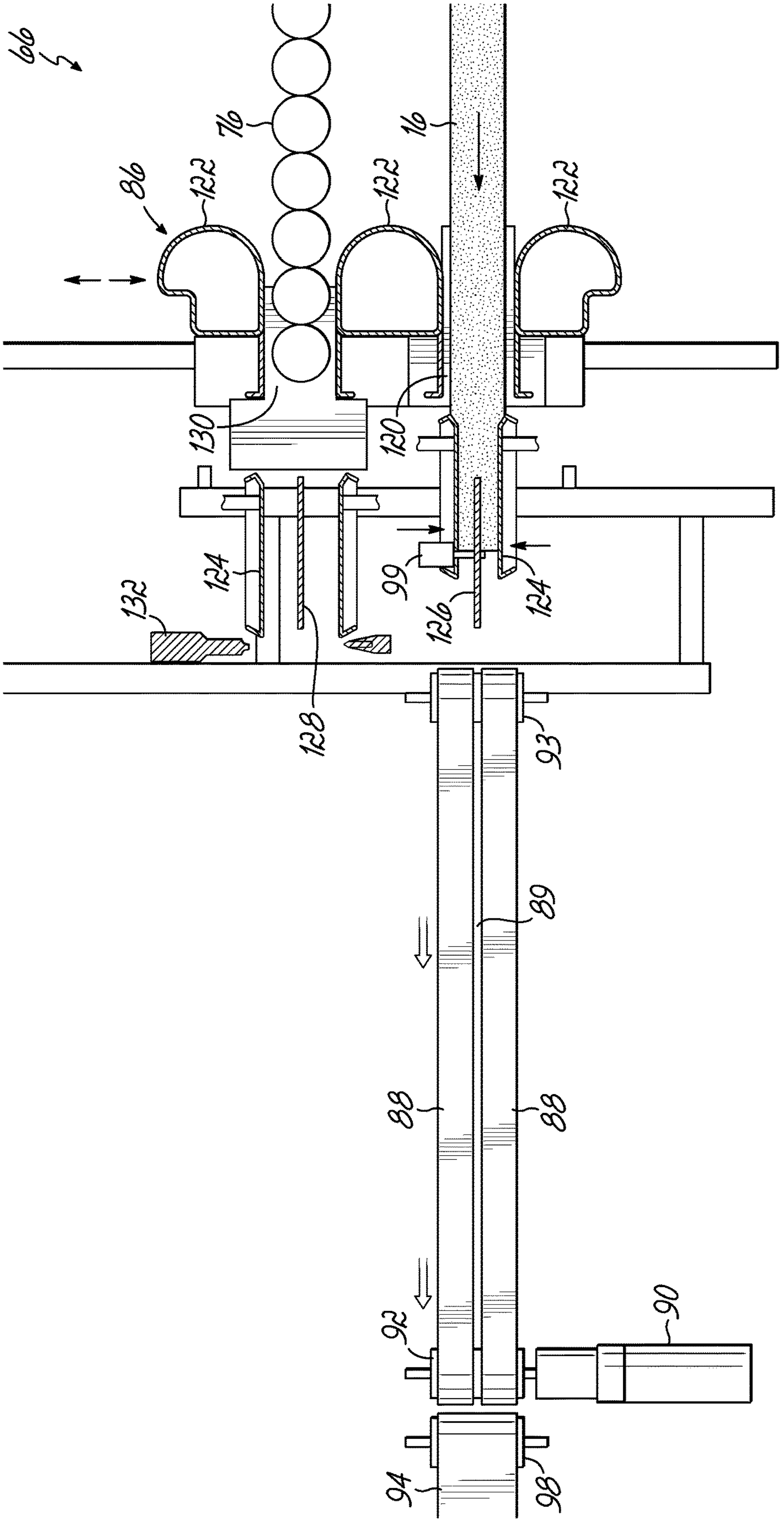
FIG. 4 is a top view of a portion of the front assembler of the assembly machine of FIG. 3.

As best shown in FIG. 4, the front assembler 72 of the first station 64 further comprises a movable front channel changer 86 with multiple channels (only two channels 120, 130 being shown). The front channel changer 86 moves to align either a first foam rail 16, a second foam rail 18, the continuous string 76 of pocketed springs or the continuous string 77 of pocketed springs with pre-feed belts 88 (only two of four being shown). As shown in FIG. 4, a pre-feed motor 90 drives the pre-feed belts 88 by rotating a drive pre-feed roller 92. The pre-feed belts 88 rotate a driven pre-feed roller 93.

As best shown in FIG. 4, the movable front channel changer 86 includes a first channel 120 between bumpers 122 in which a foam rail 16 is shown compressed between two clamp plates 124. As shown in FIGS. 7A-7D, grippers 126 grab the foam rail 16 and pull it between the pre-feed rollers 88. As best shown in FIG. 4, the movable front channel changer 86 further comprises a second channel 130 between bumpers 122 though which a continuous string of springs 76 passes. The movable front channel changer 86 further comprises additional grippers 128 for grabbing the continuous string of springs 76 and pulling the string to a position between the pre-feed rollers 88. A cutter 132 cuts the continuous string of springs 76 to a desired length. Although not shown, the movable front channel changer 86 may have more bumpers and consequently more channels for additional strings of pocketed springs such as string 77 shown in FIG. 3.

Figure 4A:
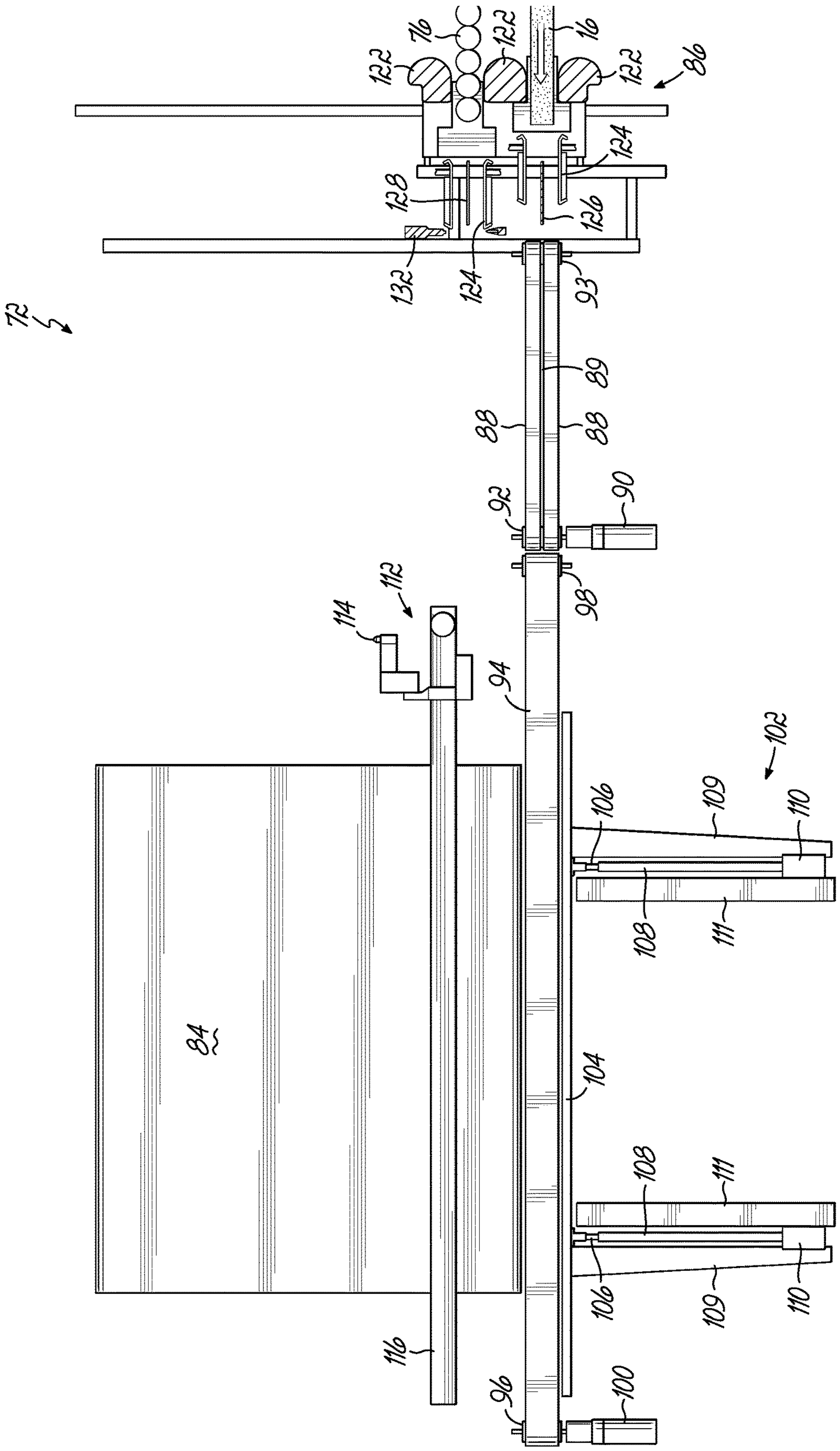
FIG. 4A is a top view of a portion of the front assembler of the assembly machine of FIG. 3 showing a first foam rail being introduced into the front assembler.

As best shown in FIG. 4A, the front assembler 72 of the first station 64 further comprises two infeed belts 94 (only one being shown) extending in a first direction, each infeed belt 94 extending around a drive infeed roller 96 and a driven infeed roller 98. The drive infeed roller 96 is driven by an infeed motor 100. The infeed belts 94 are aligned with the pre-feed belts 88 and provide a pathway for the incoming pieces, either the foam rails or strings of springs to travel to a loading position inside the front assembler 72 of the assembly machine 64.

Figure 4B:
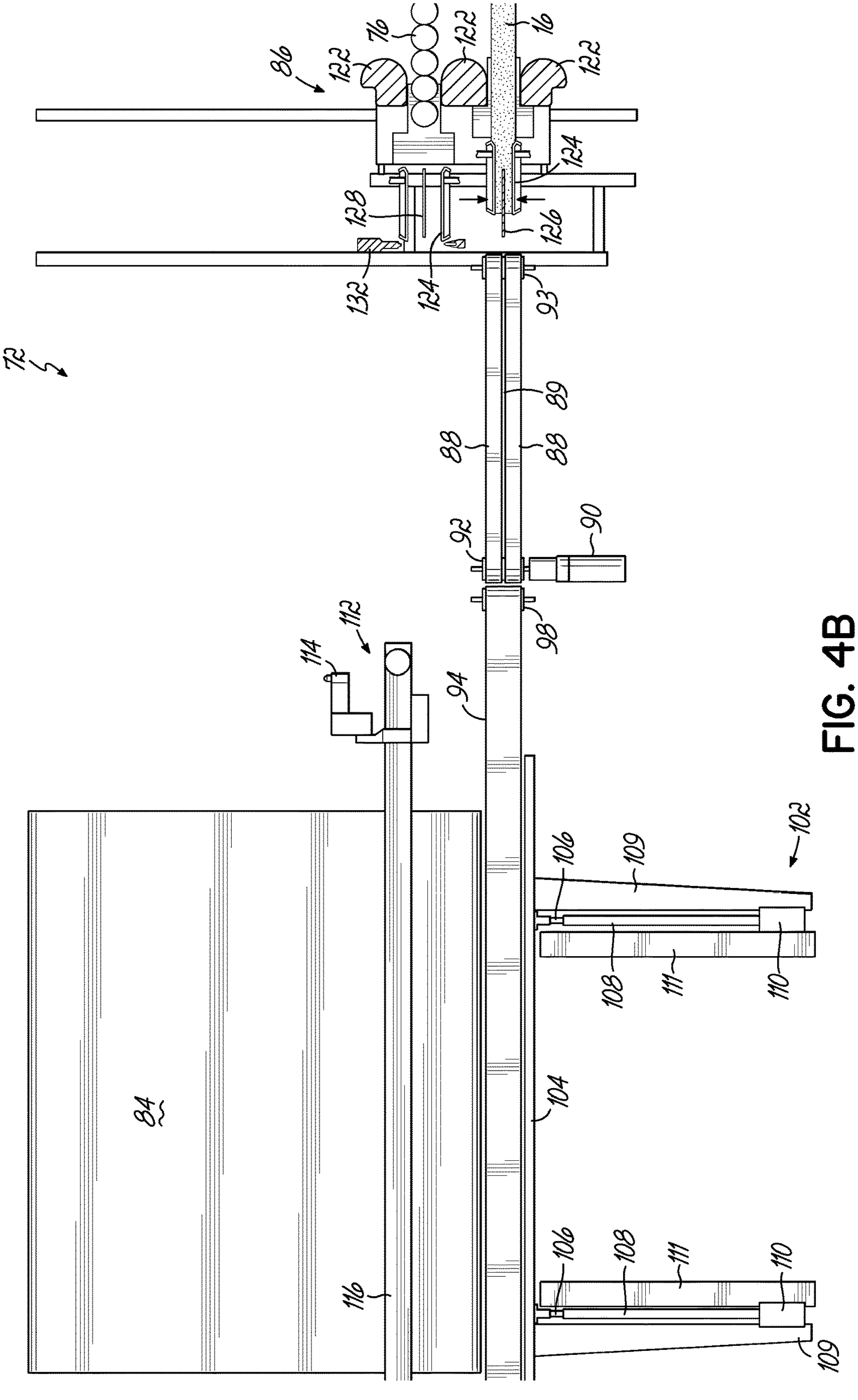
FIG. 4B is a top view of a portion of the assembly machine of FIG. 3 showing a first foam rail being compressed before being moved into the front assembler.
Figure 4C:
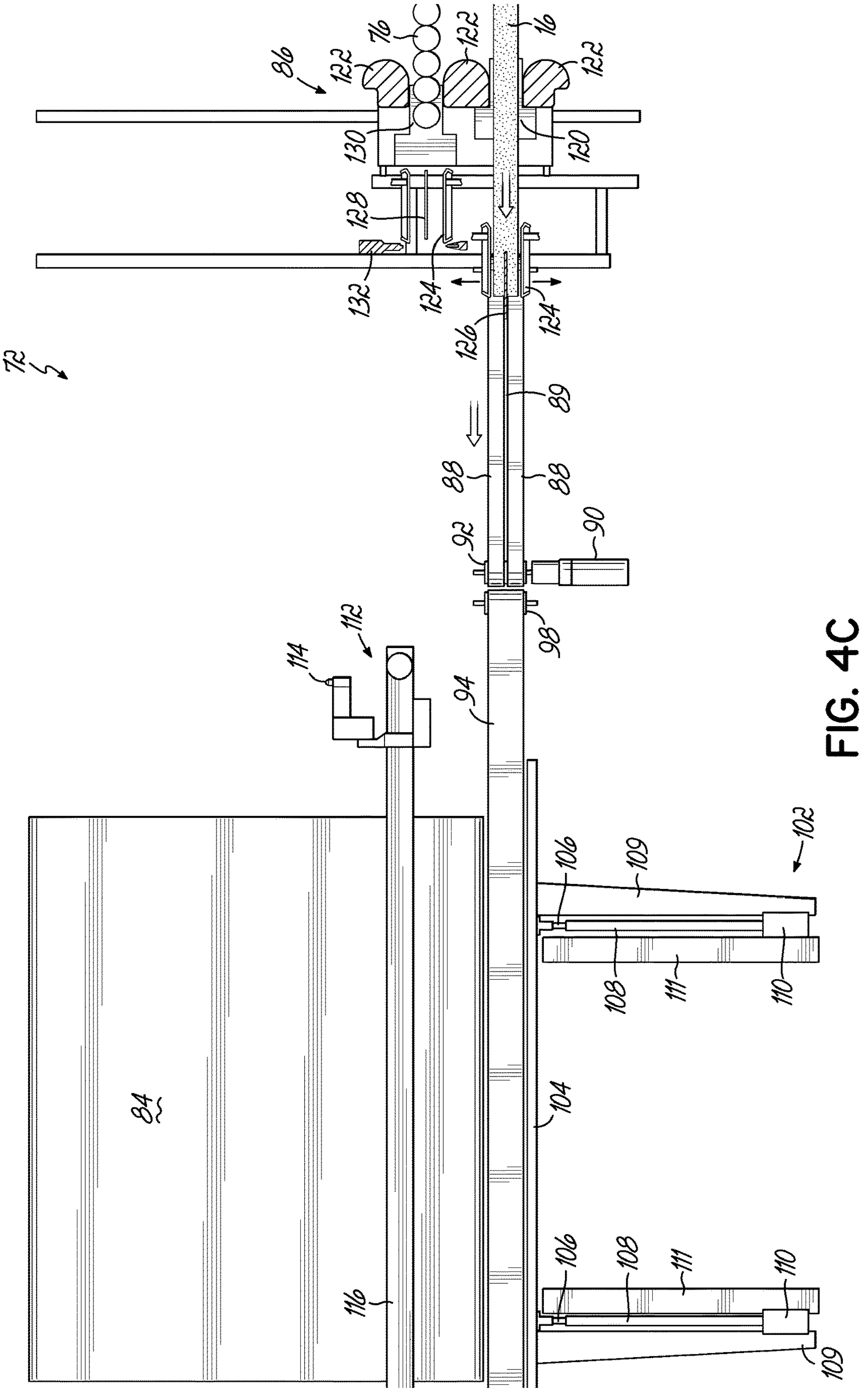
FIG. 4C is a top view of a portion of the assembly machine of FIG. 3 showing the foam rail being moved onto prefeed belts of the front assembler.

As best shown in FIGS. 5A-5F, the front assembler 72 of the assembly machine 64 further comprises a front pusher assembly 102 having three pushers 104, each pusher 104 being connected to an end of two rods 108. Each rod 108 has an adjuster 106 at one end and is secured to a movable post 110. Each post 110 is movable by a driver 111 which may include a motor driven belt. As best shown in FIG. 4C, each pusher 104 is supported by two arms 109 which the driver 111 moves back and forth relative to the stationary driver 111. Although one configuration of pusher assembly is illustrated, the drawings are not intended to be limiting. The pusher assembly may assume other configurations, such as having only two pushers, for example.

Figure 4D:
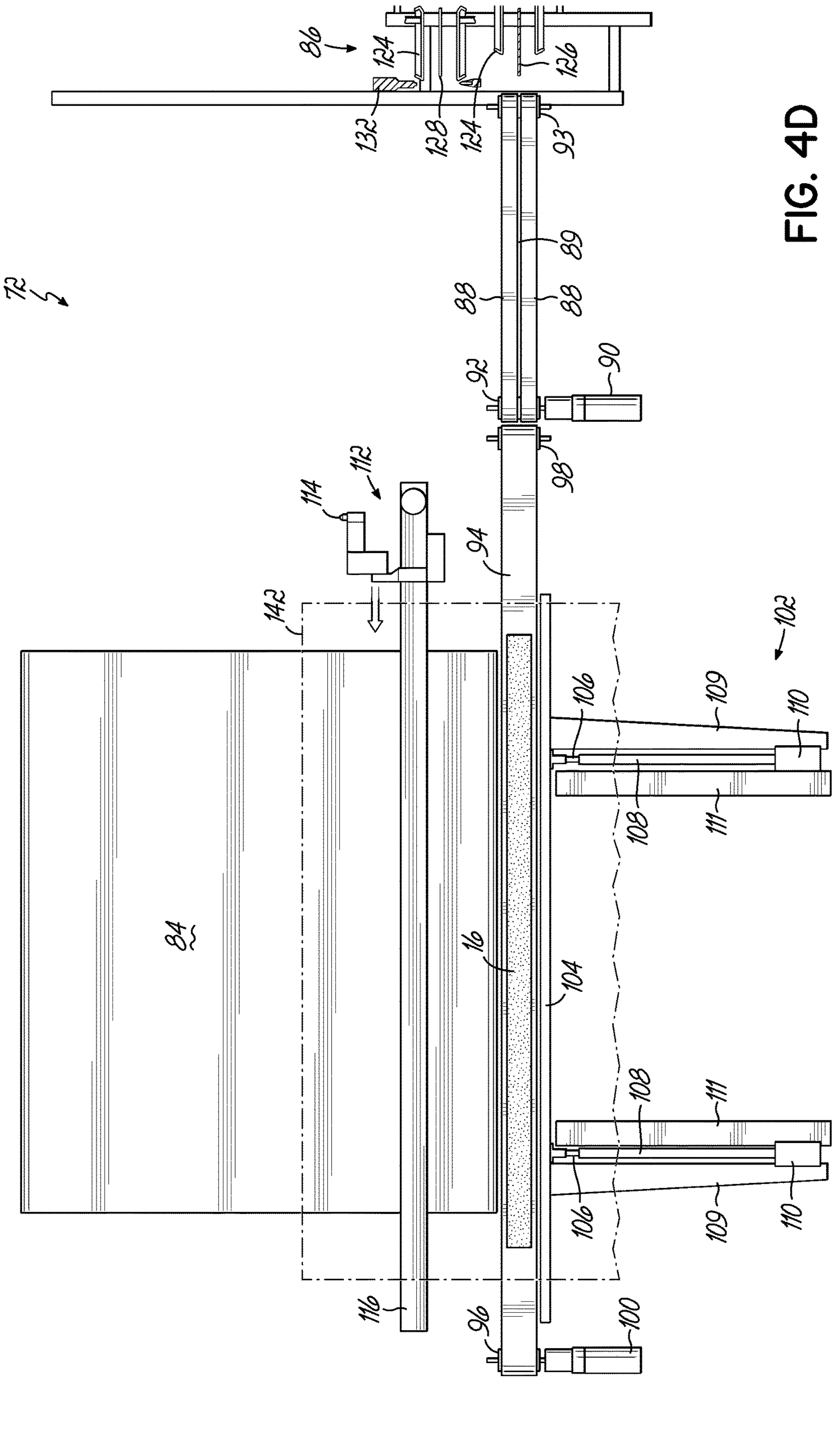
FIG. 4D is a top view of a portion of the front assembler of the assembly machine of FIG. 3 showing the foam rail in a loading position.
Figure 4E:
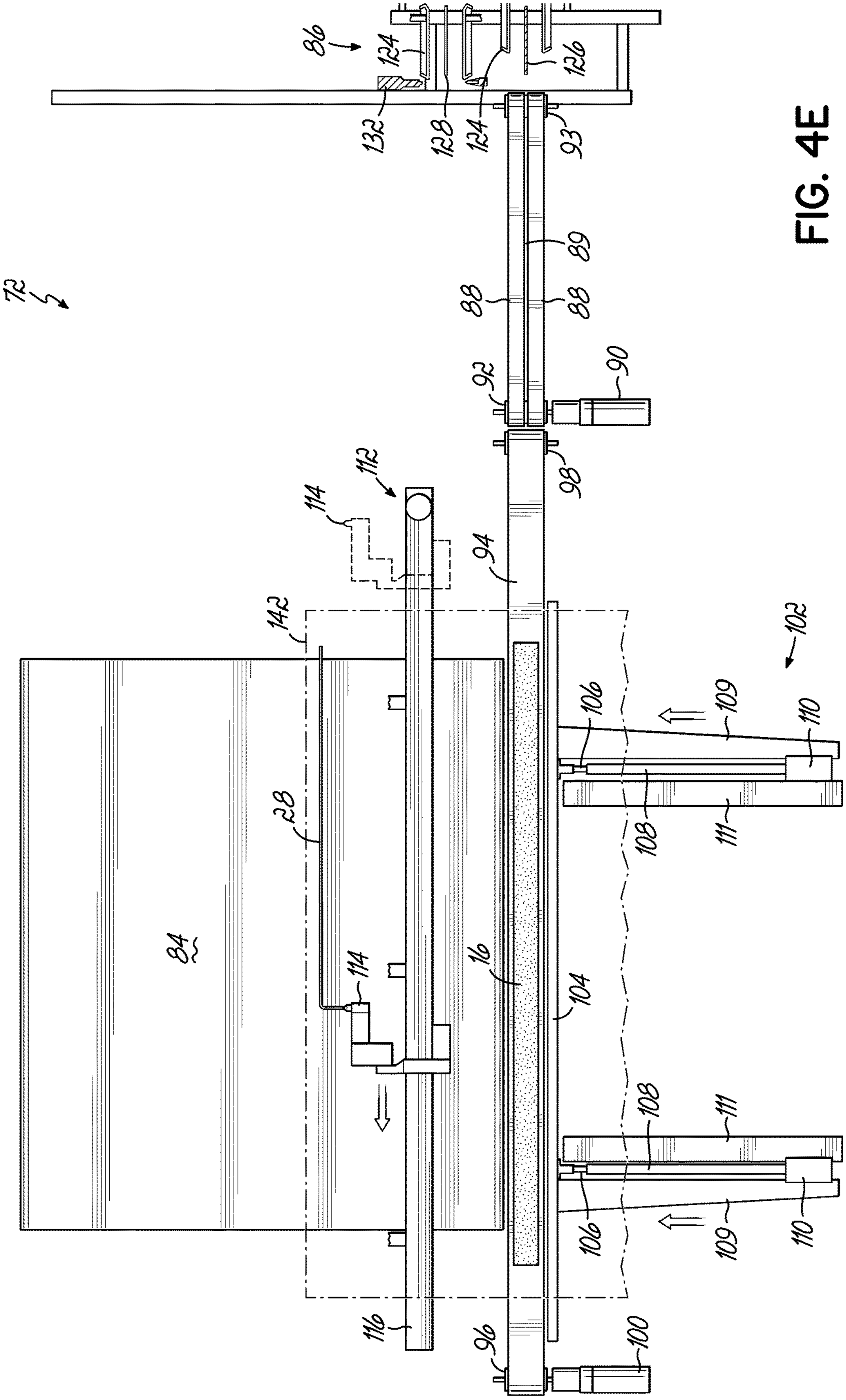
FIG. 4E is a top view of a portion of the front assembler of the assembly machine of FIG. 3 showing the foam rail in a loading position and the glue applicator of the front assembler applying glue to the upper and lower substrate webs.
Figure 4F:
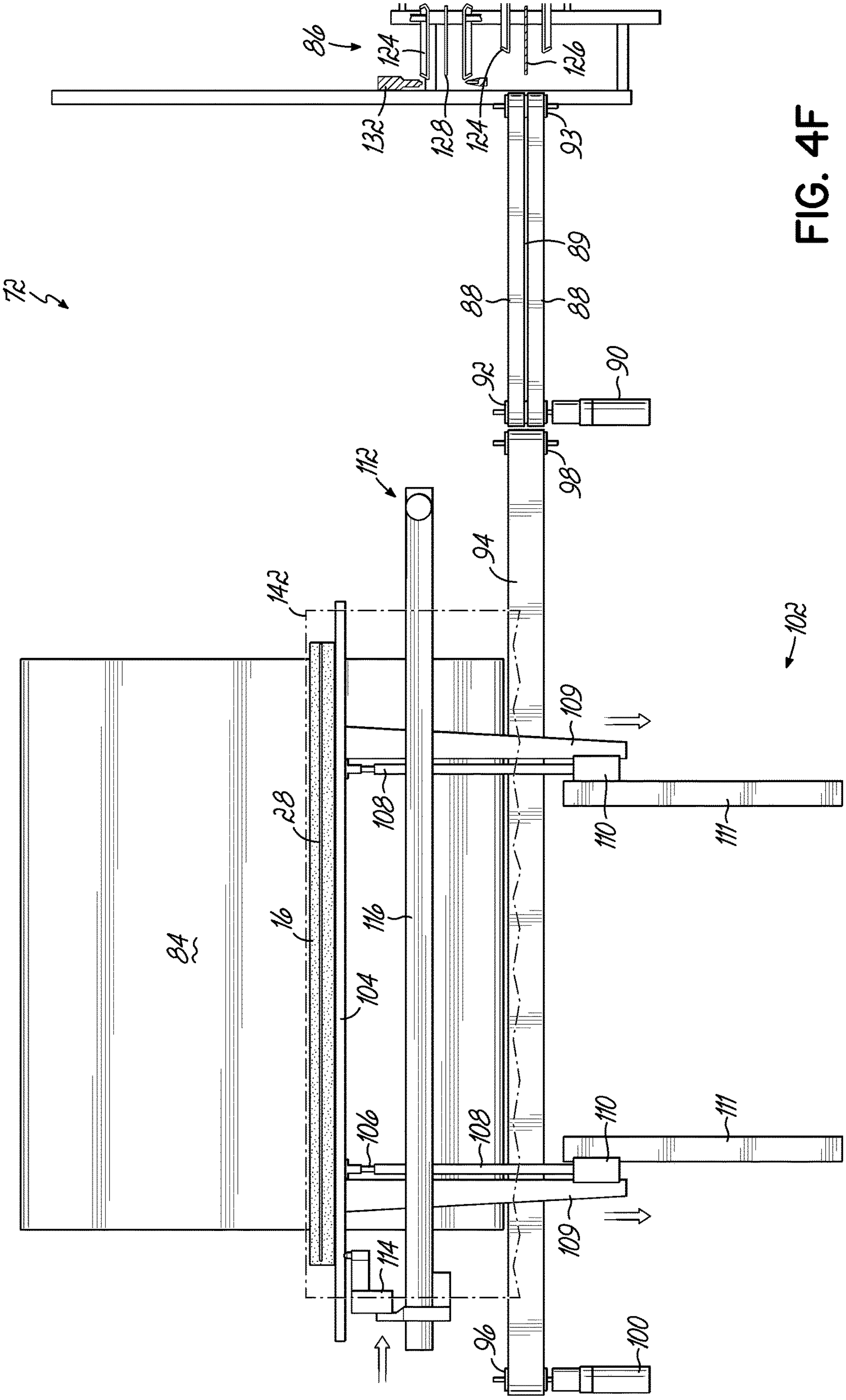
FIG. 4F is a top view of a portion of the front assembler of the assembly machine of FIG. 3 showing the pusher moving back to its home position and the front glue applicator moving back to its home position.
Figure 4G:
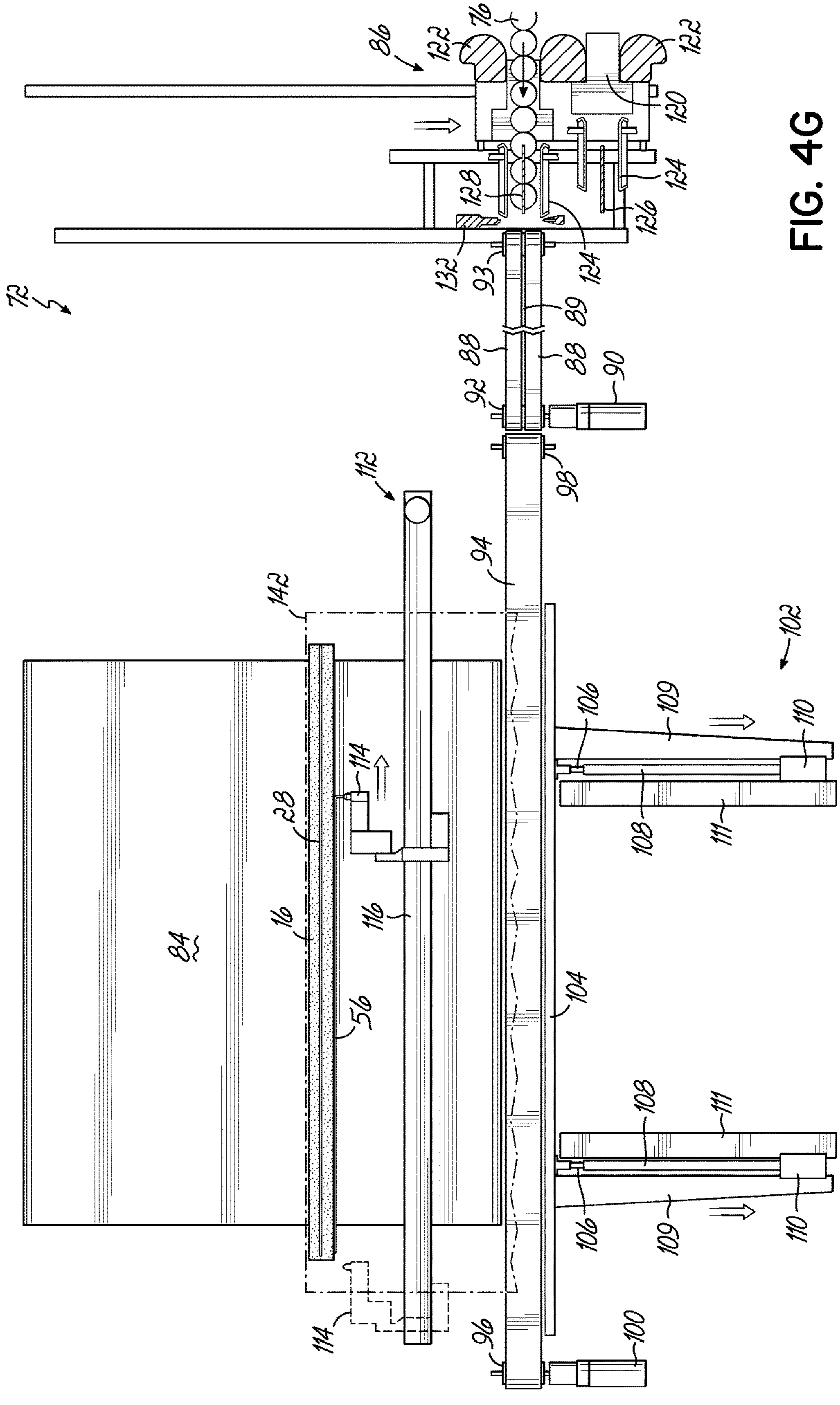
FIG. 4G is a top view of a portion of the front assembler of the assembly machine of FIG. 3 showing a channel changer moving such that a continuous string of pocketed springs is aligned with the infeed belts and the front glue applicator applying glue to a side surface of the first foam rail.
Figure 4H:
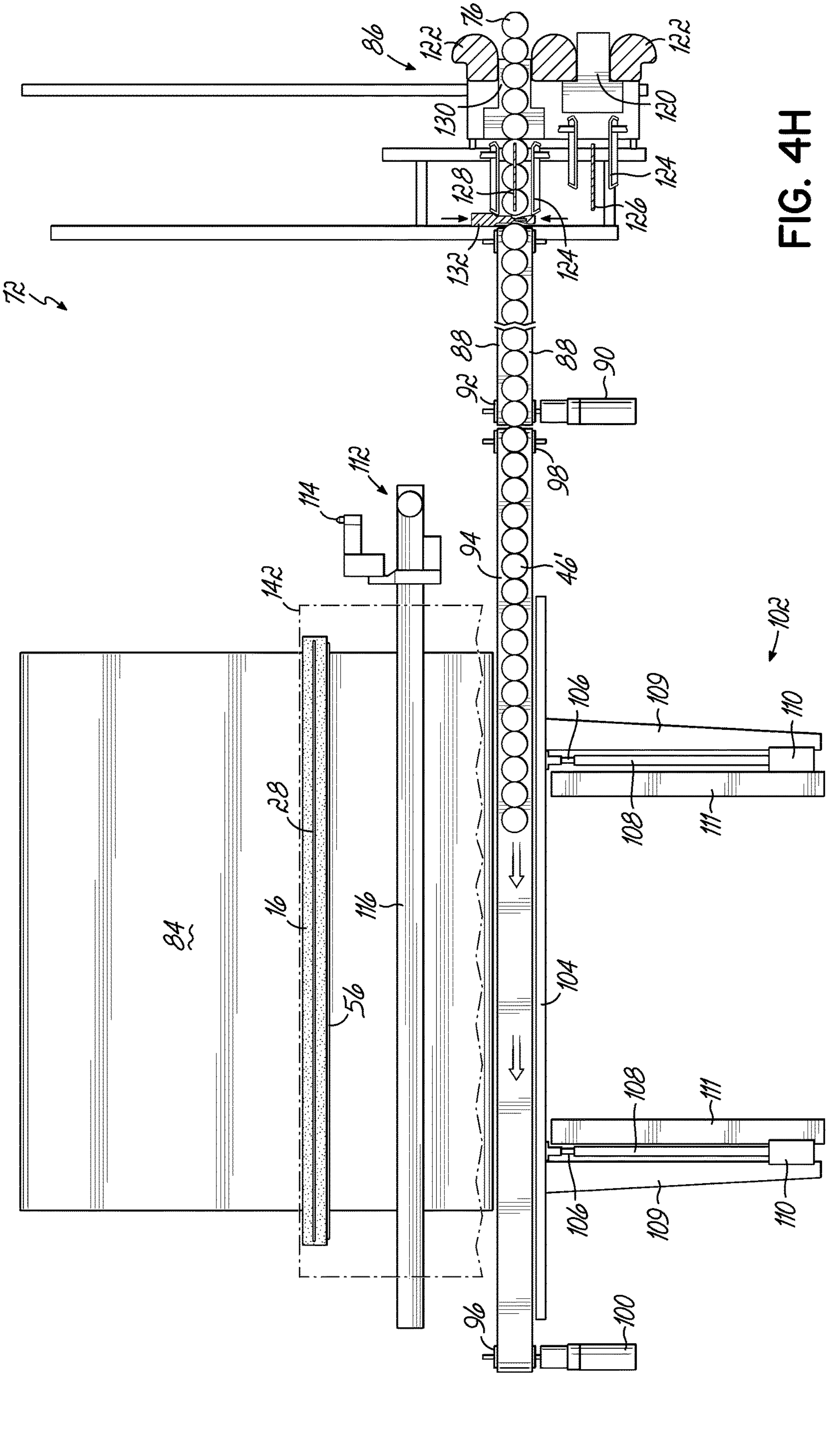
FIG. 4H is a top view of a portion of the front assembler of the assembly machine of FIG. 3 showing the continuous string of FIG. 4G being cut to a desired length to create a first string and being moved into its loading position using the infeed belts.
Figure 41:
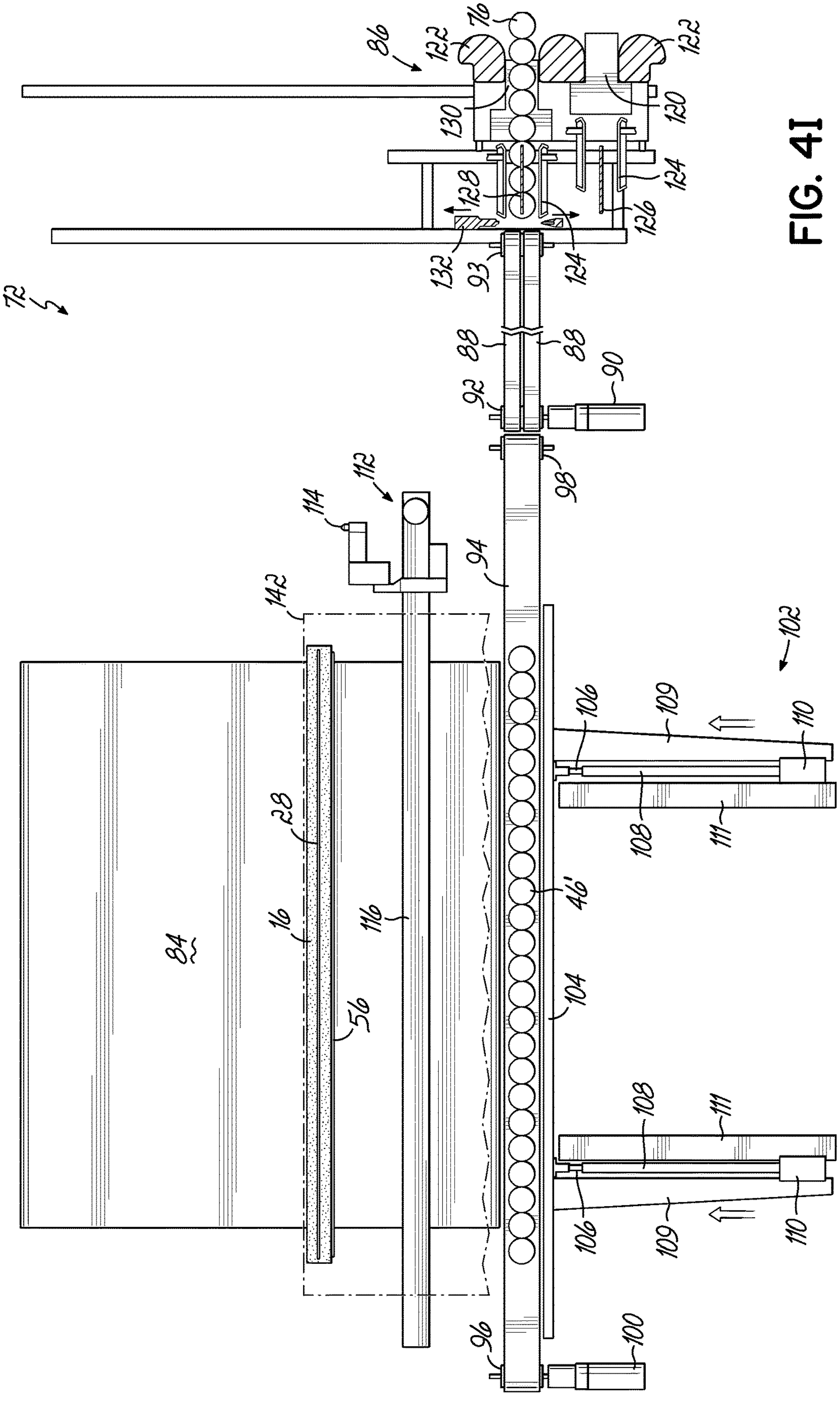
Figure 4J:
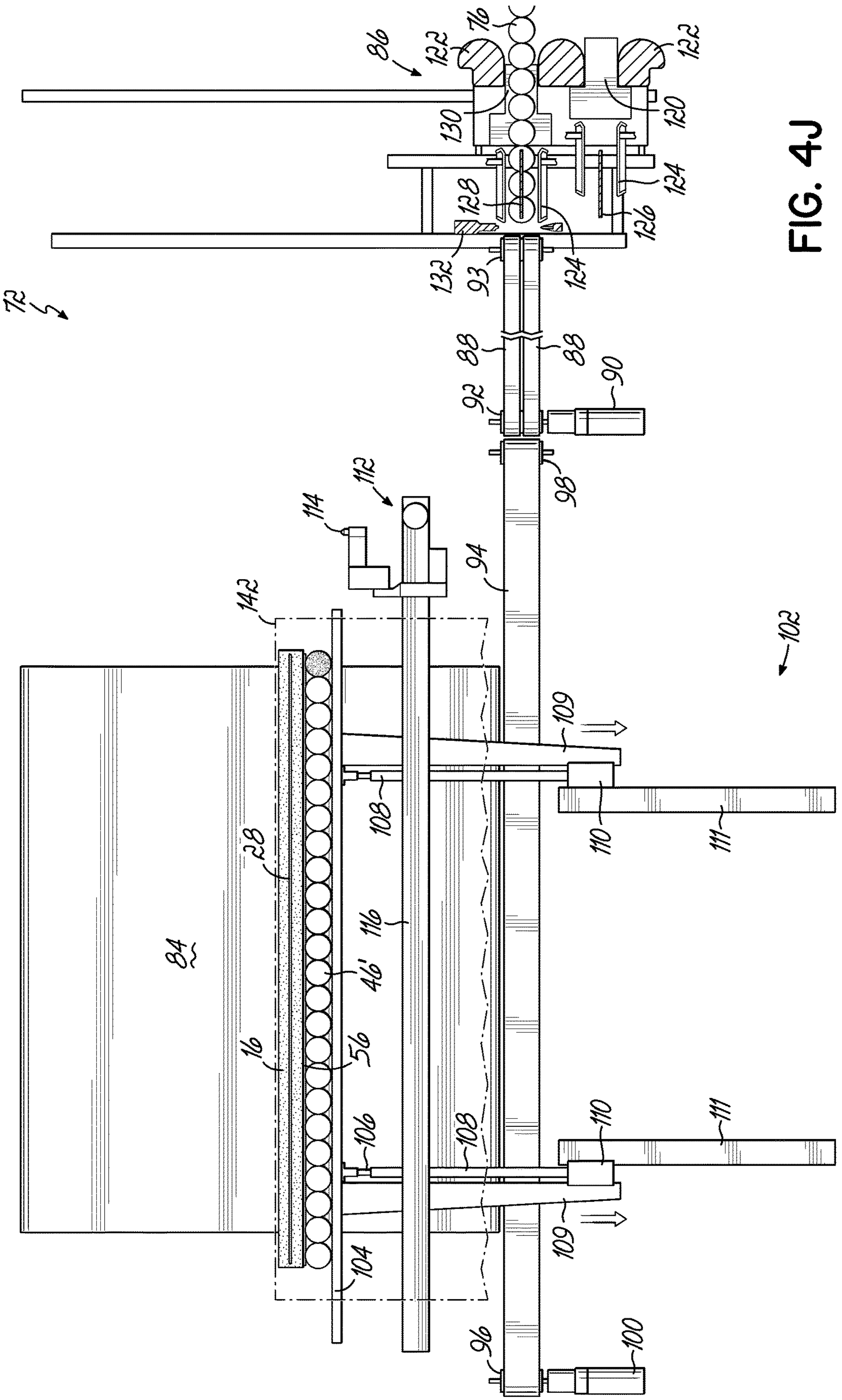
FIG. 4J is a top view of a portion of the front assembler of the assembly machine of FIG. 3 showing the first string abutting the first foam rail after having been pushed against the first foam rail.
Figure 4K:
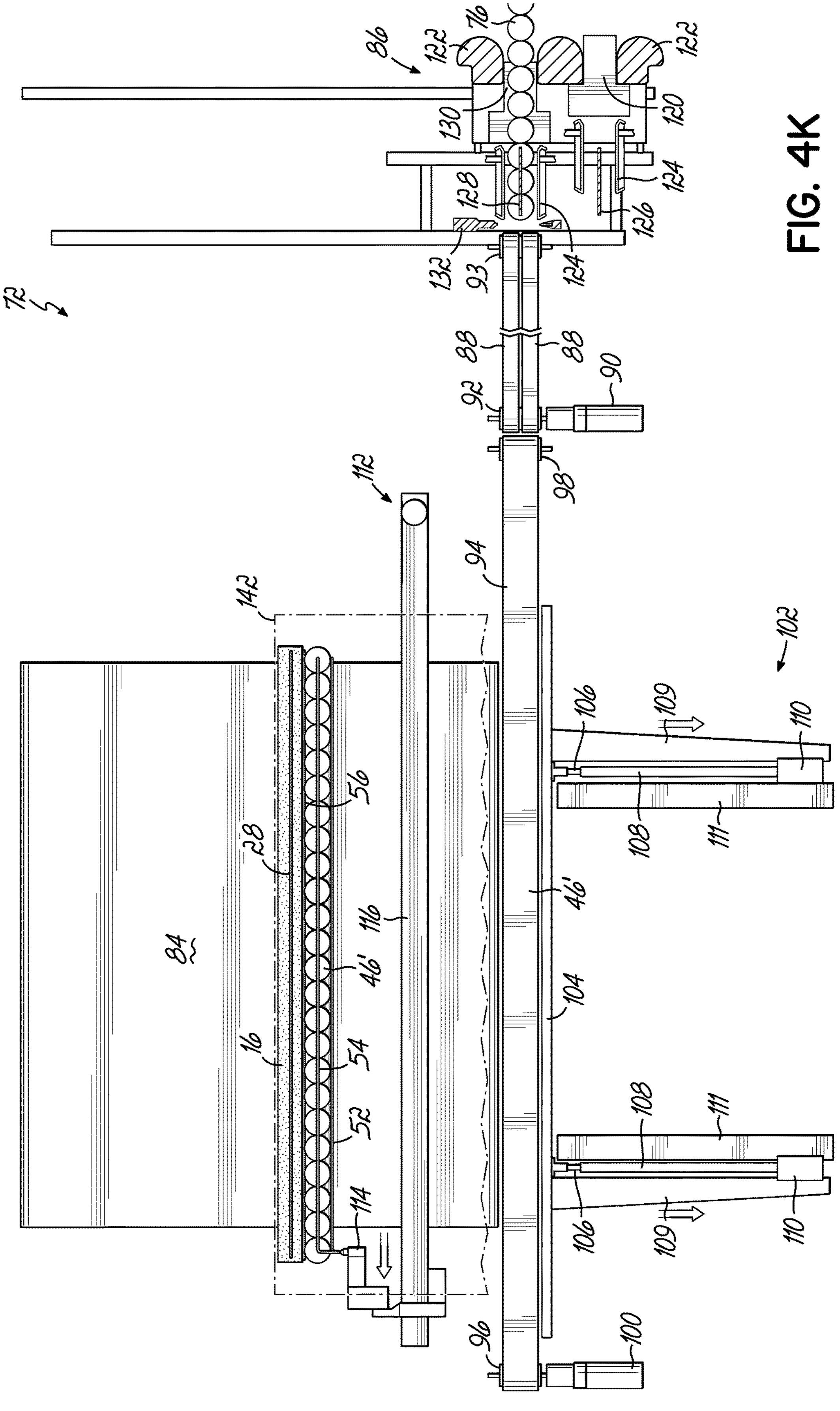
FIG. 4K is a top view of a portion of the front assembler of the assembly machine of FIG. 3 showing the front glue applicator having applied glue to the first string.
Figure 4L:
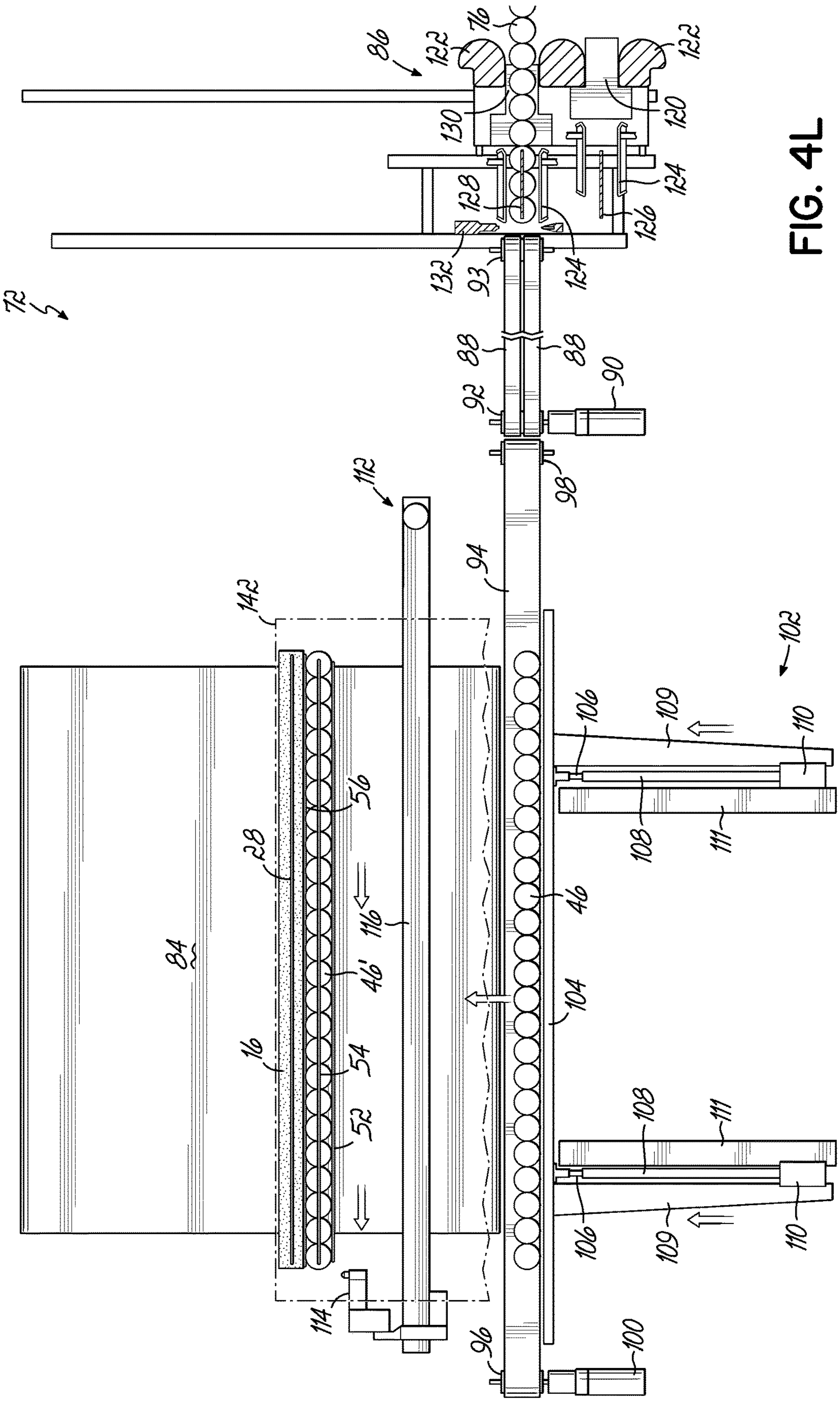
FIG. 4L is a top view of a portion of the front assembler of the assembly machine of FIG. 3 showing a second string in its loading position.
Figure 4M:
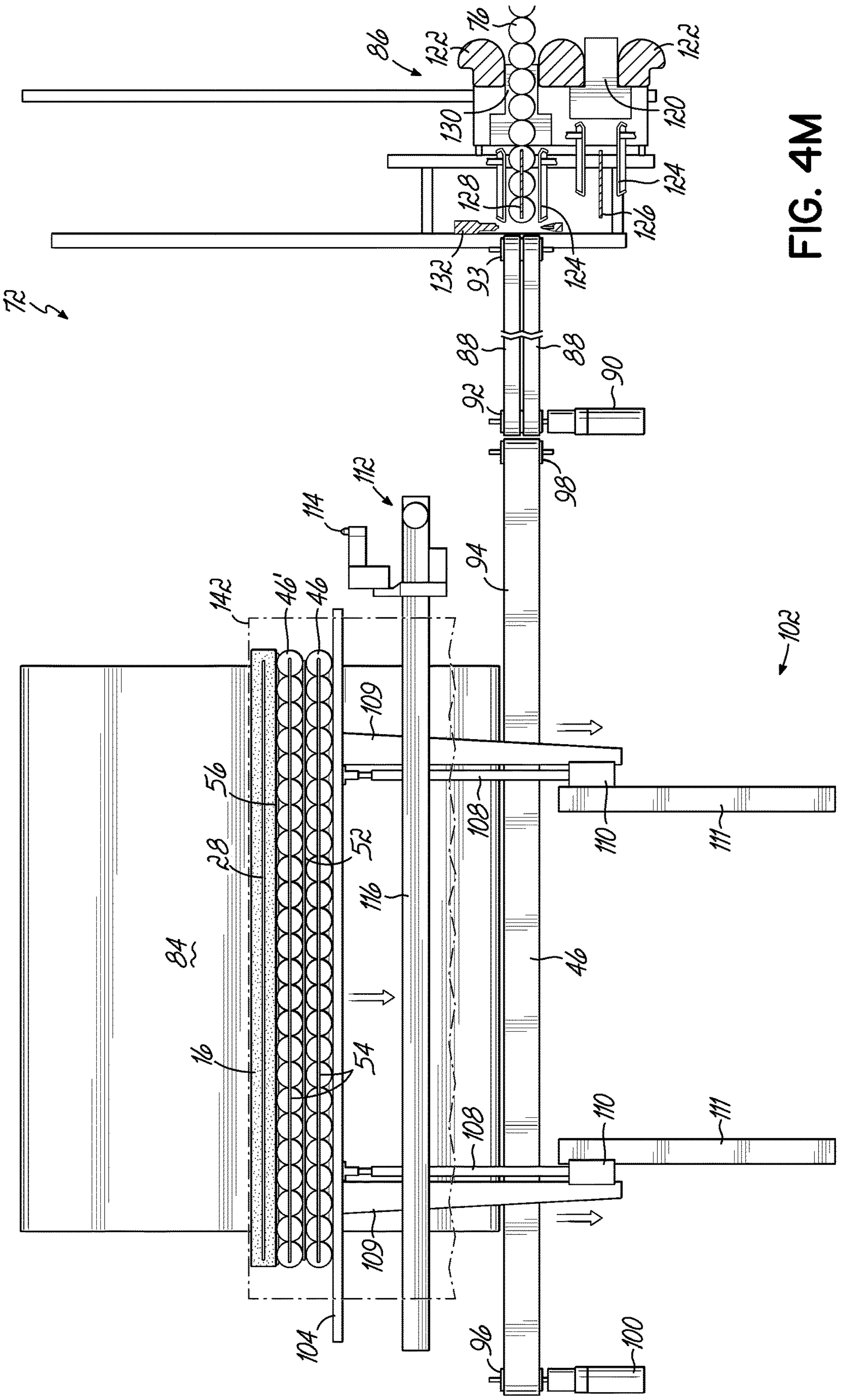
FIG. 4M is a top view of a portion of the front assembler of the assembly machine of FIG. 3 showing the second string abutting the first string after having been pushed against the first string.
Figure 4N:
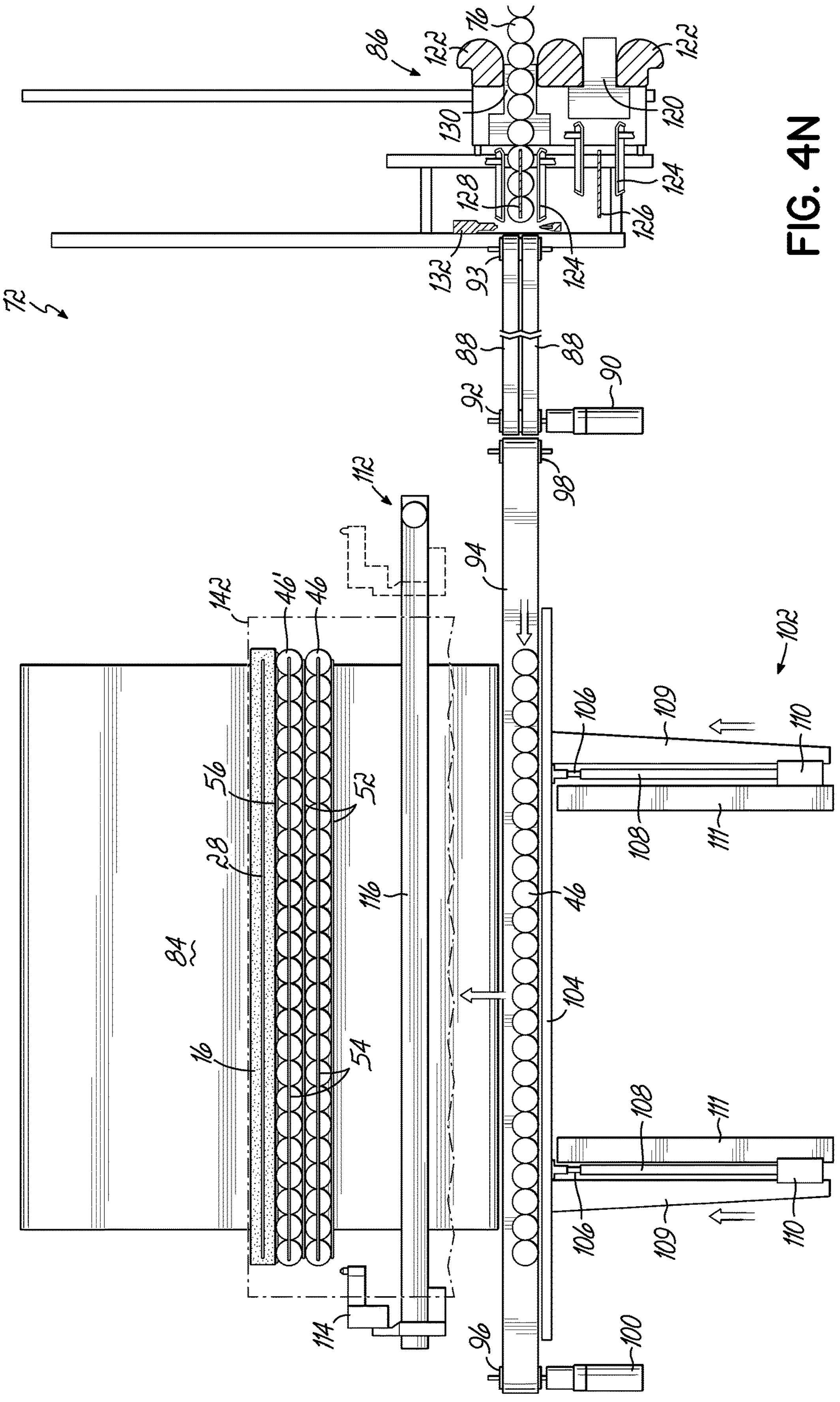
FIG. 4N is a top view of a portion of the front assembler of the assembly machine of FIG. 3 showing a third string in its loading position.
Figure 40:
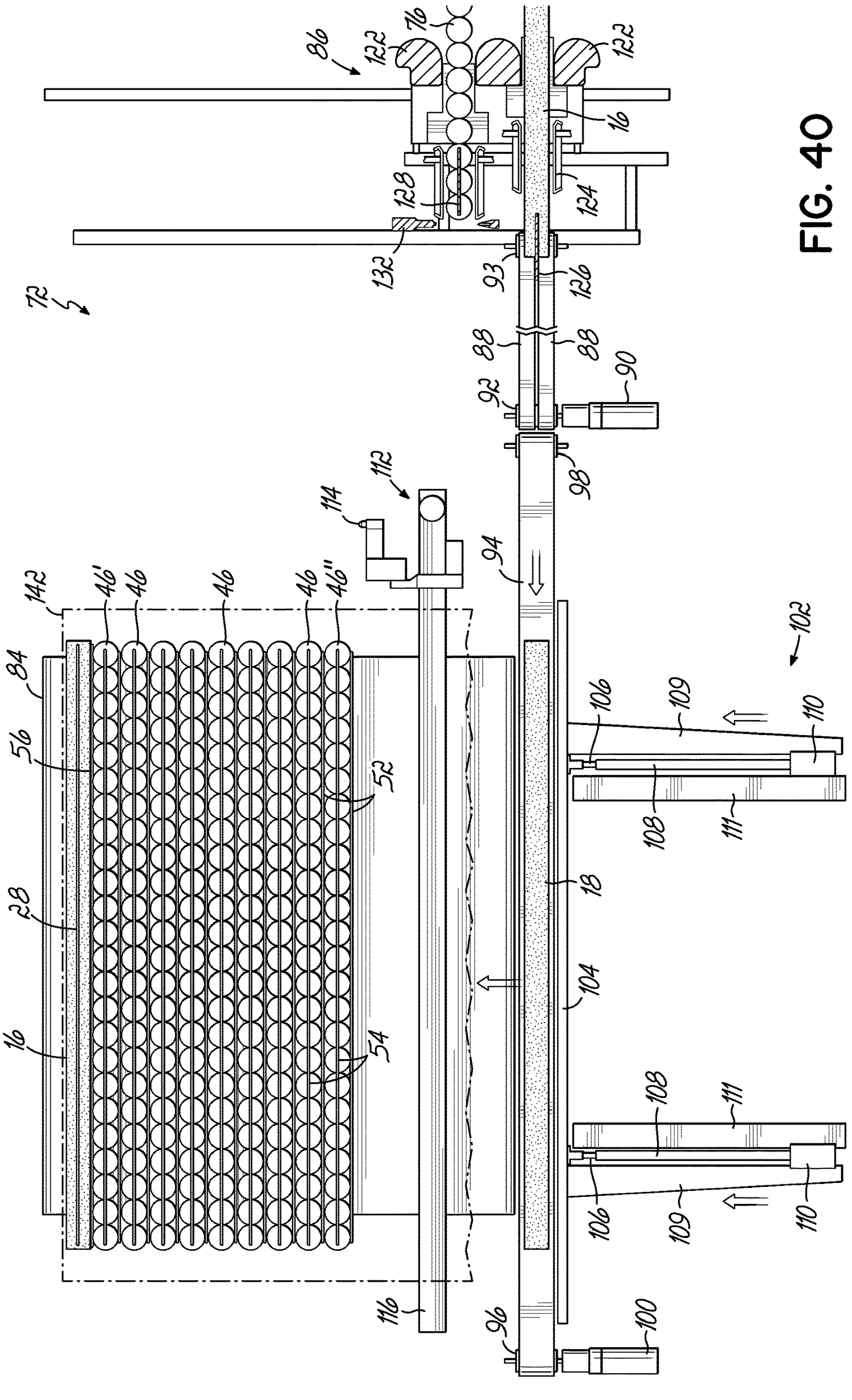
Figure 4P:
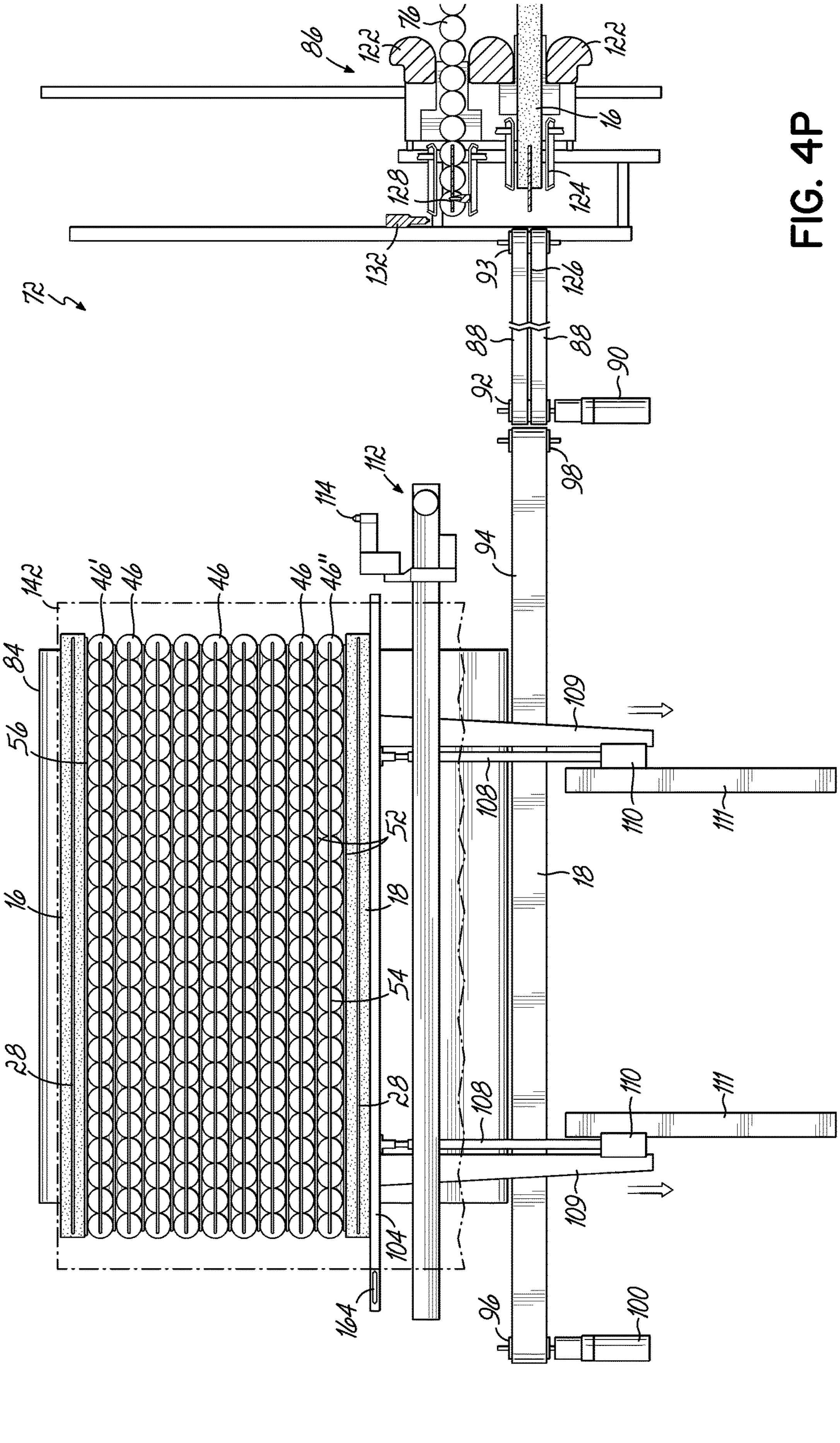
FIG. 4P is a top view of a portion of the front assembler of the assembly machine of FIG. 3 showing the second foam rail joined to the last string.

As shown in FIGS. 4A-4P, the front assembler 72 of the assembly machine 64 further comprises a front glue applicator 112 including a glue head 114 which moves along a guide rail 116. The guide rail 116 of the front glue applicator 112 is generally parallel the infeed belts 94, extending in the first direction. As best illustrated in FIG. 5A-5F, the glue head 114 has five nozzles **118*a*-118*e* for dispensing glue. Although five nozzles are illustrated, it may be appreciated that any number of nozzles may be incorporated into the glue head 114**.

As best shown in FIG. 3, the second station 66 of the assembly machine 64 comprises a first side assembler 136 on a first side of the front assembler 72 and a second side assembler 138 on a second side of the front assembler 72. The first and second side assemblers 136, 138 are downstream of the first assembler 72 in the illustrated embodiment. One purpose of the first and second side assemblers 136, 138 is to apply the third and fourth foam rails 30, 32 to the core 70 to provide foam on all four sides of the pocketed spring assembly 44 also referred to as a pocketed spring interior.

The first and second side assemblers 136, 138 are preferably identical but may be slightly different. Each of the side assemblers 136, 138 is similar to front assembler 72. For simplicity, like parts are identified with like numbers. The principal difference between the front assembler 72 and each of the side assemblers 136, 138 is that each of the side assemblers 136, 138 lacks compression belts 84. Another difference is that each of the side assemblers 136, 138 has clamps (not shown) for holding the first/upper and second/lower substrate webs 140, 142, respectively, in the proper position for the third and fourth foam rails 30, 32 to be added to the core 70.

As shown in FIG. 3, each of the side assemblers 136, 138 has at least one side loading tray 144 (only one being shown) for storing and loading third foam rails or fourth foam rails. Additionally, at least one supply source 146 for a continuous string of pocketed springs 148 may be located adjacent to each of the side assemblers 136, 138. Each of the of the side assemblers 136, 138 may be equipped with a side channel changer **86*a* so that strings of pocketed springs may be secured to the ends of the core 70 constructed by the front assembler 72**.

Figure 4Q:
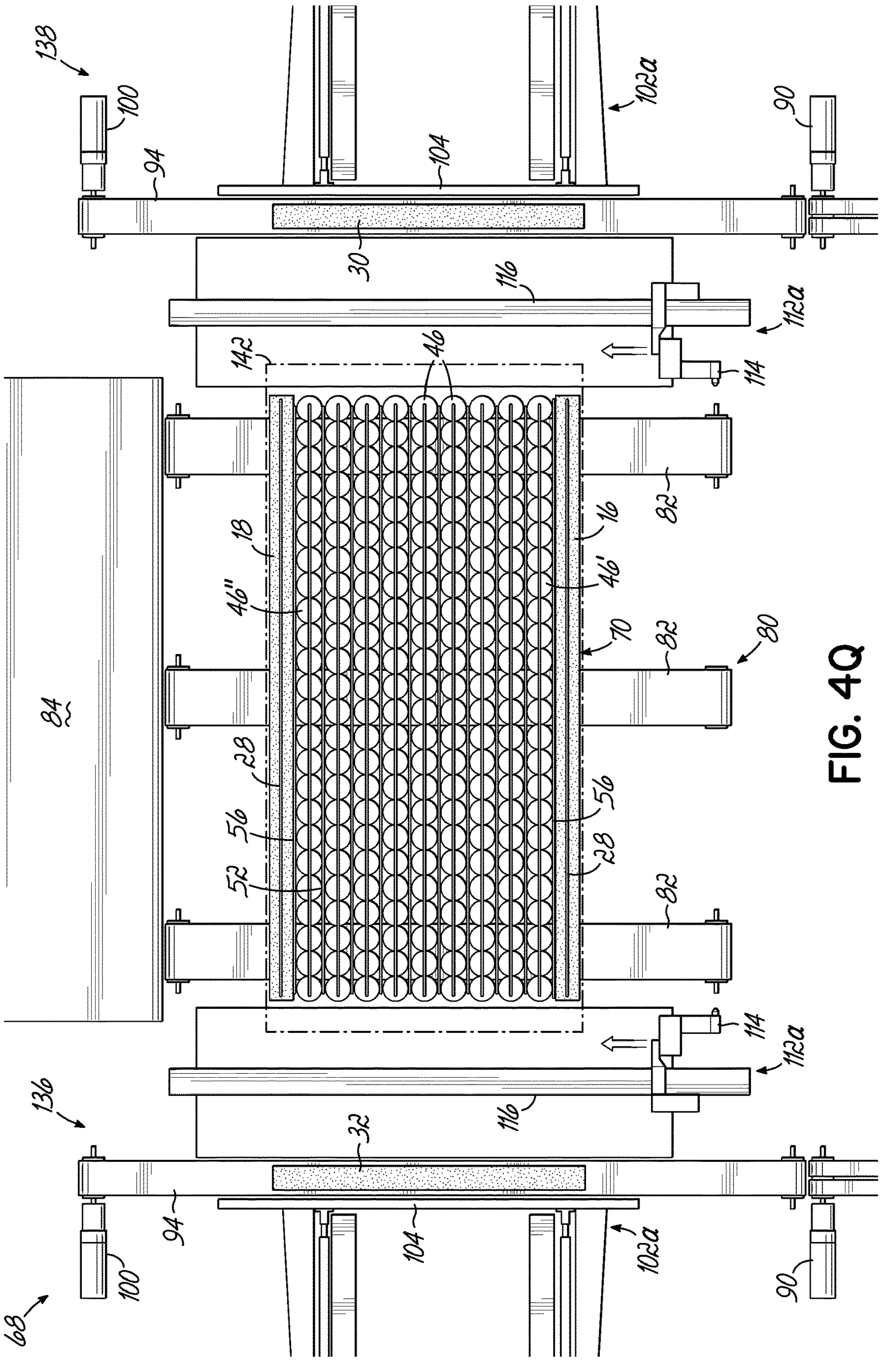
FIG. 4Q is a top view of a portion of the assembly machine showing the side assemblers with their glue applicators in the home position, the third and fourth foam rails being in a loading position.
Figure 4R:
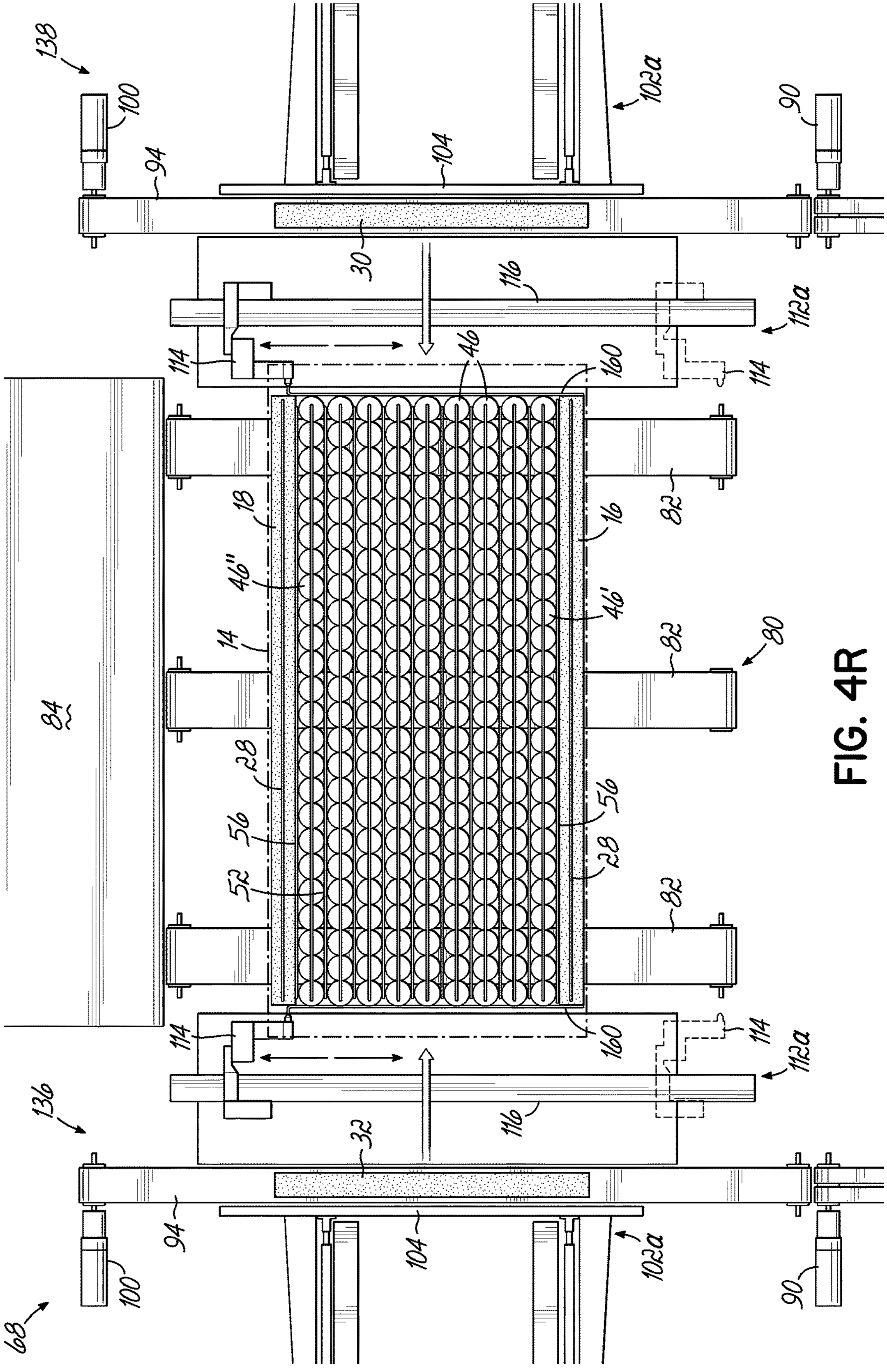
FIG. 4R is a top view of a portion of the assembly machine showing the side assemblers with their side glue applicators in an extended position after having applied glue to the ends of the core.
Figure 4S:
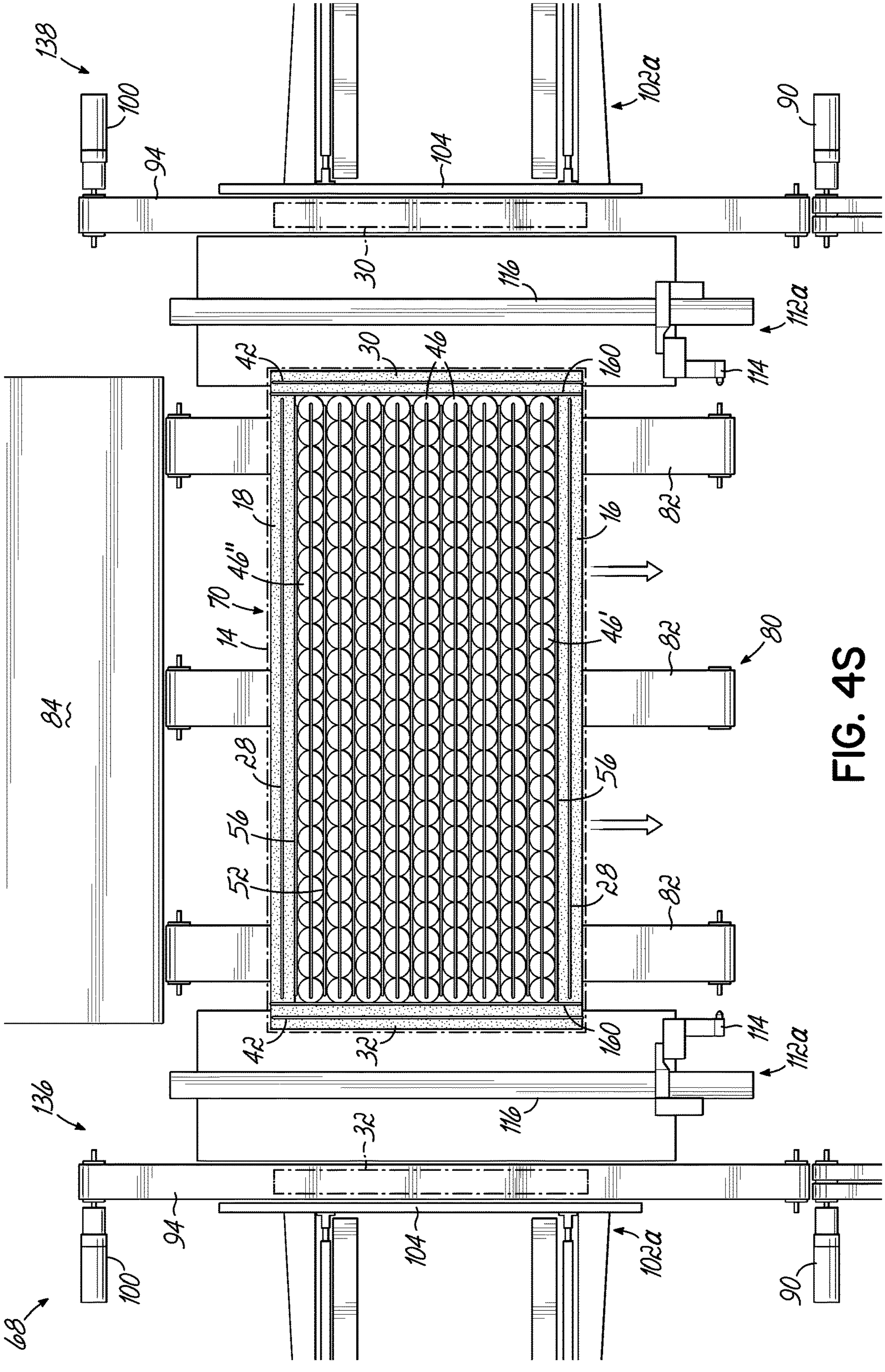
FIG. 4S is a top view of a portion of the assembly machine showing the side assemblers with third and fourth foam rails secured to the core, transfer belts moving the partially foam encased pocketed spring assembly downstream.

FIGS. 4-4S illustrate a method of manufacturing the partially foam encased pocketed spring assembly 10. Although the drawings illustrate partially foam encased pocketed spring assembly 10 being manufactured, partially foam encased pocketed spring assembly **10*a*** or any other partially foam encased pocketed spring assembly within the scope of the drawings or this document may be manufactured using this method or any portion of the illustrated/described method(s).

FIG. 4A illustrates a first foam rail 16 being pushed or pulled along front loading tray 78 and through the first channel 120 of the front channel changer 86. FIGS. 4 and 4B illustrate the first foam rail 16 being compressed by clamp plates 124, grabbed by grippers 126 and moved towards the pre-feed belts 88. FIG. 4C illustrates the clamp plates 124 separating or moving back to their home positions so that the first foam rail 16 may move towards its loading position shown in FIG. 4D. As shown in FIGS. 4 and 4C, the grippers 126 move along a gap 89 between adjacent pre-feed belts 88 after the clamp plates 124 have separated, the first foam rail 16 being moved between pre-feed belts 88 towards a loading position between infeed belts 94. FIG. 4D shows the first foam rail 16 in its loading position between infeed belts 94. The second foam rail 18 is moved to its loading position in the same manner as described below.

Although the drawings illustrate grippers 126 pulling first foam rail 16 to its loading position between infeed belts 94, it is within the scope of the invention that the first foam rail 16 or second foam rail 18 be pushed or moved in any manner through the first channel 120 of the front channel changer 86 to a position between the pre-feed belts 88 and then to a loading position between the infeed belts 94. Although the drawings illustrate the grippers 126 being a particular shape, size and configuration, the drawings are not intended to be limiting. The grippers may be other shapes, sizes or configurations.

Figure 5A:
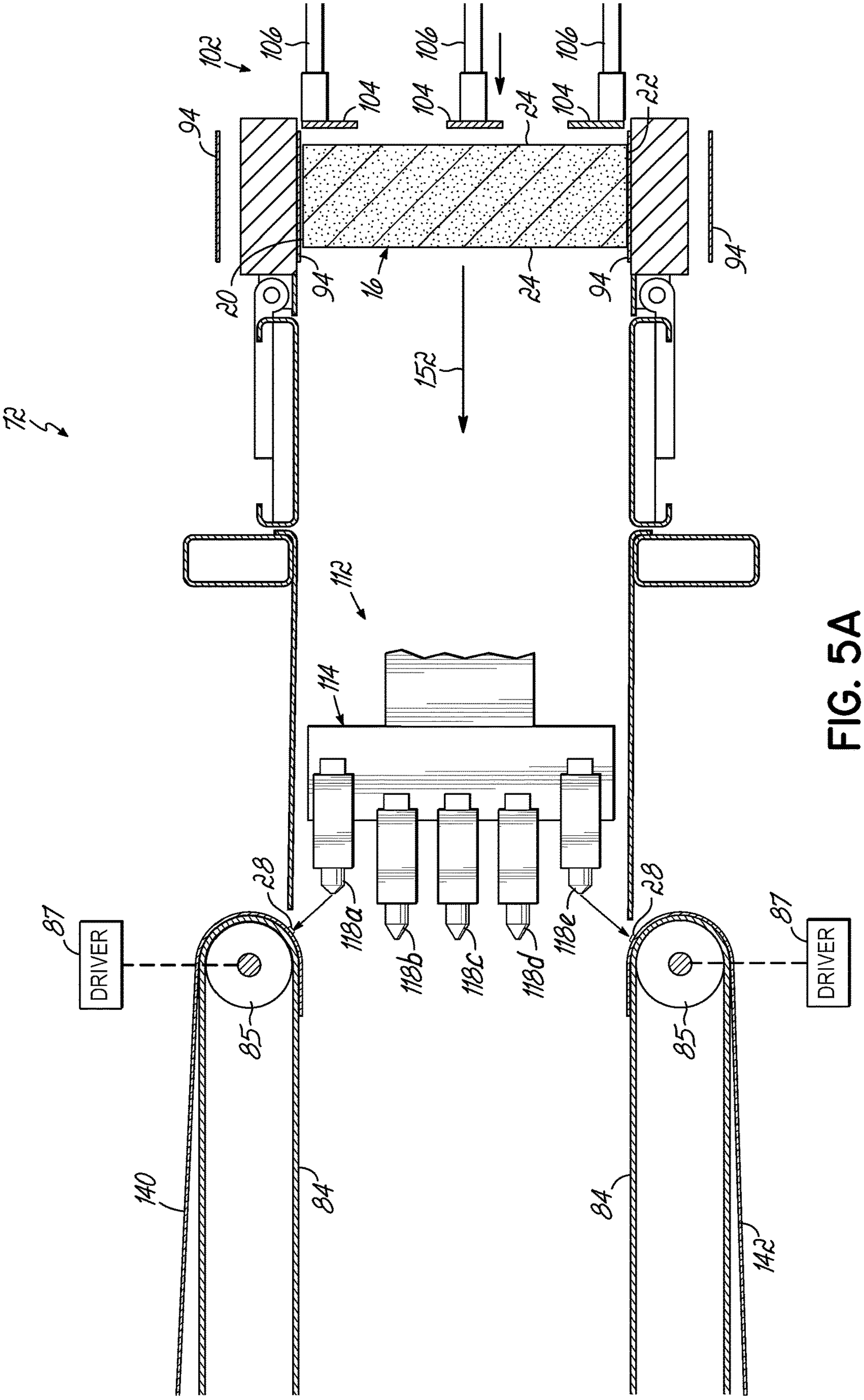
FIG. 5A is a side view of a portion of the assembly machine showing the first foam rail being introduced into the front assembler by a pusher and a front glue applicator of the front assembler applying glue to upper and lower substrate webs.

FIG. 4E illustrates the glue head 114 of the front glue applicator 112 moving from its home position shown in FIG. 4D across the upper and lower substrate webs 140, 142 applying adhesive to inner surfaces of the upper and lower substrate webs 140, 142. As shown in FIG. 5A, an uppermost nozzle **118*a* of the glue head 114 applies adhesive to the upper substrate web 140 while a lowermost nozzle 118*e* of the glue head 114 applies adhesive to the lower substrate web 142 creating lines of adhesive 28 (only one being shown in FIG. 4E). FIG. 4E shows the glue head 114 making its first pass from right to left applying adhesive or glue to the upper and lower substrate webs 140, 142**. The drawings are not intended to be limiting, the glue head's home position may be on the left as shown in the drawings.

Figure 5B:
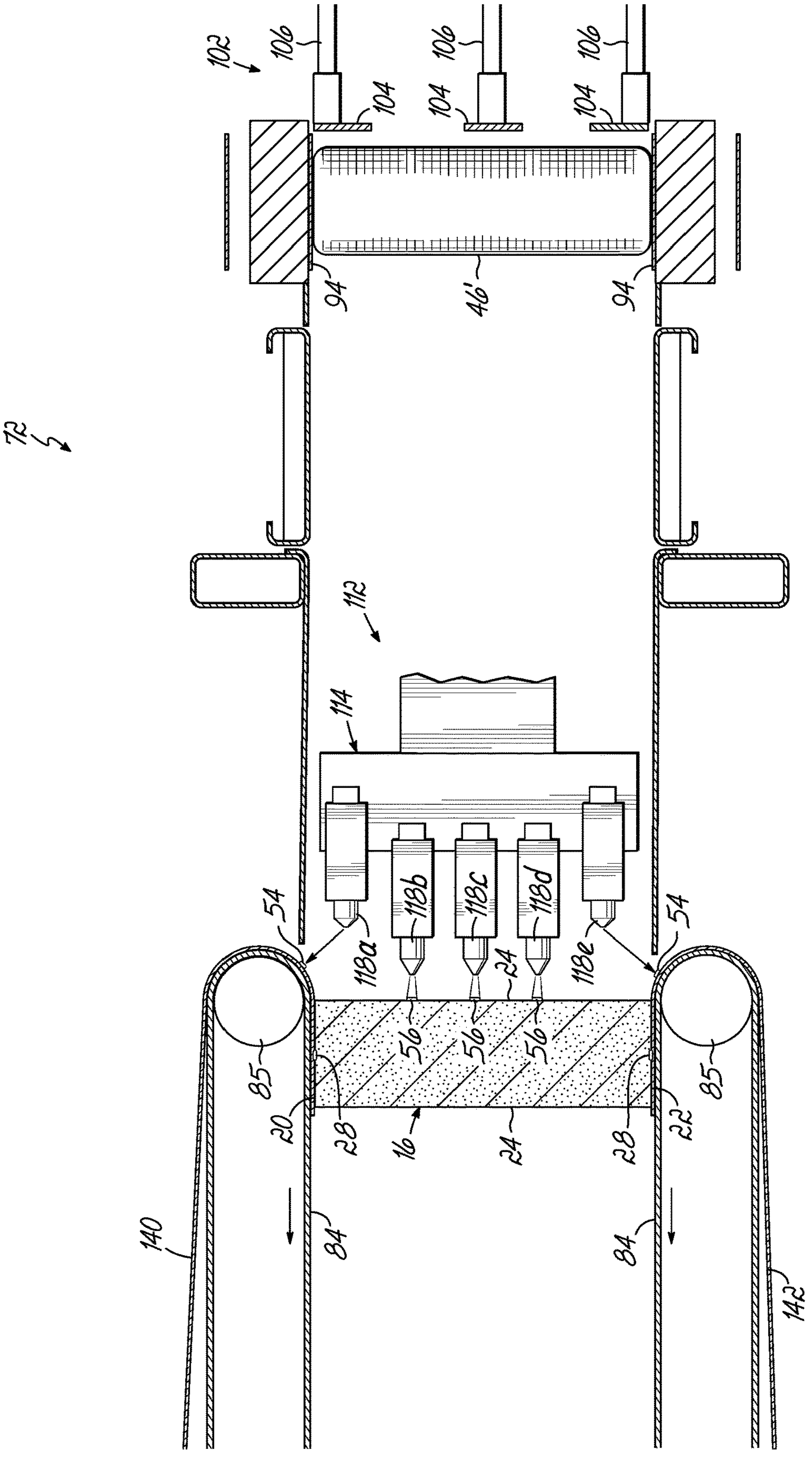
FIG. 5B is a side view of a portion of the assembly machine showing a first string of pocketed springs being introduced into the front assembler by a pusher and a front glue applicator of the front assembler applying glue to the first foam rail.

FIGS. 4F and 5A illustrate the first foam rail 16 being pushed into its desired final position between the upper and lower substrate webs 140, 142 by the front pusher assembly 102. FIG. 5A illustrates the three pushers 104 acting on an inner side surface 24 of the first foam rail 16. As shown in FIG. 5A, the downstream movement of the rods 108 push the first foam rail 16 in the direction of arrow 152 out from a loading position between the infeed belts 94 to a final position between the upper and lower substrate webs 140, 142 as shown in FIG. 5B. After the rods 108 of the front pusher assembly 102 return to their home positions shown in FIG. 5B, the nozzle head 114 is in its furthest position away from its home position which will be called its far position for purposes of this document.

FIG. 4G illustrates the pusher assembly 102 moving back to its home position after having pushed the first foam rail 16 into its desired final position. FIG. 4G illustrates the glue head 114 returning from its far position to its home position. During this pass from right to left or from its far position to its home position, the glue head 114 dispenses lines of glue 56 on the inner side surface 24 of the first foam rail 16. More specifically, the nozzles **118*b*, 118*c*, 118*d* spray the lines of glue 56 on the inner side surface 24 of the first foam rail 16 during this pass of the glue head 114 back to its home position. As shown in FIG. 5B, during this pass, the nozzles 118***a*, 118*e* dispense lines of glue 54 on the upper and lower substrate webs 140, 142 too.

FIG. 4H illustrates the glue head 114 back in its home position after this pass. FIG. 4H further illustrates the cutter 132 of the front channel changer 86 cutting the continuous string of pocketed springs 76 to create the first string 46' of pocketed springs. The first string 46' is approximate the same length as the length of the first foam rail 16. FIG. 4H shows the first string 46' partially between the infeed belts 94 and partially between the pre-feed belts 88 while moving in the first direction to its loading position fully between the infeed belts 94. FIG. 4I illustrates the first string 46' in its loading position between the infeed belts 94.

Figure 5C:
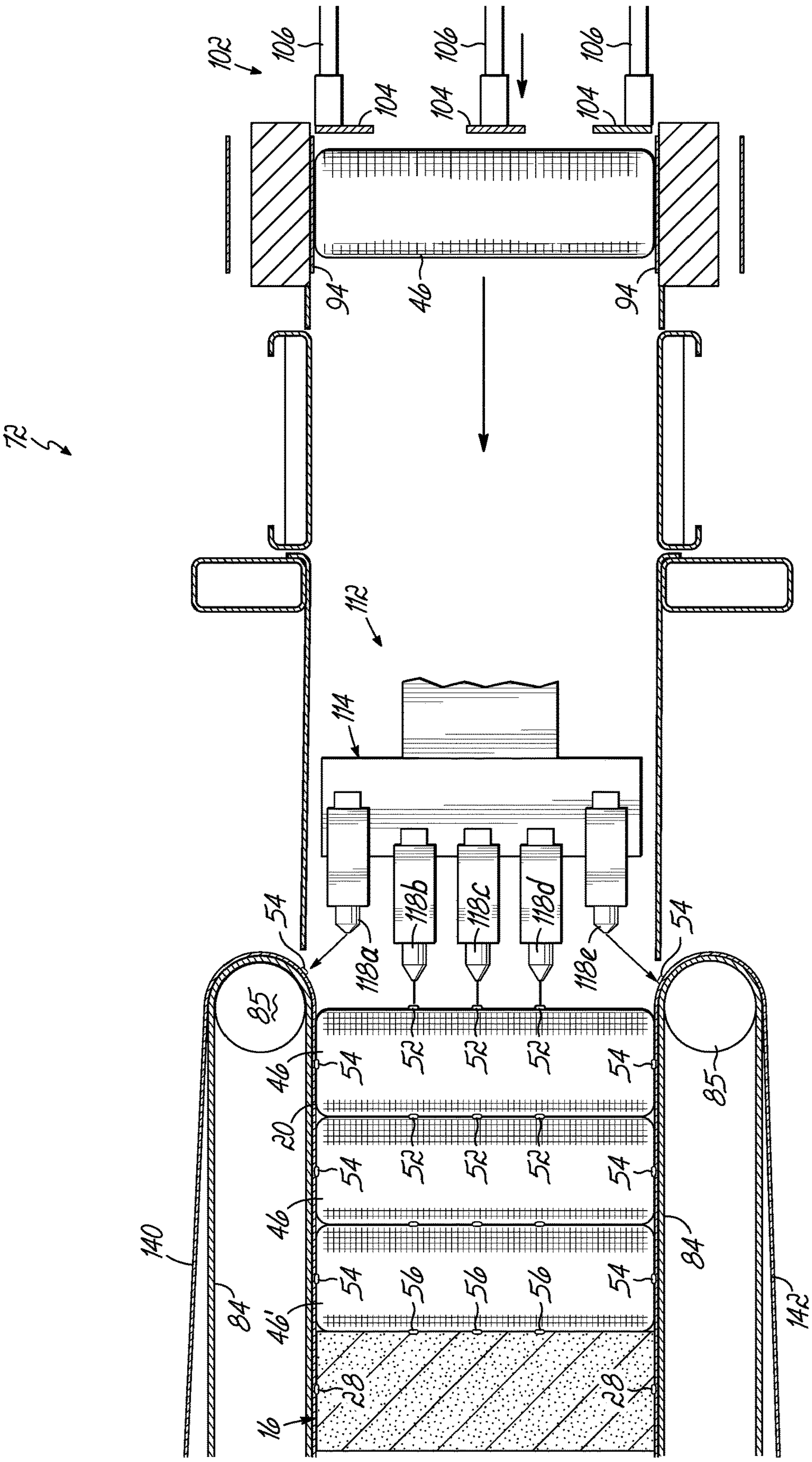
FIG. 5C is a side view of a portion of the assembly machine showing a last string of pocketed springs being introduced into the front assembler by a pusher and a front glue applicator of the front assembler applying glue to the second to last string.

FIG. 4J illustrates the pusher assembly 102 having pushed the first string 46' against the first foam rail 16. As shown in FIG. 5C, the lines of glue 56 secure the inner side surface 24 of the first foam rail 16 to an outer side surface of the first string 46'. In addition, as shown in FIG. 5C, nozzles 118*a*, 118*e*, apply lines of glue 54 along the upper and lower substrate webs 140, 142 to secure the first string 46' to the upper and lower substrate webs 140, 142.

FIG. 4K illustrates the first string 46' secured to the first foam rail 16 between the compression belts 84 with the glue head 114 moving towards its far position and the pusher assembly 102 in its home position. During this pass, the glue head 114 dispenses glue lines 54 along the upper and lower substrate webs 140, 142 and glue lines 52 to secure the first string 46' to the second string 46.

FIG. 4L is view like FIG. 4K, but with the glue head 114 in its far position and an additional or second string 46 in its loading position between the infeed belts 94. FIG. 4M illustrates the additional or second string 46 secured to the first string 46' by lines of glue 52, as shown in FIG. 5C. The second string 46 is also secured to the upper and lower substrate webs 140, 142 with lines of glue 54. FIG. 4M illustrates the pusher assembly 102 moving back from its extended position to its home position after the second string 46 has been secured to the first string 46'.

FIG. 4N shows an additional or third string 46 being pushed by the pusher assembly 102 against the second string 46 after the glue head 114 has moved back to its far position shown to the left, depositing additional lines of glue 52, 54 to the core 70. FIG. 5C shows the additional string 46 being secured to the second string 46 by lines of glue 52.

Figure 5D:
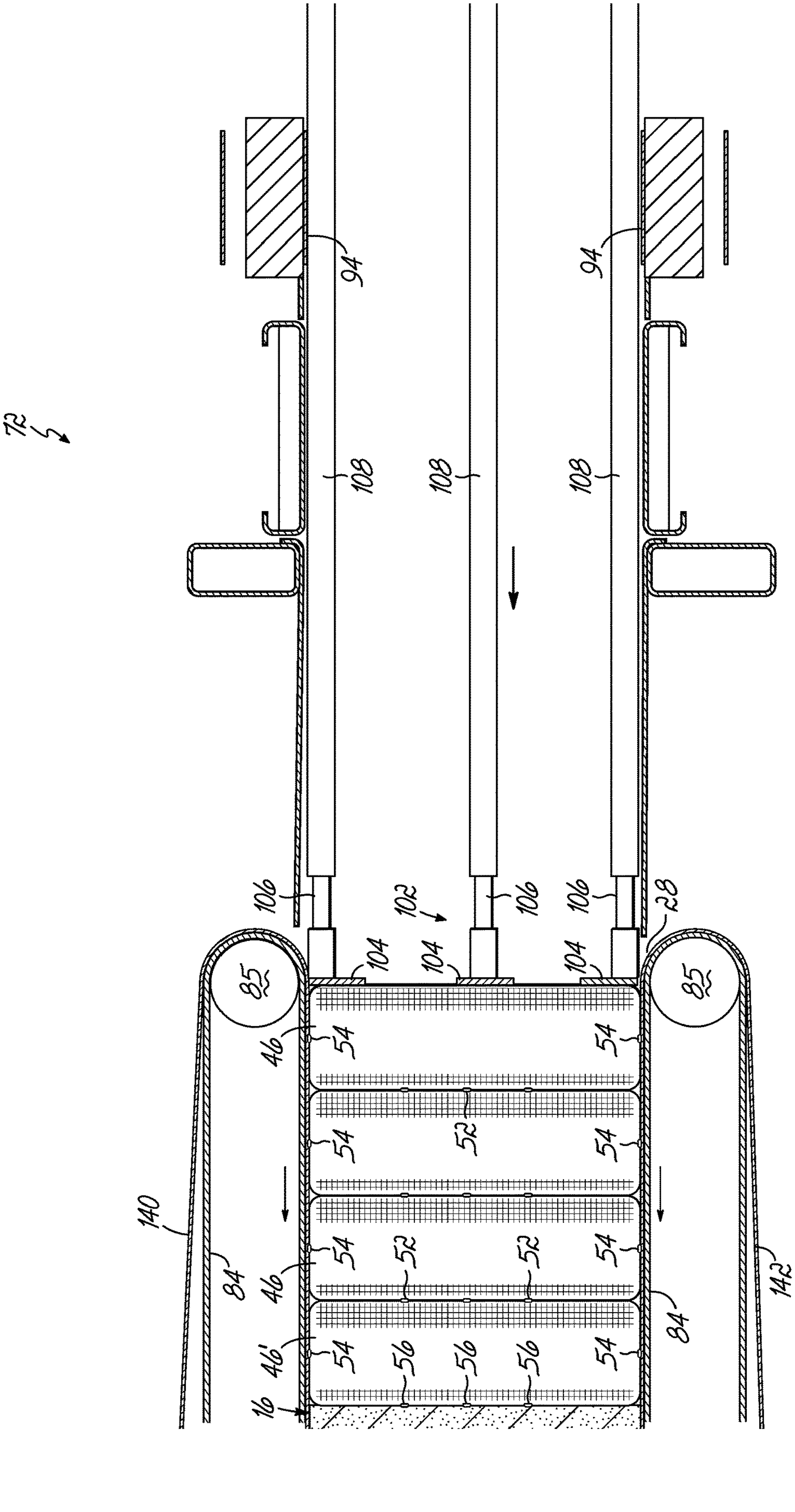
FIG. 5D is a side view of a portion of the assembly machine showing the last string of pocketed springs being secured in place inside the front assembler by a pusher, the pusher being extended.

As shown in FIG. 4O, this process continues one string 46 at a time until a last string 46" is secured to the core 70 being formed. FIG. 5D illustrates the rods 106 of the pusher assembly 102 fully extended pushing in one of the additional strings 46. FIG. 4O illustrates the second foam rail 18 located in a loading position between the infeed belts 94 and the pusher assembly 102 ready to push the second foam rail 18 between the compression belts 84 against the last string 46" of core 70.

FIG. 4P illustrates the second foam rail 18 secured to the last string 46" and the pusher assembly 102 moving back towards its home position. After the second foam rail 18 is secured to the last string 46", a cutter 164 cuts the upper and lower substrate webs 140, 142 to turn them into upper and lower substrate sheets 14, 12, respectively. The core 70 is then complete and moves downstream from the first station 66 to the second station 68 of assembly machine 64, as shown in FIG. 4Q.

FIG. 4Q illustrates the core 70 in an attachment position at the second station 68. Each of the first and second side assemblers 136, 138, respectively, has a side glue applicator 112*a* identical or similar to front glue applicator 112 and a side pusher assembly 102*a* identical or similar to front pusher assembly 102. FIG. 4Q illustrates the first side assembler 136 having the third foam rail 30 in its loading position between infeed belts 94 (only one being shown), the side pusher assembly 102*a* in its home position and the glue head 114 of side glue applicator 112*a* in its home position. FIG. 4Q further illustrates the second side assembler 138 having the fourth foam rail 32 in its loading position between infeed belts 94 (only one being shown), the side pusher assembly 102*a* in its home position and the glue head 114 of side glue applicator 112*a* in its home position.

FIG. 4R illustrates the glue head 114 of each side glue applicator 112*a* of each of the side assemblers 136, 138 in its far position, having dispensed lines of glue 160 (only one being shown) along end surfaces of the strings 46, 46' and 46" and along the end surfaces 26 of the first and second foam rails 16, 18.

FIG. 4S illustrates the side pusher assembly 102*a* of each of the first and second side assemblers 136, 138, respectively, having pushed the third and fourth foam rails 30, 32 against the core 70. FIG. 4S shows lines of glue 42 (only one being shown) joining the lower and upper substrate sheets 12, 14 to the third and fourth foam rails 30, 32, respectively.

Figure 5E:
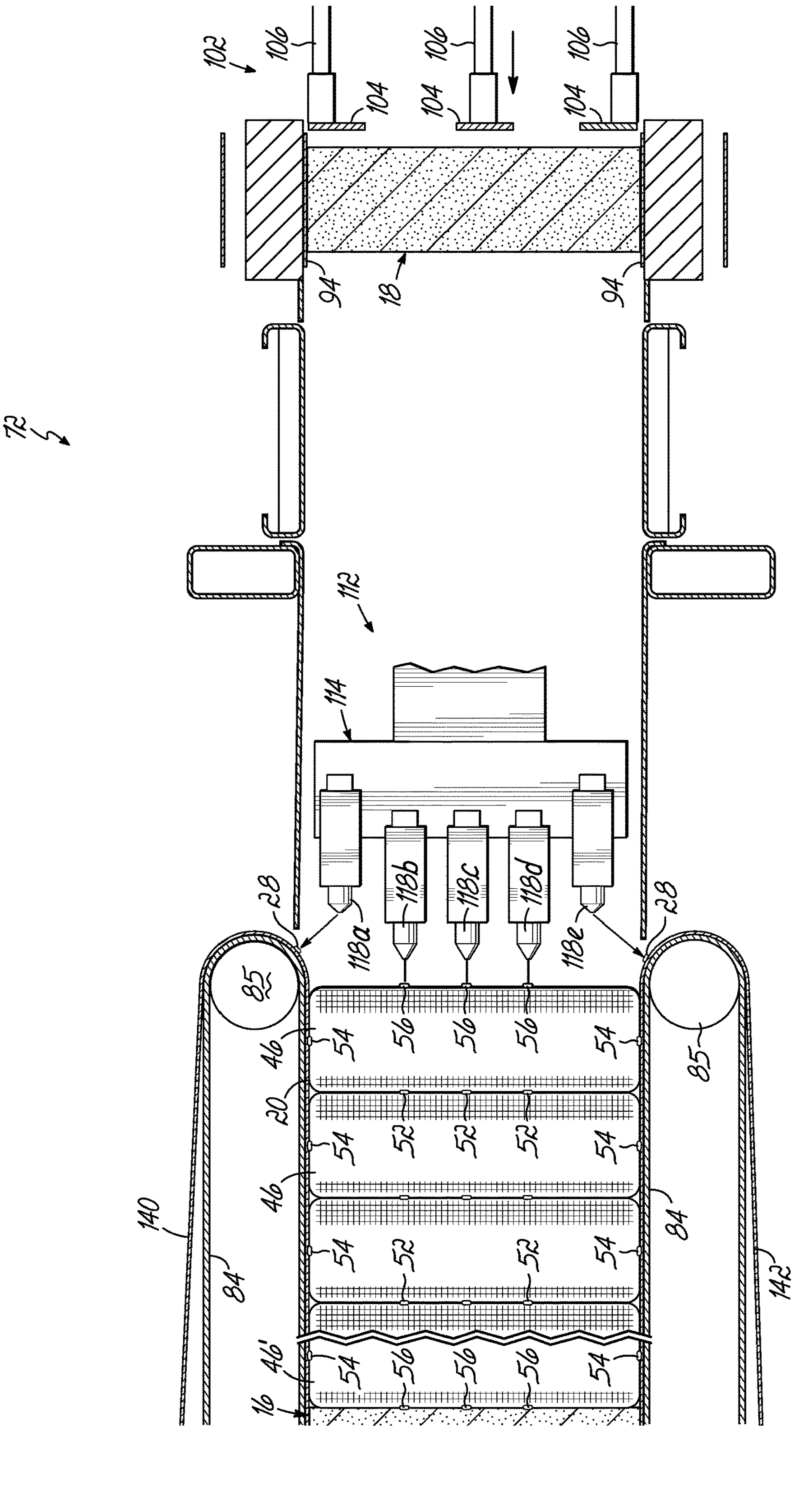
FIG. 5E is a side view of a portion of the assembly machine showing a second foam rail being introduced into the front assembler by a pusher and a front glue applicator of the front assembler applying glue to the last string.

FIG. 5E illustrates the nozzles 118*a*, 118*e*, applying lines of glue 28 to the upper and lower substrate webs 140, 142, respectively during a pass of the glue head 114 of front glue applicator 102. During the same pass of the glue head 114, nozzles 118*b*, 118*c* and 118*d* apply glue lines 56 to side surface of the last string 46' of the core 70 for securing the second foam rail 18 to the last string 46".

Figure 5F:
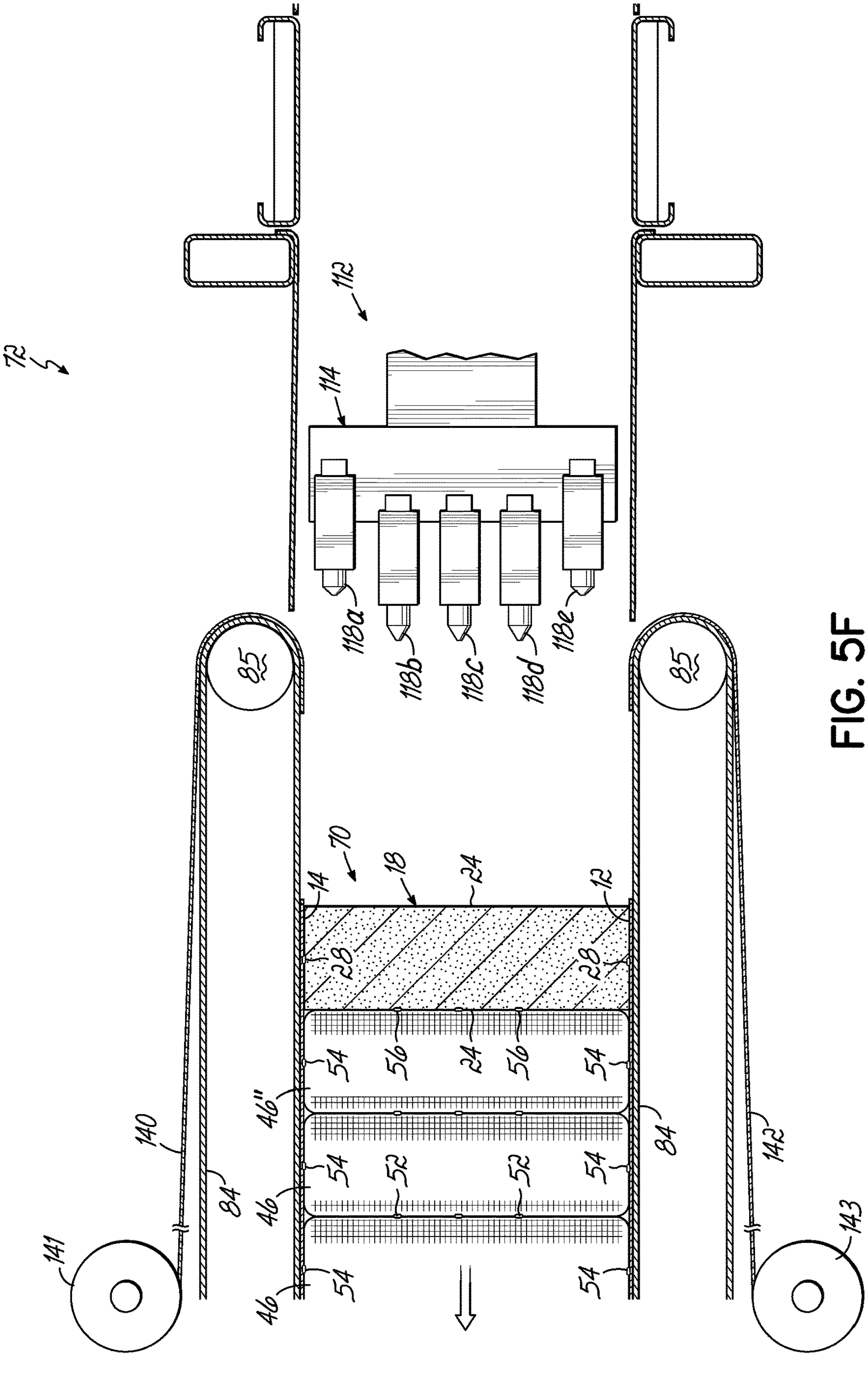
FIG. 5F is a side view of a portion of the front assembler of the assembly machine showing the core being moved downstream by the compression belts.

FIG. 5F illustrates the second foam rail 18 secured to the last string 46" thus completing the core 70. FIG. 5F also shows an upper rotatable roll or source 141 of the upper substrate web 140 from which the upper substrate web 140 is provided and a lower rotatable roll or source 143 of the lower substrate web 142 from which the lower substrate web 142 is provided.

Figure 6A:
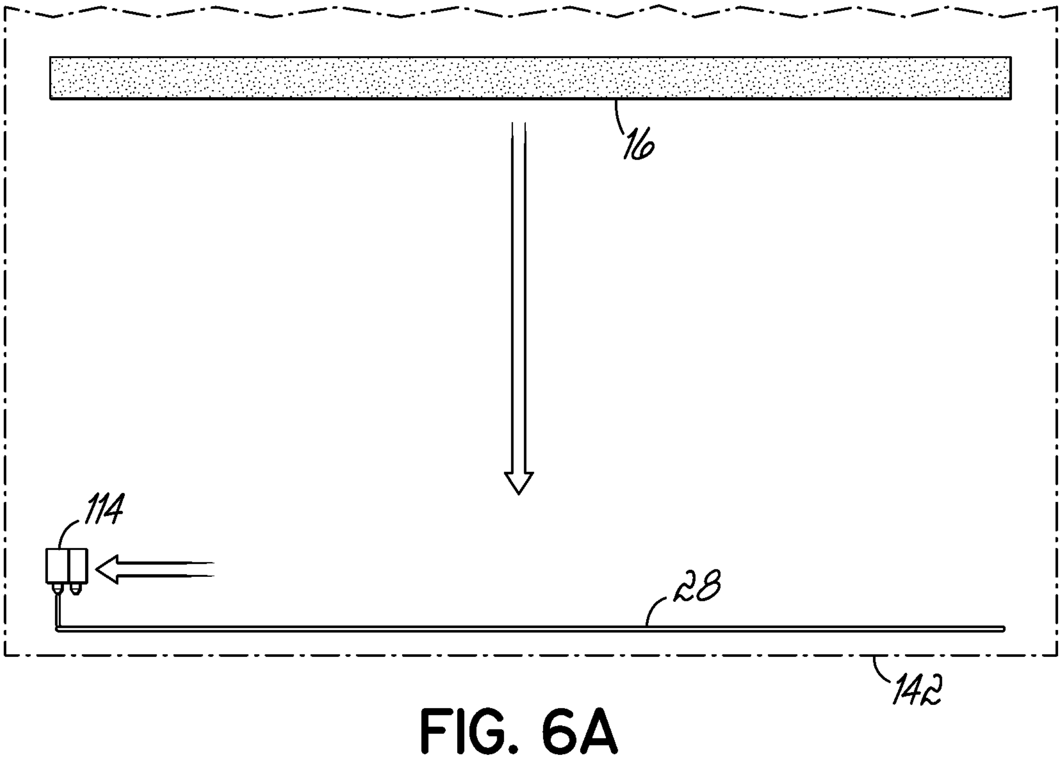
FIG. 6A is a schematic top view of a portion of the front assembler of the assembly machine showing the first foam rail being moved into place, the front glue applicator having applied glue to the upper and lower substrate webs.
Figure 6B:
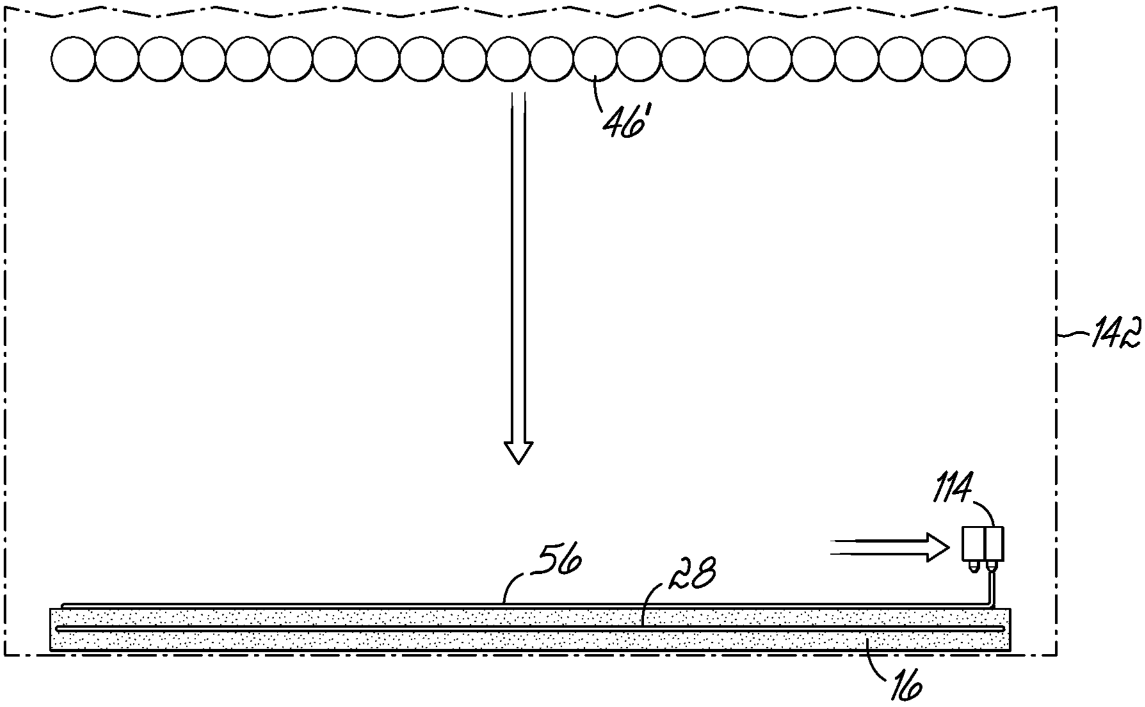
FIG. 6B is a schematic top view of a portion of the front assembler of the assembly machine showing a first string being moved into place, the front glue applicator having applied glue to the first foam rail and upper and lower substrate webs.

FIG. 6A illustrates the first foam rail 16 moving downstream after lines of glue 28 are applied by nozzles 118*a* and 118*e* to the upper and lower substrate webs 140, 142, respectively. FIG. 6B illustrates the nozzles 118*b*, 118*c* and 118*d* applying glue lines 56 to a side surface of the first foam rail 16 and nozzles 118*a* and 118*e* applying glue lines 54 to the upper and lower substrate webs 140, 142, respectively. The first string of springs 46' in its loading position ready to be moved downstream.

Figure 6C:
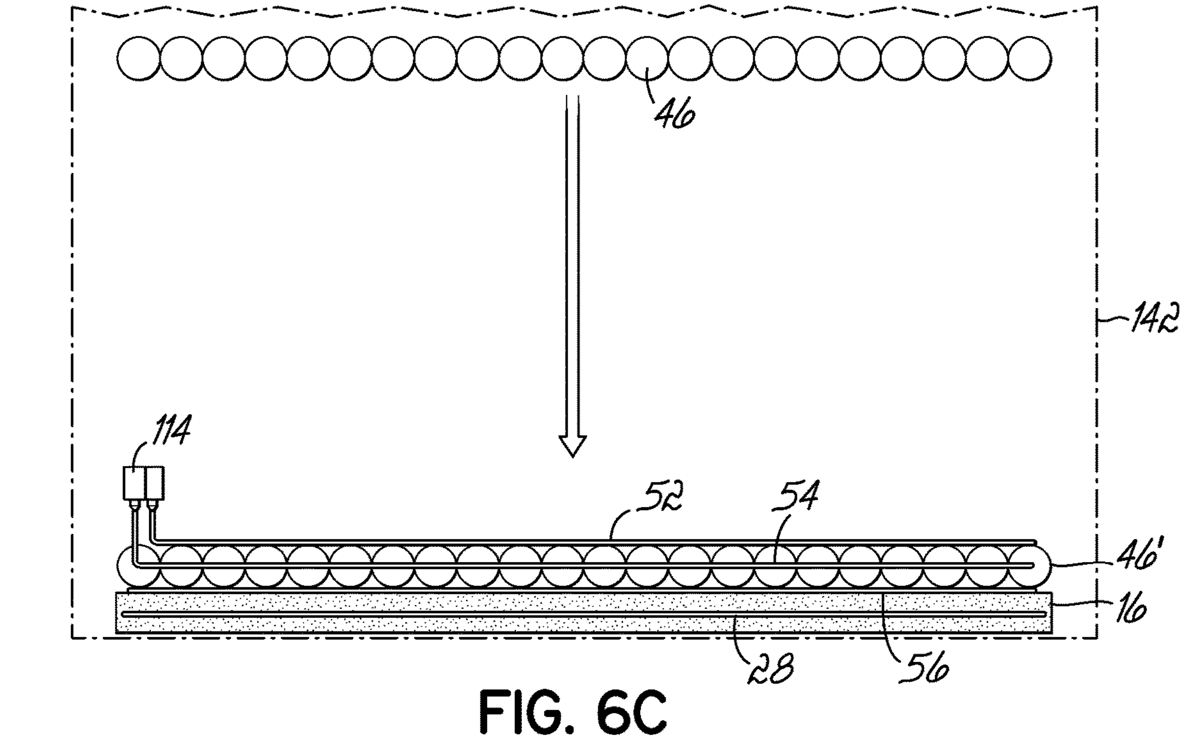
FIG. 6C is a schematic top view of a portion of the front assembler of the assembly machine showing a second string being moved into place, the front glue applicator having applied glue to the first string and upper and lower substrate webs.

FIG. 6C illustrates the first string of springs 46' having been moved to its final position abutting the first foam rail 16. FIG. 6C further shows the nozzles 118*b*, 118*c* and 118*d* having applying glue lines 52 to a side surface of the first string of springs 46' and nozzles 118*a* and 118*e* having applying glue lines 54 to the upper and lower substrate webs 140, 142, respectively.

Figure 6D:
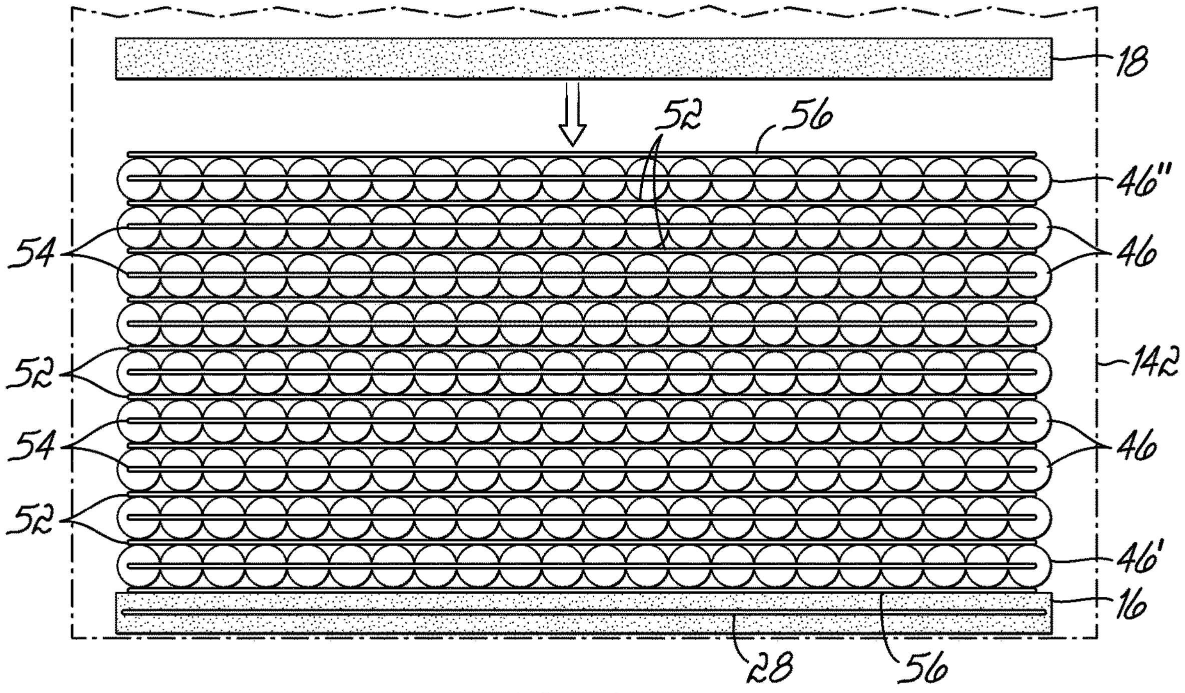
FIG. 6D is a schematic top view of a portion of the front assembler of the assembly machine showing a second foam rail being moved into place, the front glue applicator having applied glue to the last string and upper and lower substrate webs.
Figure 6E:
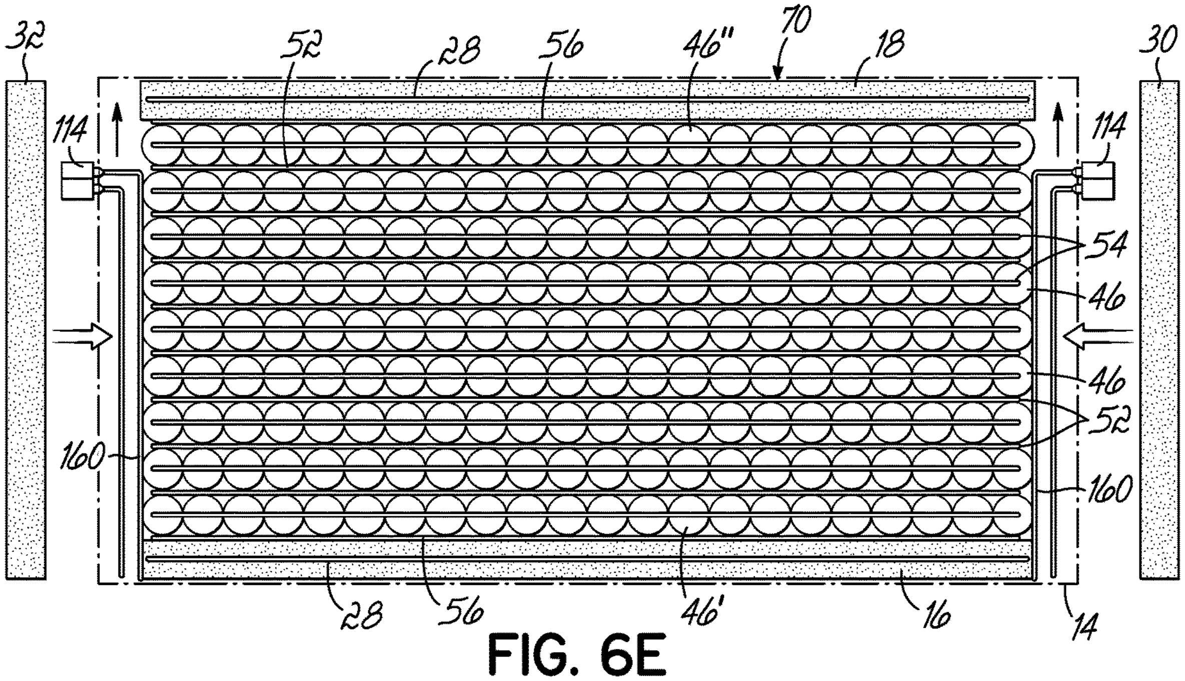
FIG. 6E is a schematic top view of a portion of the assembly machine showing third and fourth foam rails being moved into place by the side assemblers, the glue applicators of the side assemblers applied glue to the core and to the upper and lower substrate webs.
Figure 6F:
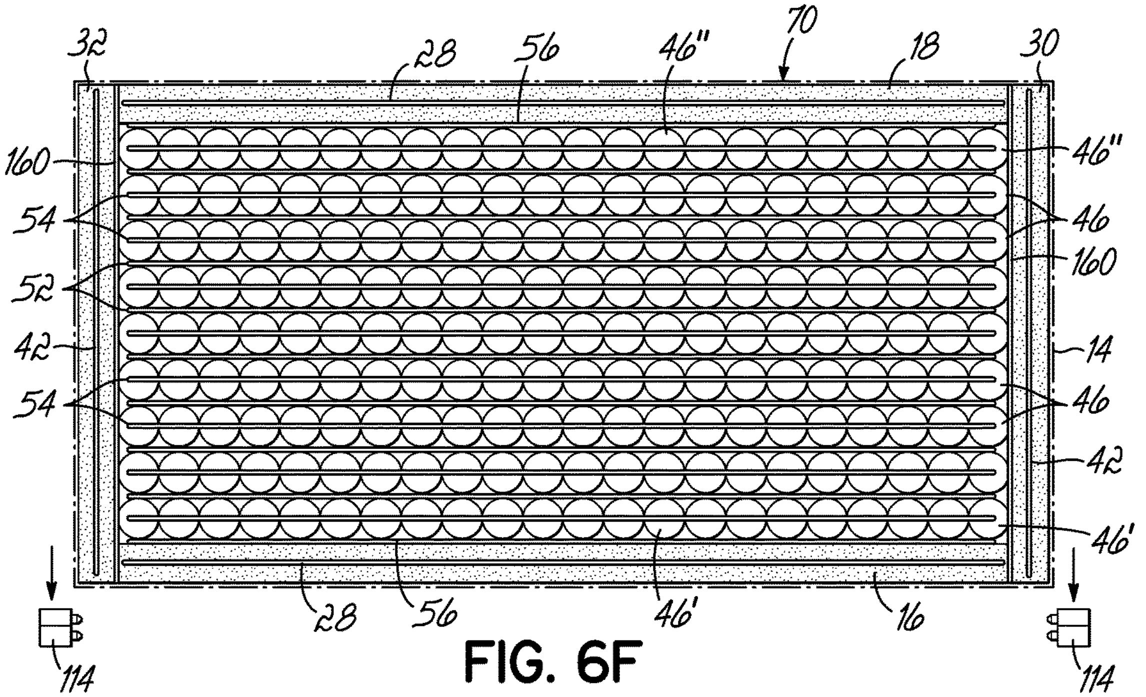
FIG. 6F is a schematic top view of a portion of the assembly machine showing third and fourth foam rails secured to the core and the glue heads of the glue applicators of the side assemblers returning to their home positions.
Figure 6G:
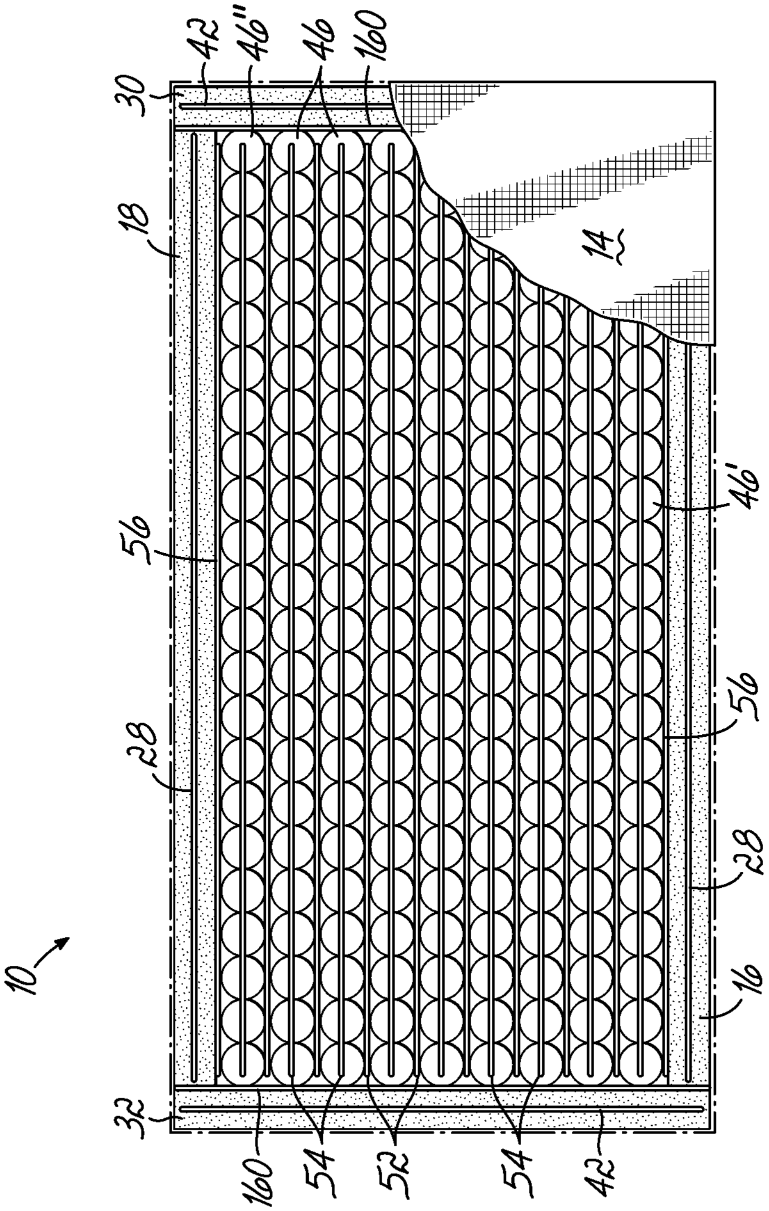
FIG. 6G is a schematic top view of the resultant partially foam encased pocketed spring assembly.

FIG. 6D illustrates the second foam rail 18 being moved to its final position adjacent the last string 46" to complete core 70. FIG. 6E illustrates third and fourth foam rails 30, 32 moving into their final positions after the nozzles 118*b*-118*d* of the side glue applicator 112*a* have applied adhesive lines 160 to the sides of the core 70 and have applied adhesive lines 42 to the upper and lower substrate sheets 14, 12, respectively. FIG. 6F illustrates the glue head 114 returning to its home position without dispensing any glue. FIG. 6G illustrates the partially foam encased pocketed spring assembly 10.

Figure 7A:
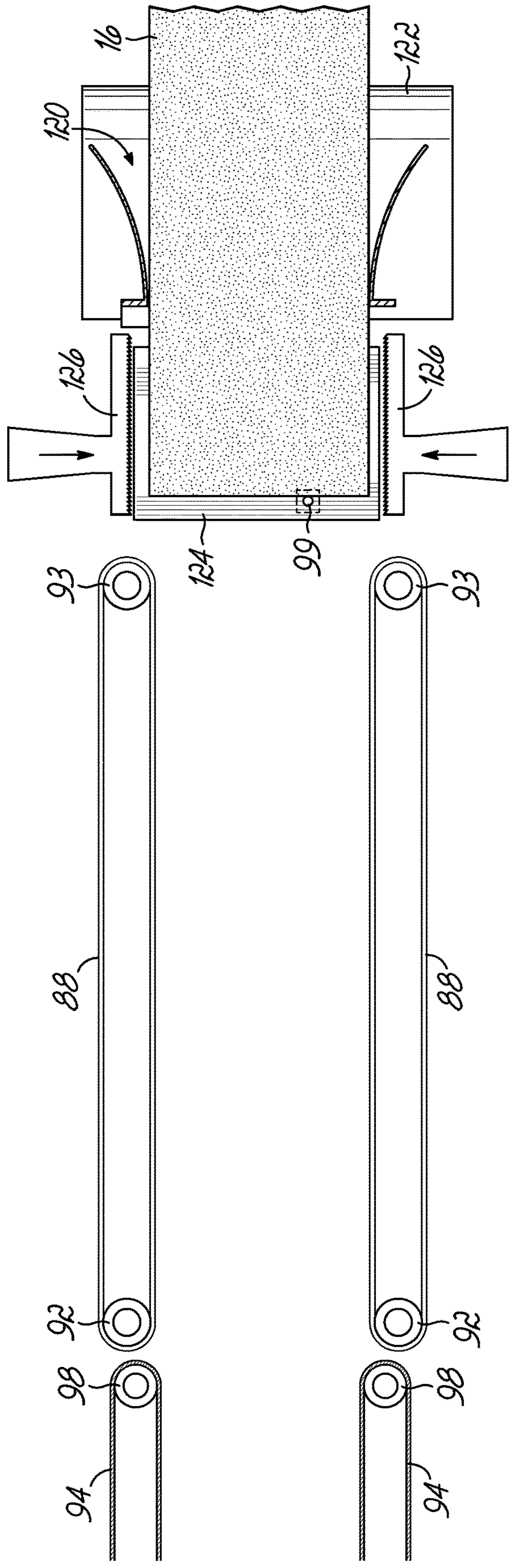
FIG. 7A is a schematic side view of the first foam rail inside the first channel of a channel changer.
Figure 7B:
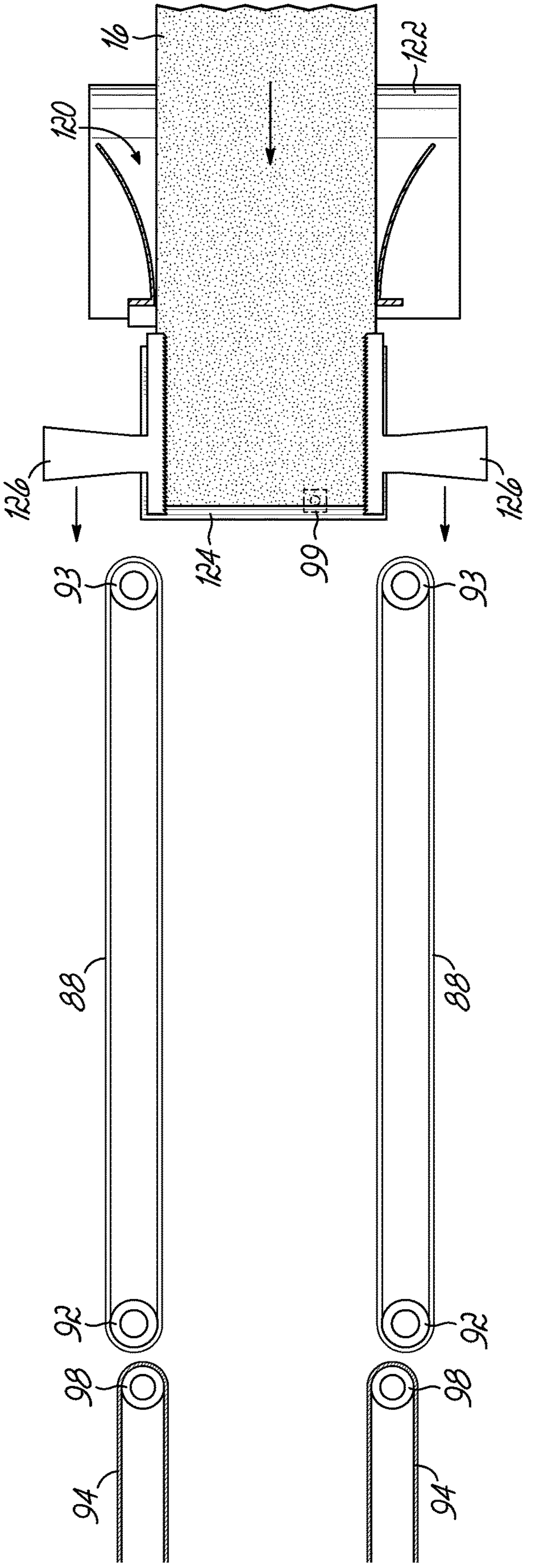
FIG. 7B is a schematic side view of the grippers of FIG. 7A compressing the foam rail and moving the foam rail inwardly towards pre-feed belts.
Figure 7C:
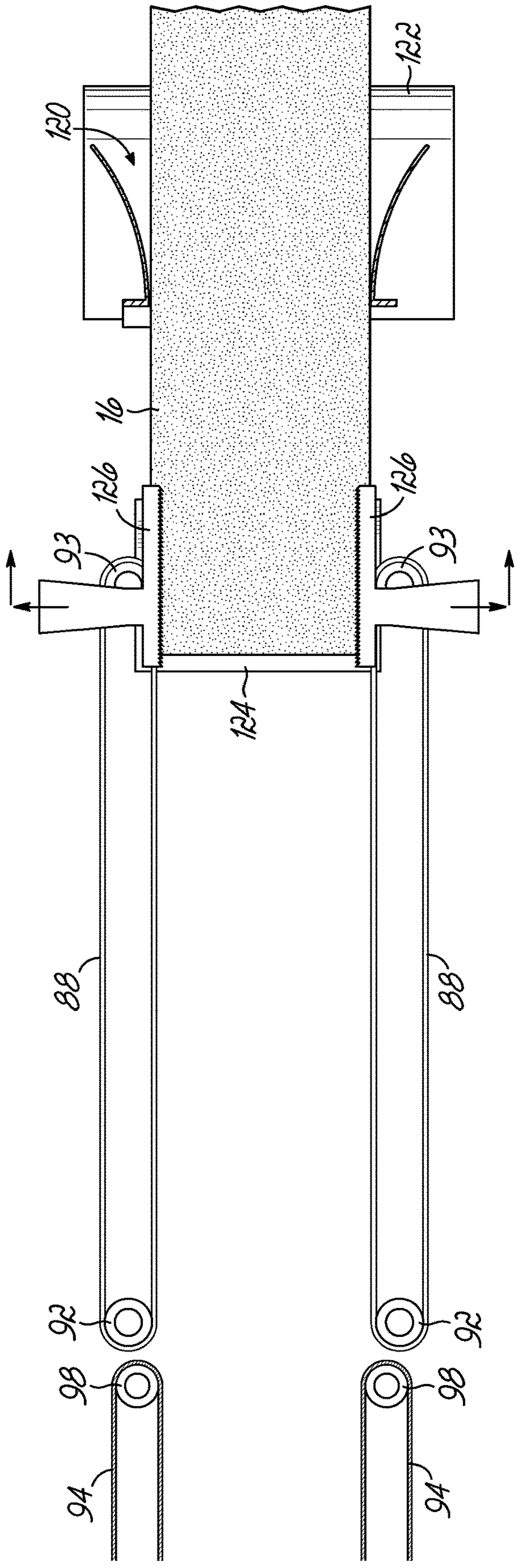
FIG. 7C is a schematic side view of the grippers of FIG. 7B moving the foam rail inwardly between the pre-feed belts.
Figure 7D:
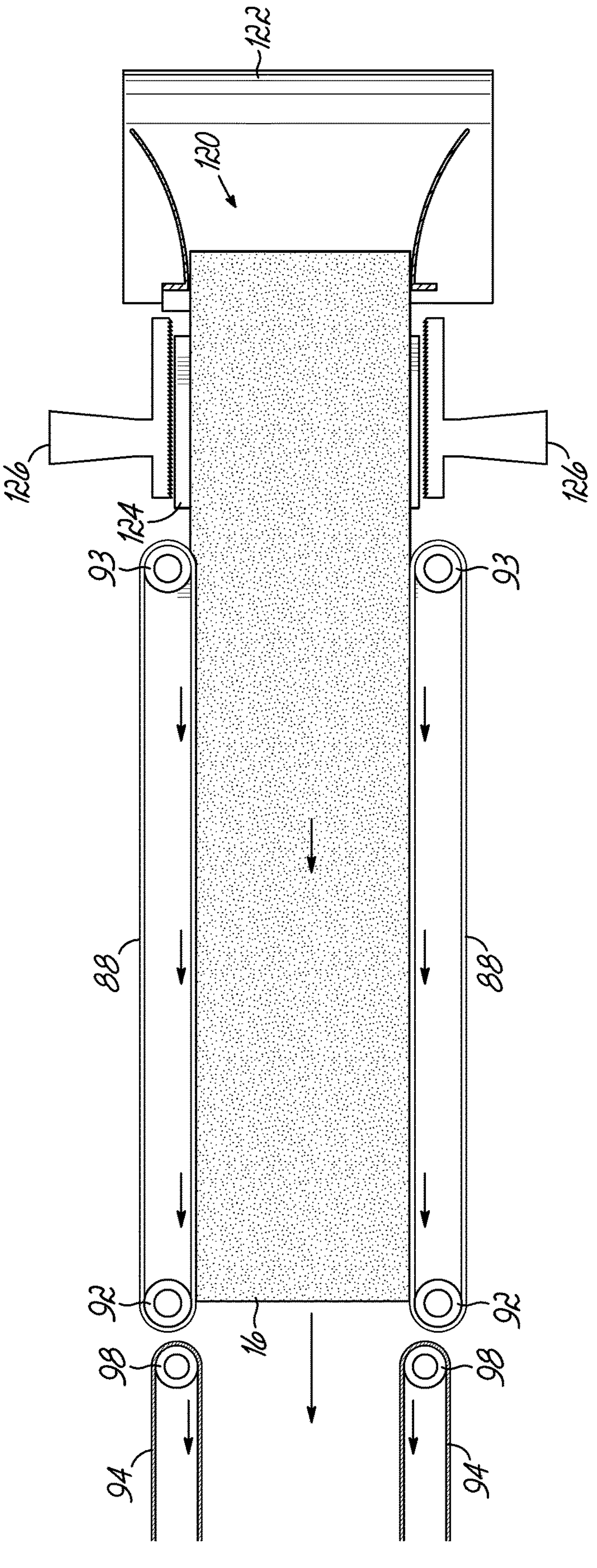
FIG. 7D is a schematic side view showing the foam rail between the pre-feed belts.

FIG. 7A illustrates the grippers 126 being moved from a spaced/home position to an engaged position in which they engage or sandwich one of the foam rails 16. FIG. 7A shows the foam rail 16 in its ready position. FIG. 7B illustrates the grippers 126 in their engaged position partially compressing the first foam rail 16 and moving the first foam rail 16 into a starting position shown in FIG. 7C in which the first foam rail 16 is partially between the pre-feed belts 88. In FIG. 7C, the grippers 126 are illustrated moving away from each other and rearwardly from their engaged position to their spaced position. FIG. 7D illustrates the pre-feed belts 88 partially compressing and moving the first foam rail 16 downstream towards its loading position between infeed belts 94.

Although FIGS. 7A-7D illustrate the first foam rail 16 being moved from its ready position to its loading position, it may be appreciated that any of the foam rails described or shown herein may be moved into its loading position from a ready position in the same manner. Additionally, the grippers 126 may be used to move any of the strings into their loading position from a ready position.

Figure 8:
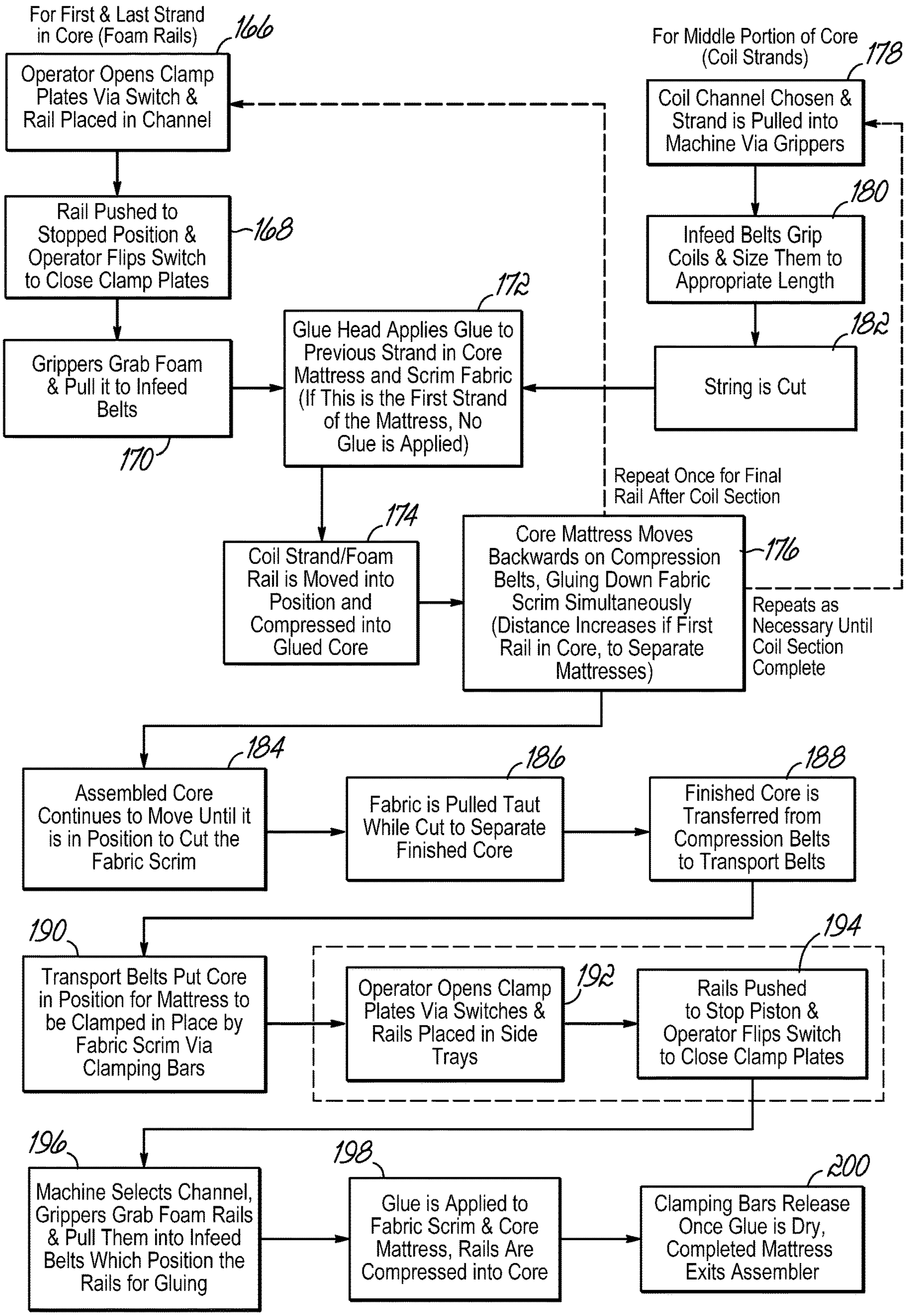
FIG. 8 is a flow chart showing the method of making the partially foam encased pocketed spring assembly.

FIG. 8 is a flow chart showing the method of manufacturing a partially form encased pocketed spring assembly. For simplicity, we will describe the partially form encased pocketed spring assembly 10.

Box 166 describes the operator opening the clamp plates 124 via a switch on the control panel 134. The first foam rail 16 is then either manually or automatically inserted into the first channel 120 of the front channel changer 86 from the front loading tray 78 shown in FIG. 3. As indicated in box 168 the first foam rail 16 is pushed either manually or automatically inwardly until it abuts a stopper 99 in a stopped position best shown in FIGS. 4 and 7A. The stopper 99 extends through one of the clamp plates 124 is moved via an air cylinder. The operator then flips a switch on the control panel 134 to retract the stopper 99 and close the clamp plates 124. As indicated by box 170, the grippers 126 grab the first foam rail 16 and pull it into a starting position shown in FIG. 7C between the pre-feed belts 88 which move it to a loading position between the front infeed belts.

As indicated by box 172 of FIG. 8, the glue head 114 then applies glue to the first foam rail 16 in the core 70 or to a string 46 in the core 70 on the upstream side of the first foam rail 16, first string 46', additional string 46 or last string 46" (called strands in flow chart of FIG. 8). The glue head 114 further applies glue to the upper and lower substrate webs 140, 142 (called scrim fabric in flow chart).

As indicated by box 174 of FIG. 8, the strands are moved into position and compressed by the compression belts 84 of the front assembler 72. As indicated by box 176 of FIG. 8, the strings and first and second foam rails 16, 18 are moved backwards between the compression belts 84 while the upper and lower substrate webs 140, 142 (called scrim fabric in flow chart) are glued to the core 70. This process repeats until the core 70 is complete.

As indicated by box 178 of FIG. 8, in the front assembler 72, the channel is chosen in the front channel changer 86 and the strand is pulled into the machine with grippers 126. As indicated by box 180 of FIG. 8, in the front assembler 72, the front infeed belts 94 grip the strings 46', 46 and 46" and size them to the appropriate length. As indicated by box 182 of FIG. 8, the string is then cut to the appropriate length.

As indicated by box 184 of FIG. 8, in the front assembler 72, the assembled core is moved to a position in which the upper and lower substrate webs 140, 142 (called scrim fabric in flow chart) are cut to size to form upper and lower substrate sheets 14, 12. As indicated by box 186 of FIG. 8, in the front assembler 72, the fabric of the upper and lower substrate webs 140, 142 (called scrim fabric in flow chart) is pulled taut while cut to separate the finished core 70. As indicated by box 188 of FIG. 8, the finished core 70 is transferred from between the compression belts 84 to the transport belts 82. As indicated by box 190 of FIG. 8, the transport belts 82 put the finished core 70 in a position such that the upper and lower substrate sheets 14, 12 (called scrim fabric in flow chart) are clamped in place via clamping bars.

As indicated by box 192 of FIG. 8, in each side assembler 136, 138, the operator opens the clamp plates of the side channel changer 86*a*. The third and fourth foam rails 30, 32 are either manually or automatically loaded in the side loading trays 144. See FIG. 3.

As indicated by box 194 of FIG. 8, in each side assembler 136, 138, the third foam rail 30 or the fourth foam rail 32 is pushed to a stopped position either by the operator or via an automated process. The operator flips a switch to close the clamp plates of the side channel changer 86*a*.

As indicated by box 196 of FIG. 8, in each side assembler 136, 138, the operator pushes either the third foam rail 30 or the fourth foam rail 32 to a stopped position and flips a switch to close the clamp plates of the side channel changer 86*a*. Grippers grab the third or fourth foam rail and pull it into a position between the pre-feed belts for moving the foam rail into a loading position.

As indicated by box 198 of FIG. 8, in each side assembler 136, 138, a glue applicator applies glue to the fabric scrim and core 70. Pushers push the third and fourth foam rails 30, 32 into the core 70. As indicated by box 200 of FIG. 8, in each side assembler 136, 138, clamping bars release once the glue is dry, finishing the partially foam encased pocketed spring assembly 10.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A method of manufacturing a partially foam encased pocketed spring assembly, the method comprising: moving a first foam rail into an assembly machine through a first channel of a front channel changer between upper and lower substrate webs using clamp plates to compress the first foam rail and grippers, the grippers moving along a gap between two pre-feed belts; securing the first foam rail to the upper and lower substrate webs; moving the front channel changer to introduce a first string of pocketed springs into the assembly machine through a second channel of the front channel changer between the upper and lower substrate webs; securing the first string of pocketed springs to the first foam rail and to the upper and lower substrate webs; introducing additional strings of pocketed springs into the assembly machine one string at a time and securing each of said additional strings to at least one other string between the upper and lower substrate webs; moving a second foam rail into the assembly machine between the upper and lower substrate webs; securing the second foam rail to a last string of the additional strings to complete a core; and cutting the upper and lower substrate webs to create upper and lower substrate sheets.

2. The method of claim 1, wherein the third and fourth foam rails are introduced into the assembly machine through channels of movable side channel changers.

3. The method of claim 1, wherein each of the strings is the same length and cut from a continuous string.

4. The method of claim 1, wherein the method is performed as a fully automated process by the assembly machine.

5. The method of claim 1, further comprising:

moving third and fourth foam rails into the assembly machine between the upper and lower substrate sheets on opposite sides of the assembly machine; and securing the third and fourth foam rails to the core so that the first, second, third and fourth foam rails form an edge area surrounding a pocketed spring interior.

6. The method of claim 5, wherein securing the third and fourth foam rails to the core includes securing the third and fourth foam rails to the upper and lower substrate sheets.

7. The method of claim 6, wherein the first, second, third and fourth foam rails are configured such that a firmness of the edge area is different than an interior area comprising strings of pocketed springs.

8. A method of manufacturing a partially foam encased pocketed spring assembly, the method comprising: moving a first foam rail in a first direction through a first channel between first and second bumpers of a front channel changer into an assembly machine between upper and lower substrate webs using grippers and clamp plates to compress the first foam rail, two pre-feed belts and infeed belts; gluing the first foam rail to the upper and lower substrate webs; moving a first string of pocketed springs in the first direction into the assembly machine through a second channel between the second bumper and a third bumper of the front channel changer using additional grippers between the upper and lower substrate webs; gluing the first string of pocketed springs to the first foam rail and to the upper and lower substrate webs; moving additional strings of pocketed springs in the first direction into the assembly machine one string at a time, gluing each of said additional strings of pocketed springs to each other one string at a time to create a pocketed spring interior, each of the additional strings being glued to at least one adjacent string, the lower substrate web and the upper substrate web; moving a second foam rail in the first direction into the assembly machine between the upper and lower substrate webs; gluing the second foam rail to the upper and lower substrate webs and to a last string of the pocketed spring interior to create a core; and cutting the upper and lower substrate webs to a desired size to create upper and lower substrate sheets.

9. The method of claim 8, wherein the method is performed as a fully automated process by an assembly machine.

10. The method of claim 8, wherein the third and fourth foam rails are introduced into the assembly machine through channels of movable side channel changers.

11. The method of claim 8, wherein each of the foam rails is pulled into the assembly machine.

12. The method of claim 8, further comprising:

moving third and fourth foam rails in a second direction perpendicular to the first direction into the assembly machine between the upper and lower substrate sheets on opposite sides of the assembly machine; and gluing the third and fourth foam rails to opposite end surfaces of the strings of the pocketed spring interior so that the first, second, third and fourth foam rails form an edge area surrounding the pocketed spring interior.

13. The method of claim 12, further comprising gluing the third and fourth foam rails to the upper and lower substrate sheets.

14. The method of claim 13, wherein the first, second, third and fourth foam rails are made of the same foam.

15. A method of manufacturing a pre-foam encased pocketed spring unit, the method comprising:

moving a first foam rail through a first channel of a movable front channel changer, between pre-feed belts and between infeed belts into a loading position front assembler of an assembly machine between upper and lower substrate webs;

gluing the first foam rail to the upper and lower substrate webs;

moving a first string of pocketed springs through a second channel of the movable front channel changer into the assembly machine between the upper and lower substrate webs;

applying glue to the first foam rail;

pushing the first string of pocketed springs against the first foam rail using a front pusher assembly having three vertically spaced pushers between the upper and lower substrate webs, allowing the glue to harden to secure the first string to the first foam rail and to the upper and lower substrate webs;

moving additional strings of pocketed springs into the assembly machine, securing each of said additional strings of pocketed springs to at least one adjacent string between the upper and lower substrate webs to create a pocketed spring interior;

moving a second foam rail into the assembly machine between the upper and lower substrate webs;

gluing the second foam rail to the upper and lower substrate webs and to a last string of the pocketed spring interior; and cutting the upper and lower substrate webs to create upper and lower substrate sheets.

16. The method of claim 15, wherein the method is performed as a fully automated process by the assembly machine.

17. The method of claim 15, further comprising:

moving third and fourth foam rails into the assembly machine between the upper and lower substrate sheets on opposite sides of the assembly machine; and gluing the third and fourth foam rails to the pocketed spring interior so that the first, second, third and fourth foam rails form an edge area surrounding the pocketed spring interior.

18. The method of claim 17, wherein the first, second, third and fourth foam rails are made of the same foam.

19. The method of claim 17, further comprising gluing the third and fourth foam rails to the upper and lower substrate sheets using side assemblers.

20. The method of claim 19, wherein each of the side assemblers comprises a side pusher assembly.

* * * * *